US008275836B2

(12) United States Patent
Beaven et al.

(10) Patent No.: US 8,275,836 B2
(45) Date of Patent: Sep. 25, 2012

(54) SYSTEM AND METHOD FOR SUPPORTING COLLABORATIVE ACTIVITY

(75) Inventors: Douglas Beaven, Cambridge, MA (US); Jan Beaven, legal representative, Boston, MA (US); Janet Ahlgren, Winchester, MA (US); Kevin Kelley, Woburn, MA (US); Gorham Palmer, Cambridge, MA (US); Stuart E. Rudolph, Winchester, MA (US)

(73) Assignee: VirtualAgility Inc., Winchester, MA (US)

( * ) Notice: Subject to any disclaimer, the term of this patent is extended or adjusted under 35 U.S.C. 154(b) by 0 days.

(21) Appl. No.: 13/313,692

(22) Filed: Dec. 7, 2011

(65) Prior Publication Data
US 2012/0131104 A1 May 24, 2012

Related U.S. Application Data

(63) Continuation of application No. 11/929,185, filed on Oct. 30, 2007, now Pat. No. 8,095,594, which is a continuation-in-part of application No. 09/312,740, filed on May 14, 1999, now Pat. No. 8,095,413.

(60) Provisional application No. 60/133,152, filed on May 7, 1999.

(51) Int. Cl.
*G06F 15/16* (2006.01)
(52) U.S. Cl. .................................... 709/204; 709/205

(58) Field of Classification Search ............... 709/204, 709/205
See application file for complete search history.

(56) References Cited

U.S. PATENT DOCUMENTS

| 5,678,040 | A | * | 10/1997 | Vasudevan et al. ............... 1/1 |
| 6,157,915 | A | * | 12/2000 | Bhaskaran et al. ........... 705/7.11 |
| 6,381,579 | B1 | * | 4/2002 | Gervais et al. ............... 705/7.13 |
| 6,425,016 | B1 | * | 7/2002 | Banavar et al. ............... 719/310 |
| 6,564,246 | B1 | * | 5/2003 | Varma et al. ................... 709/205 |
| 7,698,160 | B2 | * | 4/2010 | Beaven et al. ............... 705/7.27 |
| 2007/0198240 | A1 | * | 8/2007 | Moriat ........................... 703/17 |
| 2009/0222741 | A1 | * | 9/2009 | Shaw et al. ................... 715/753 |
| 2009/0313041 | A1 | * | 12/2009 | Eder ............................... 705/2 |
| 2009/0320035 | A1 | * | 12/2009 | Ahlgren et al. ............... 718/104 |

* cited by examiner

*Primary Examiner* — Mohamed Wasel
(74) *Attorney, Agent, or Firm* — Dickinson Wright PLLC

(57) ABSTRACT

A system for supporting collaborative activity in a network includes a storage component storing data related to the network and a model of the network; a processor that accesses the stored data and the model to process the data according to the model, where the stored data relates to the collaborative activity including user-defined data created by interaction of a user and the model, and context data related to the user, where the user-defined data and the context data, as metadata, are stored in the storage component; and a user interface, provided by the processor, that presents the user-defined data, the context data, and the model in a form readable by the user, the interface permitting the user to define a set of arbitrary domains, relate the user-defined data to the domains, and view relationships between the user-defined data and the context data, and the domains.

33 Claims, 57 Drawing Sheets

| Plan | | | |
|---|---|---|---|
| Domains without Goals ▶ | △ Goals | △ Administor | |

Domain Selection

| Enterprise ▶ | Depth ▶ | |
|---|---|---|
| Environmental | | |
| Market Trends | | New Goal |
| Competitors | | New Goal |
| Technical Innovation | | New Goal |
| Regulatory | | New Goal |
| Customers | | |
| Relationships | | New Goal |
| Products | | New Goal |
| Services | | New Goal |
| Processes | | |
| Core Processes | | New Goal |
| Business Acquisition | | New Goal |
| Business Development | | New Goal |
| Product Development | | New Goal |

Fig. 8

| Values | | | | |
|---|---|---|---|---|
| Title | Business development assesment | | | Animation |
| Subtitle | current situation vs. desired state | | | Spin Rate: 84 |
| Show Average | Top Value | Number of | | |
| 1 points | 7 | 6 | | Increment: 3 |

| Average | Value | Label |
|---|---|---|
| 5 | 3 | business people vs. just sales people |
| 6.5 | 2.5 | sell solutions not just products |
| 7 | 4 | customer vs. internally focused |
| 6 | 3.5 | business makers vs. order takers |
| 5 | 4 | profitability vs. sales focused |
| 6 | 4.5 | deal well at senior vs. just technical level |
| 5.5 | 4 | world class vs. unacceptable service |
| 7 | 3 | build value based client relationships |
| 0 | 0 | |
| 0 | 0 | |

[OK] [Cancel] [Clear]

Fig. 10

Goals

[Select] ▼

| View Contributing Goals | | Show Columns for: | Priority ▼ |
|---|---|---|---|
| | Cost | Payback | Priority | Due |
| Expand business with most profitable customers | | | | |
| Deepen relationships with high net worth clients | 750,000 | 5,000,000 | 5 | 6w |
| Have profitable products for every segment | 75,000 | 250,000 | 5 | 33w |
| Top Goal Total: | $825,000.00 | $5,250,000.00 | | |

▷ Plan  ▷ Administor

*Agile Manager*

Fig. 15

```
Agile Manager I Hierarchy Listing - Netscape                    _ □ x
File Edit View  Go Communicator Help
   Bookmarks   Location http://psdemo.cinteractive.com/agility0005/am/goals_sorted.jsp   ▼ N
```

| Goals | ▷ Plan | ▷ Administor |
|---|---|---|

[Select] ▼

| View All Goals | | show Columns for: | Domain ▼ | |
|---|---|---|---|---|
| | Cost | Payback | Priority | Due |
| Environmental | | | | |
| New Goal | - | - | 5 | - |
|   Competitors | | | | |
|     Find new company or spin off threats | 5,000 | 50,000 | 5 | 10w |
|     Monitor competitive moves around the Internet | 5,000 | 50,000 | 3 | 8w |
|   Technical Innovation | | | | |
|     new internet strategy | - | - | 5 | - |
| Customers | | | | |
| Expand business with most profitable customers | 125,000 | 16,750,000 | 5 | 17w |
| Increase visibility | - | - | 5 | - |
|   Relationships | | | | |
|     Ask clients about our perceived competencies | 10,000 | 500,000 | 5 | 1w |
|     Deepen relationships with high net worth clients | 750,000 | 5,000,000 | 5 | 6w |
|     Understand recent competitive wins | 1,000 | 10,000 | 5 | 4w |
|   Products | | | | |
|     Have profitable products for every segment | 75,000 | 250,000 | 5 | 34w |
|     Resell our back office processing capabilities | 50,000 | 250,000 | 3 | 21w |
|     Revisit our product pricing strategy | 20,000 | 1,500,000 | 5 | 6w |
|   Services | | | | |
|     Develop a web-based customer self service strategy | 450,000 | 2,800,000 | 4 | 21w |

Fig. 16

| View All Goals | | show Columns for: Priority | | |
|---|---|---|---|---|
| | Cost | Payback | Priority | Due |
| Build an Internet savvy design and install team | 1,000,000 | 5,000,000 | 4 | -5w |
| increase auto adjudication rates | 1,000,000 | 1,250,000 | 5 | 86w |
| Deepen relationships with high net worth clients | 750,000 | 5,000,000 | 5 | 6w |
| Increase our technology R&D capability | 555,555 | 2,000,000 | 5 | 34w |
| Develop a web-based customer self service strategy | 450,000 | 2,800,000 | 4 | 21w |
| Implement highly scaleable and efficient processes | 450,000 | 1,250,000 | 5 | 30w |
| Select an E-commerce consulting firm | 300,000 | 1,000,000 | 4 | 4w |
| Achieve a 20% ROI | 250,000 | 1,250,000 | 5 | 34w |
| Develop an RFP for professional services support | 250,000 | 1,000,000 | 5 | -3w |
| Recruit and hire world class industry talent | 250,000 | 1,000,000 | 5 | 34w |
| Reduce product development cycle by 6 months | 250,000 | 500,000 | 4 | 17w |
| Implement GSTP by yearend | 150,000 | 10,000,000 | 5 | 34w |
| Expand business with most profitable customers | 125,000 | 16,750,000 | 5 | 17w |
| Implement self service technical help desk | 85,000 | 100,000 | 4 | 6w |
| Build a RFP/Proposal response capability | 75,000 | 100,000 | 4 | 8w |
| Have profitable products for every segment | 75,000 | 250,000 | 5 | 34w |
| Implement self service account maintenance | 65,000 | 2,000,000 | 4 | 1w |
| Resell our back office processing capabilities | 50,000 | 250,000 | 3 | 21w |
| Build a sales forecasting capability | 35,000 | 100,000 | 4 | 12w |
| Revisit our product pricing strategy | 20,000 | 1,500,000 | 5 | 6w |

Fig. 17

View All Goals

Show Columns for: Priority

| | Cost | Payback | Priority | Due |
|---|---|---|---|---|
| Expand business with most profitable customers | 125,000 | 16,750,000 | 5 | 17w |
| implement GSTP by yearend | 150,000 | 10,000,000 | 5 | 34w |
| Build an Internet savvy design and install team | 1,000,000 | 5,000,000 | 4 | -5w |
| Deepen relationships with high net worth clients | 750,000 | 5,000,000 | 5 | 6w |
| Develop a web-based customer self service strategy | 450,000 | 2,800,000 | 4 | 21w |
| Reduce Breakeven on New Business | 10,000 | 2,500,000 | 4 | 8w |
| Implement self service account maintenance | 65,000 | 2,000,000 | 4 | 1w |
| Increase our technology R&D capability | 555,555 | 2,000,000 | 5 | 34w |
| Revisit our product pricing strategy | 20,000 | 1,500,000 | 5 | 6w |
| Achieve a 20% ROI | 250,000 | 1,250,000 | 5 | 34w |
| Implement highly scalable and efficient processes | 450,000 | 1,250,000 | 5 | 30w |
| Increase auto adjudication rates | 1,000,000 | 1,250,000 | 5 | 86w |
| Develope an RFP for professional services support | 250,000 | 1,000,000 | 5 | -3w |
| Recruit and hire world class industry talent | 250,000 | 1,000,000 | 5 | 34w |
| Select an E-commerce consulting firm | 300,000 | 1,000,000 | 4 | 4w |
| Ask clients about our perceived competencies | 10,000 | 500,000 | 5 | 1w |
| Reduce product development cycle by 6 months | 250,000 | 500,000 | 4 | 17w |
| Have profitable products for every segment | 75,000 | 250,000 | 5 | 34w |
| Resell our back office processing capabilities | 50,000 | 250,000 | 4 | 21w |
| Reduce our AR to under 60 days | 5,000 | 150,000 | 5 | 8w |

Fig. 19

| | Risk | Owner | Stage | Status | Due |
|---|---|---|---|---|---|
| ⊗ Have profitable products for every segment | 4 | Mike Jones | Requirements Gathering | needs attention | 33w |
| ⊘ Monitor competitive moves around the Internet | 3 | Doug Beaven | Analysis/Assessment | needs attention | 7w |
| ⊘ Reduce Breakeven on New Business | 4 | Doug Beaven | Implement | needs attention | 7w |
| ⊘ Develop an RFP for professional services support | 4 | Joe Smith | Retrospective | completed | -4w |
| ⊘ Perform reference checks on short list of PS firms | 4 | Doug Beaven | Retrospective | completed | -4w |
| ○ Ask clients about our perceived competencies | 5 | Doug Beaven | Requirements Gathering | not started | 1d |
| ○ Eclipse competition with our e-comm capability | 5 | Doug Beaven | - | not started | - |
| ○ Expand business with most profitable customers | 3 | Doug Beaven | Analysis/Assessment | not started | 16w |
| ○ Find new company or spin off threats | 5 | Doug Beaven | Implement | not started | 9w |

Fig. 20

| | | Risk | Owner | Stage | Status | Due |
|---|---|---|---|---|---|---|
| | ucts for | 4 | Mike Jones | Requirements Gathering | needs attention | 33w |
| | moves around the internet | 5 | Doug Beaven | Analysis/Assessment | needs attention | 7w |
| ⊘ | Reduce Breakeven on New Business | 4 | Doug Beaven | Implement | needs attention | 7w |
| ⊘ | Develop an RFP for professional services support | 4 | Joe Smith | Retrospective Review | completed | -4w |
| ⊘ | Perform reference checks on short list of PS firms | 4 | Doug Beaven | Retrospective Review | completed | -4w |
| O | Ask clients about our perceived competencies | 5 | Doug Beaven | Requirements Gathering | not started | 1d |
| O | Eclipse competition with our e-comm capability | 5 | Doug Beaven | - | not started | - |
| O | Expand business with most profitable customers | 3 | Doug Beaven | Analysis/Assessment | not started | 16w |
| O | Find new company or spin off threats | 5 | Doug Beaven | Implement | not started | 9w |
| O | Increase our technology R&D | 5 | Joe Smith | Prototype | not started | 33w |

Tabs: Goals | Plan | Administor

[Select] ▼
- [Select]
- Hierarchy
- Select Domain
- Top Goals
- All Goals
- Alerts
- Search
- New Goal show Columns for: Status ▼

Fig. 21

Goals

[Select] ▼   △ Administor

View Contributing Goals                                      *Show Columns for:* Domain ▼

| | Cost | Payback | Priority | Due |
|---|---|---|---|---|
| Expand business with most profitable customers | | | | |
| Customers | | | | |
| Relationships | | | | |
| Deepen relationships with high net worth clients | 750,000 | 5,000,000 | 5 | 6w |
| Products | | | | |
| Have profitable products for every segment | 75,000 | 250,000 | 5 | 33w |
| *Top Goal Total:* | $825,000.00 | $5,250,000.00 | | |

*Agile Manager*

Fig. 22

```
      CREATE TABLE T_GROUP (
4303    GROUP_ID          NUMBER (8)
      DEFAULT 0 NOT NULL,
4305    GROUP_NAME        VARCHAR2 (30),
4307    GROUP_TYPE_KEY    NUMBER (8),
        CREATED_DATE      DATE
      DEFAULT SYSDATE,
        UPDATED_DATE      DATE,
        DESCRIPTION       VARCHAR2 (255),
        GROUP_CATEGORY    VARCHAR2 (10),
        FILTER_USER       VARCHAR2 (20)
      DEFAULT USER NOT NULL,
        CONSTRAINT GROUP_UK1
          UNIQUE (GROUP_NAME),
        CONSTRAINT GROUP_PK
      PRIMARY KEY ( GROUP_ID ));
```

4207

```
      CREATE TABLE T_GROUP_TYPE (
4311    GROUP_TYPE_KEY   NUMBER (8)     NOT NULL,
4313    GROUP_TYPE       VARCHAR2 (32),
4315    SECURITY_LEVEL   NUMBER (2),
        CREATED_DATE     DATE           DEFAULT SYSDATE,
        UPDATED_DATE     DATE,
        CONSTRAINT GROUP_TYPE_PK
      PRIMARY KEY ( GROUP_TYPE_KEY ));
```

4205

```
      CREATE TABLE T_GROUP_OBJECTIVE (
4317  GROUP_ID       NUMBER (8)    NOT NULL,
4319  OBJECTIVE_ID   NUMBER (8)    NOT NULL,
      CREATED_DATE   DATE          DEFAULT SYSDATE,
      UPDATED_DATE   DATE,
4321  PERMISSION     NUMBER (2)    DEFAULT 0,
      FILTER_USER    VARCHAR2 (20) DEFAULT USER NOT NULL,
      CONSTRAINT GROUP_OBJECTIVE_PK
      PRIMARY KEY ( GROUP_ID, OBJECTIVE_ID ));
```

```
       CREATE TABLE T_OBJECTIVE (
4401  OBJECTIVE_ID            NUMBER (8)     DEFAULT 0 NOT NULL,
4403  OBJECTIVE_NAME          VARCHAR2 (50)  NOT NULL,
4405  OBJECTIVE_TYPE_CODE     CHAR (1)       NOT NULL,
4407  OBJECTIVE_DESC          VARCHAR2 (1000),
4409 ⎰ OWNER_USER_ID          NUMBER (8)     NOT NULL,
     ⎱ DELEGATEE_USER_ID      NUMBER (8),
4411  PARENT_ID               NUMBER (8),
      KEY_BENEFIT             VARCHAR2 (1000),
      RISK_CODE               VARCHAR2 (3),
      PRIORITY_CODE           VARCHAR2 (3),
      PERCENT_COMPLETE        NUMBER (3),
      MAX_DURATION_DAYS       NUMBER (6),
      EST_DURATION_DAYS       NUMBER (6),
      MIN_DURATION_DAYS       NUMBER (6),
      ACT_FINISH_DATE         DATE,
      EST_FINISH_DATE         DATE,
      START_DATE              DATE,
      DUE_DATE                DATE,
      STATUS_SCORE            NUMBER (6,2),
      STATUS_CODE             VARCHAR2 (3),
      LOCKER_USER_ID          NUMBER (8),
4413  LOCK_FLAG               NUMBER (1),
      DISPLAY_SEQUENCE        NUMBER (4),
      MEASUREMENT             VARCHAR2 (255),
      LEADER_USER_ID          NUMBER (8),
      CHAMPION_USER_ID        NUMBER (8),
      ACT_PAYBACK             NUMBER (12,2),
      EST_PAYBACK             NUMBER (12,2),
      ACT_COST                NUMBER (12,2),
      EST_COST                NUMBER (12,2),
      ARCHIVED_FLAG           NUMBER (1)     DEFAULT 0,
      DESIRED_OBJ_ACHIEVE     NUMBER (3),
      EST_OBJ_ACHIEVE         NUMBER (3),
      CREATED_DATE            DATE           DEFAULT SYSDATE,
      UPDATED_DATE            DATE,
      STAGE_CODE              CHAR (3),
      FILTER_USER             VARCHAR2 (20)  DEFAULT USER NOT NULL,
      DELETED_FLAG            NUMBER (1)     DEFAULT 0,
      CONSTRAINT OBJECTIVE_CK1
           CHECK (OBJECTIVE_TYPE_CODE IN ('D','I','A','R')) ,
      CONSTRAINT OBJECTIVE_UK1
         UNIQUE (OBJECTIVE_NAME, OBJECTIVE_TYPE_CODE),
      CONSTRAINT OBJECTIVE_PK
      PRIMARY KEY ( OBJECTIVE_ID ) ) ;

4415 ⎰ CREATE UNIQUE INDEX OBJECTIVE_IDX1 ON
     ⎱   T_OBJECTIVE(OBJECTIVE_ID, PARENT_ID)
```

```
        CREATE TABLE T_INFORMATION (
   4501 ID              NUMBER (12)    NOT NULL,
   4503 NAME            VARCHAR2 (255)  NOT NULL,
   4505 DESCRIPTION     VARCHAR2 (4000),
   4507 OWNER_ID        NUMBER (8)     NOT NULL,
   4509 TYPE            VARCHAR2 (12)  NOT NULL,
       ┌─ MIMETYPE      VARCHAR2 (32)  NOT NULL,
       │  FILESIZE      NUMBER (12)    DEFAULT 0,
       │  VERSION       NUMBER (3,1)   DEFAULT 1 NOT NULL,
  4511 ┤  URL           VARCHAR2 (4000) NOT NULL,
       │  CREATED_DATE  DATE           DEFAULT SYSDATE,
       │  UPDATED_DATE  DATE           DEFAULT NULL,
       └─ DELETED       NUMBER (1)     DEFAULT 0 NOT NULL,
   4513 OBJECTIVE_ID    NUMBER (12),
        FILTER_USER     VARCHAR2 (20)  DEFAULT USER NOT NULL,
        UNIQUE (ID) ) ;

4221
```

```
        CREATE TABLE T_MESSAGE (
   4515 MESSAGE_ID       NUMBER (8)    NOT NULL,
       ┌─ MESSAGE_SUBJECT VARCHAR2 (255),
       │  MESSAGE_BODY    VARCHAR2 (1000),
       │  MESSAGE_SIZE    NUMBER (12),
  4517 ┤  OWNER_USER_ID   NUMBER (8),
       │  CREATED_DATE    DATE          DEFAULT SYSDATE,
       └─ UPDATED_DATE    DATE,
        FILTER_USER       VARCHAR2 (20) DEFAULT USER NOT NULL,
        CONSTRAINT MESSAGE_PK
        PRIMARY KEY ( MESSAGE_ID ) ) ;

SYSTEM AND METHOD FOR SUPPORTING COLLABORATIVE ACTIVITY

CROSS REFERENCE TO RELATED APPLICATIONS

This patent application is a continuation of U.S. patent application Ser. No. 11/929,185, entitled "System for Performing Collaborative Tasks," filed Oct. 30, 2007, which is a continuation-in-part of U.S. Ser. No. 09/312,740, entitled Processing Management Information, filed May 14, 1999 and claiming priority from U.S. provisional patent application No. 60/133,152, having the same title as U.S. Ser. No. 09/312, 740 and having a filing date of May 7, 1999. This patent application contains the entire Detailed Description of U.S. Ser. No. 09/312,740.

BACKGROUND

Computers coupled to networks have made collaborative work easier than ever before. At the most fundamental level, file sharing and email have eliminated the requirement that collaborators be in physical proximity to each other. The change tracking arrangements that are provided by most document processing systems further support collaborative work, as do computer-implemented scheduling and tracking systems. Integrated systems for collaborative work such as Lotus Notes™ provide features such as file sharing, email, change tracking, scheduling, and tracking in a single package. A problem with these tools and integrated systems for collaborative work is that they are very general. It is up to the user to adapt them to his or her needs. To be sure, a skilled user of a tool such as a spreadsheet can adapt the tool to almost any purpose, but to do this, extensive programming is required. Such programming requires a specialist, and the result of the programming is often opaque to those who are not masters of the tool both of the tool and of what is being represented. Indeed, a general problem with tools that require extensive programming to adapt them to a user's needs is that the programming is usually done by a specialist who understands the tools or the system, but not the nature of the collaboration, and as is usual in such situations, communication between the programming specialist and the users is usually difficult and sometimes impossible.

Another approach to collaborative work has been systems that are specialized for collaborative work in a particular special area, such as bookkeeping. For example, the Quickbooks™ small business accounting software manufactured by Intuit, Inc. provides a model of a small business as seen from the point of view of an accountant that the user of Quickbooks can customize for his or her own purposes. While the model of the small business that Quickbooks provides is very useful for accounting, it has no relevance whatever to other aspects of the business.

The parent of the present patent application describes a system for collaborative work which permits the collaborators both to make their own model of the collaborative work and to modify that model without the help of skilled programmers. The system of the parent permitted the collaborators to define a model for their collaborative work by defining goals and projects and relate information such as scheduling information, priority information, cost information, discussions, and locations of further information to the goals and projects. The collaborators could organize themselves into groups and define access to a goal or project in terms of those groups. The model could further include hierarchies of the goals and projects. Finally, the model could include hierarchies of domains and a goal or a project could be assigned to a single domain. The graphical user interface for the system permitted display of goals and projects in terms of the hierarchies they were members of, in terms of the domains they belonged to, and in terms of scheduling, priority, and cost. Once a particular goal or project had been selected in the GUI, the information related to the goal or project could be displayed in the GUI and modified.

One example of the kinds of things that are possible with the system for collaborative work of the parent of the present patent application is the following: a model of a law firm made using the system may include a goal and project hierarchy for each of the firm's clients. Each client's goal and project hierarchy may include a billing project for the client. The model may further include a domain hierarchy that includes a billing domain, and the billing project for each client may belong to the billing domain. The billing project for a client is thus visible not only from the point of view of the client's domain and project hierarchy, but also from the point of view of the billing domain.

Experience with the system of the parent has shown that the technique of making a model of the collaborative effort is much more broadly applicable than originally contemplated, and can in fact be used for any kind of collaborative work. Experience with the system of the parent has also shown that the manner in which the model was made in the original unnecessarily restricted the system's usefulness and that the user interface was unnecessarily complex. It is thus an object of the present invention to overcome these limitations and to provide an improved system for collaborative work of the type disclosed in the parent.

SUMMARY

A system for supporting collaborative activity in a network includes a storage component storing data related to the network and a model of the network; a processor that accesses the stored data and the model to process the data according to the model, wherein the stored data relates to the collaborative activity including user-defined data created by interaction of a user and the model, and context data related to the user, wherein the user-defined data and the context data, as metadata, are stored in the storage component; and a user interface, provided by the processor, that presents the user-defined data, the context data, and the model in a form readable by the user, the interface permitting the user to define a set of arbitrary domains, relate the user-defined data to the domains, and view relationships between the user-defined data and the context data, and the domains.

The system supports an arbitrary activity involving collaborators. The processor has access to a representation of a model of the activity. The form of the model is defined by the collaborators and the representation of the model provides access to information relating to the activity. The interface permits a collaborator to perceive and modify the model's form and to perceive and modify the information to which the representation of the model provides access.

The representation of the model includes representations of the information to which the model provides access and the interface permits a collaborator to perceive the model as sorted according to values of the included representatives of information. The model may also include representatives of further information. With such further information, the interface permits the collaborator to perceive how the further information is related to the model, to perceive the further information, and to modify the further information. The further information may include a document that is accessible to the system, a message sent to the collaborator by another collaborator, an alert that indicates a change in the model that is relevant to the collaborator, a reminder that is generated by the system for the collaborator, or a discussion among collaborators concerning the model.

Particular versions of the invention include: a version in which the representation of the model permits the model to be viewed in more than one way and the interface permits the model to be viewed according to the plurality of the ways. a version in which the model includes model entities that have relationships one to another, the representation of the model includes representations of the model entities and of their relationships, access to the information is provided via the representations of the model entities, and the interface permits the collaborator to perceive the model entities and the relationships and to modify the relationships. a version in which there is a plurality of types of model entities and the interface permits the collaborator to perceive the type of the model entity. a version in which the relationships between the model entities include a first relationship and a second relationship, a model entity may belong to both relationships, and the interface permits the collaborator to perceive the first relationship and/or the second relationship. a version which includes model entities that have a hierarchical relationship. a version in which the hierarchical relationship includes a first hierarchy and a second hierarchy, the second hierarchy including a model entity that also belongs to the first hierarchy. a version in which there is a plurality of the first hierarchies and the second hierarchy includes model entities from different ones of the first hierarchies. a version in which there is a plurality of the second hierarchies and the model entity belongs to more than one of the second hierarchies.

A graphical user interface for the system for supporting an arbitrary activity involving collaborators includes a first window and a second window that are simultaneously displayed. The model entities and their relationships are displayed in the first window and a collaborator may select a model entity from the first window. The second window permits the collaborator to perform an operation on the selected model entity. The operation may modify the relationships of the selected model entity to the other model entities or it may be accessing the information via the selected model entity. Other features of the graphical user interface include the following: when there is a plurality of the relationships between the model entities, the first window shows the relationships according to the plurality. the first window permits the collaborator to select which relationship the first window shows the model according to. the collaborators have different access privileges with regard to particular ones of the model entities and what a collaborator perceives of the model entities in the first window is determined by the graphical user interface according to the collaborator's access privileges. the graphical user interface may include a third window which is simultaneously displayed with the other two windows and which contains a user interface for third-party software such as a contact-management system.

DESCRIPTION OF THE DRAWINGS

The Detailed Description refers to the following figures in which like numerals refer to like items, and in which:

FIGS. 3, 6-10, and 12-39 are illustrations of computer display screens produced by the software systems.

FIG. 43 shows the SQL DDL for a preferred embodiment of group table 4207 and group type table 4205;

FIG. 44 shows the SQL DDL for a preferred embodiment of objective table 4215;

FIG. 45 shows the SQL DDL for a preferred embodiment of information table 4221 and message table 4225;

FIG. 51 shows the GUI for defining access to the new initiative;

In FIG. 40 and beyond, reference numbers in the drawing have three or more digits: the two right-hand digits are reference numbers in the drawing indicated by the remaining digits. Thus, an item with the reference number 4003 first appears as item 4003 in FIG. 40.

DETAILED DESCRIPTION

Figure 1:
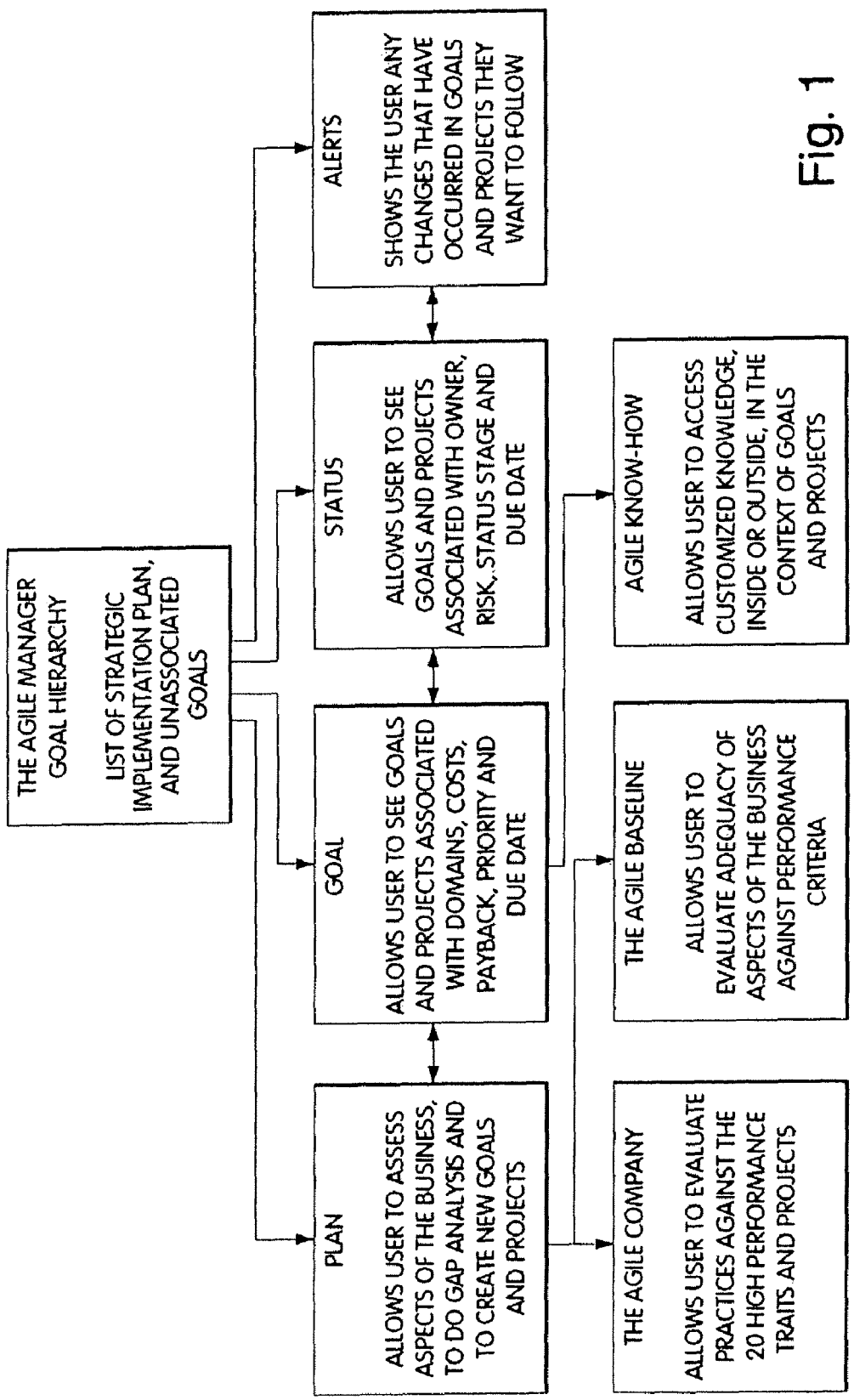
FIGS. 1-2 and 4 are block diagrams of software systems.

The Detailed Description begins with the complete Detailed Description from the parent of the present patent application. The material which has been added in the present patent application begins in the section "The model used in the parent of the present patent application."

The Agile Management Portal program includes Intranet/Internet based software integrated in a process to help organizations such as companies, enterprises, and businesses, to be more agile. The program allows management teams, wherever located, to quickly plan, design, and work on a common portfolio of strategic goals and initiatives the teams believe will make the business grow and prosper, and to gain access to pre-populated external sources of knowledge, expertise and tools via the Internet.

Agility management: In at least some circumstances, Agility means being able to consistently grow and perform better than competitors in the marketplace over time, and Agility management means linking strategic planning, project management, and high performance organizational principles into an integrated set of management tools, templates and services that enable organizations to be more agile.

The Agile Manager can serve as a "management portal" through which people can view both internal organizational goals and external information available to help achieve these goals. The Portal's functional architecture is called The Agile Manager, and has four modules that can be used in a planning and management process: the Agile Manager, the Agile Company, the Agile Baseline, and Agile Know-how, The Agile Manager Includes:

(1) a business domain structure to which strategic goals and contributing initiatives can be linked. This structure creates a stem-to stern view of how the business works, including customer, value chain, organization and economic domains. This structure allows the user to enter and subsequently explore strategic goals and initiatives germane to either the organization as a whole or to a particular domain. Once the user picks an area of interest, the user is effectively "one click" away from several context sensitive views about investments the organization is making to grow and improve performance.

(2) a gap analysis facility that a management team can use to assess performance gaps and to design how any aspect of the domain structure would have to change to close these gaps.

(3) the ability to create a portfolio of strategic goals and their contributing initiatives using either top down brainstorming or bottom-up association techniques. As a result, teams can effectively start with a clean sheet of paper and reinvent the business from scratch. Or the teams can review an inventory of already on-going activities and relate these activities to each other and to overall strategic goals. Having this portfolio available on-line—subject to permissioning controls—for all to see, keeps members of the organization aware of where they need to go, what it will take to get there, and what actions should be taken to stay on track.

(4) a facility to draw people's attention immediately to changes in the portfolio and its contents that are important to the people in view of their particular roles or interests. This facility gives various common and individualized views of different goals and initiatives that will help diverse groups of people to work together effectively. A history of these changes and related dates is also maintained.

(5) a common attribute structure that provides information (e.g., costs, payback, priority, risks, due dates) for any goal and contributing initiative so the goals and initiatives can be sorted against a piece of information to facilitate ongoing decision making. For example, if resources are limited, the user can sort initiatives by cost, payback, and priority, or if the user wants to see how the portfolio will affect any part of the organization, the user can sort by domain.

(6) the ability to follow a context sensitive link to any goal or initiative and its relevant internal and external sources of knowledge deemed helpful to successful implementation.

(7) a management action plan/agenda utility that managers can use to keep track of pending issues and actions for each strategic goal or initiative. As a result, users can learn about outstanding issues, upcoming agenda items, and the responsible parties. As a result, items are easily found and a user is allowed to see progress related issues before meetings, so that less time is needed to focus management meetings on substantive issues.

The Agile Company:

(8) The Agile Manager also supports the Agile Company program, which includes content that executives can use to assess how well their organization matches high performance criteria and to suggest base-case template programs that can be adapted to accelerate developing agility. Behind the Agile Company is content reflecting 20 traits and characteristics that capture fundamental principles underlying agile, high performing organizations The Agile Baseline:

(9) The Agile Baseline includes an accessible assessment tool that displays performance criteria that respondents then evaluate in terms of their organization's competency relative to each criterion. The result of this input is displayed as a "spider" diagram that visually helps to convey the extent of any gaps that should be closed to improve competitiveness. The spider diagram helps people focus on opportunities for improvement and makes the rationale for change readily accessible to members of the organization.

Agile Know-How:

(10) Agile Know-how includes a subscription service that provides links to specific knowledge sources and tools that can be helpful to people working on different initiatives. This subscription service fits together with the Agile Manager so the knowledge is accessible in the context in which it is needed.

When the Agile Manager and its modules are used in conjunction with the Agility Management Process, people are better able to work together in a way demonstrated to be correlated with high performance:

- Fosters a more adaptive culture (e.g., to relish change and fight inertia): linking goals, projects and their attributes and being able to sort the portfolio to focus on a particular aspect facilitates adapting to changes when they occur.
- Helps align users behind strategic goals and contributing projects: getting users to "see" in simple outline form where the organization wants to go to grow and prosper, and what it's going to take to get there, which enables users to understand the strategy and to keep their own projects in alignment.
- Helps employees act and be treated like owners: when people can see a model of the organization and understand how it works they are better able to make decisions about what is important, much as if they owned the organization.
- Helps make decisions based on benefits and risks to the business: linking proposed initiatives to the model of the organization, and to costs, paybacks, and priorities makes it easier to understand the benefits and risks that could result.
- Provides well managed structure that encourages teamwork across boundaries: the ability to understand and be informed of changes elsewhere in the organization enhances the ability to work across different disciplines and locations.
- Encourages people to continuously look for ways to improve the business: enabling management team members to review a table of contents of their business, and to assess gaps between how good they need to be and where they are currently, and to set goals for closing these gaps; this ability of individuals or teams to step back and to "see" the table of contents and to reflect on what changes need to be made to be different in the marketplace and to improve performance is a key ingredient in creating a culture that continually looks for ways to improve the business.
- Helps people understand better how the pieces of the business work together: the model of the business gives viewers an integrated view of how the business works and how they relate, which provides a valuable context for understanding why something that does not entirely make sense locally could be proper for the business as a whole.
- Keeps users focused on successfully implementing strategic priorities: The ability to constantly view and be aware of what is in the approved strategic goals and initiatives portfolio keeps members of the organization aligned around common strategic priorities.

Makes the management process more cost effective by having information and knowledge available when it is needed: the linking of plans, goals, resources, people and projects into a relational database accessible via the Internet makes valuable information available almost immediately.

The Computing Environment:

To use Agility Manager effectively, an organization may use an intranet with widespread email and Web browser usage. Agility Manager is compatible with modern email systems and with Microsoft and Netscape Web browsers. Typically, no other client-side software is required.

Agility Manager combines sophisticated application code with powerful, industry standard server components. The Agility Manager server includes a database server, a Web application server, and application code written in server-side Java. Agility Manager can use a Microsoft or Oracle database server. For example, Agility Manager may be run on an IBM Websphere application server, or may run on other Java-based application servers. The Agility Manager may run on Windows NT or Solaris or other operating environments.

Agility Manager may be installed on an internal server, or may be hosted on a server such as a Web server and connected via Internet or Virtual Private Net.

Example of an On-Site Installation:

Browsers: MS Internet Explorer 3+, Netscape Navigator/Communicator 3+

Mailers: Email client with click-through URL linking, such as Notes, Outlook, Outlook Express, Eudora, Communicator.

Server OS: Windows NT 4 Solaris 2.5+

Database Server: MS SQL 6.5 Oracle 8 Database administration capability is typically required.

Application Server: IBM WebSphere 1.1 or 2.0

Web Server: MS IIS, Apache, or Netscape

Mail System: SMTP compatible, such as Notes, Exchange, Sendmail, Smail, Postoffice.

Example of an Off-Site Installation:

Browsers: MS Internet Explorer 3+, Netscape Navigator/Communicator 3+

Mailers: Email client with click-through URL linking, such as Notes, Outlook, Outlook Express, Eudora, Communicator. Integration and Source Code The Agile Manager is based on a relational data model.

Screen Map for Agile Manager:

FIG. 1 is a map of the basic structure of the suite of software that shows key functions performed by the Agile Manager and ways in which users can get access to other modules of the suite. The sequence of the map illustrates logical paths users take as different aspects of the goal hierarchy are considered, from deciding what belongs and why, designing and modifying goals and contributing projects, monitoring and pursuing issues related to implementation progress, and getting to specific knowledge found helpful to the context of any particular initiative. A screen by screen description is provided below.

Overview of Corporate Processes Affected by the Agility Management Program

The Agility Management Program helps leaders, managers, and staff conduct normal management practices in everyday corporate life while quickly and effectively using the power of the Internet to gain access to knowledge needed to make decisions. Thus, the program helps leaders and managers to execute daily operations successfully, to continually improve the way they do business to keep abreast of changing competitive conditions and to deliver increasing value to their customers and owners.

The Planning/Execution Cycle (Process)

Technology is transforming virtually every aspect of commerce, and globalization and deregulation are making competition more complex. These forces are causing organizations to go through planning and execution cycles to launch multiple new initiatives to cope. To do this, organizations routinely make assessments of their performance—they consider best practices, they survey customer opinions, they examine market and competitive trends and practices; they create task forces and hire consultants who generate findings and conclusions. To handle these conclusions, organizations conduct planning to establish goals and design initiatives to improve their performance—they hold retreats to develop these visions and they decide on priorities and allocate resources to fund initiatives to bring these visions to fruition. To execute these initiatives, organizations assign staff and hire outside expertise and know-how to get the results they want. To get the results to stick, organizations undertake change management programs to bring people and organizational behaviors into line with what the new initiatives require.

Figure 2:
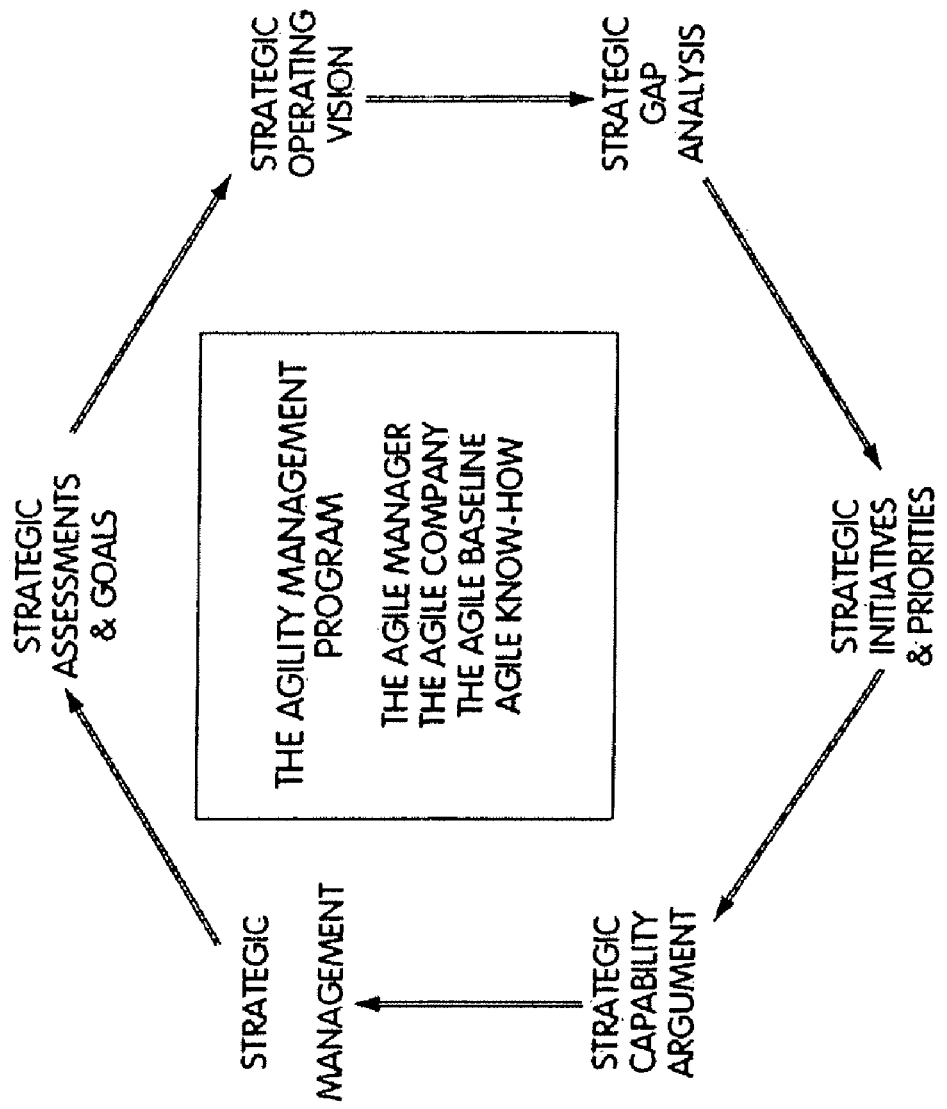

The Agility Management Program software enables people to get organized and communicate much easier and faster as they go through these planning and execution cycles, and to gain access to knowledge and tools that will help them understand how to implement their initiatives more successfully. FIG. 2 illustrates the relationship between the Agile Manager and common planning practices.

Managing a Portfolio of Initiatives

The planning/execution process is repeated again and again across organizations in different departments, functional areas, and lines of business. It is not uncommon for literally hundreds of initiatives to be underway in units across an organization. Some of the initiatives are local initiatives to improve a specific operation and typically do not need to be coordinated with other initiatives. Many initiatives, however, have multiple components that should be coordinated so that they contribute to the accomplishment of a single overarching goal. For instance, a new product requires that processes across the organization from sales and marketing, through operations and manufacturing, and technology to human resources be integrated and aligned so that the product will be introduced in time to exploit an opportunity in the marketplace. Similarly, introduction of new technology, such as a new workstation, often requires coordination of units from information technology, sales and marketing, human resource training, and administration before the new technology can be put into beneficial use.

Figure 3:
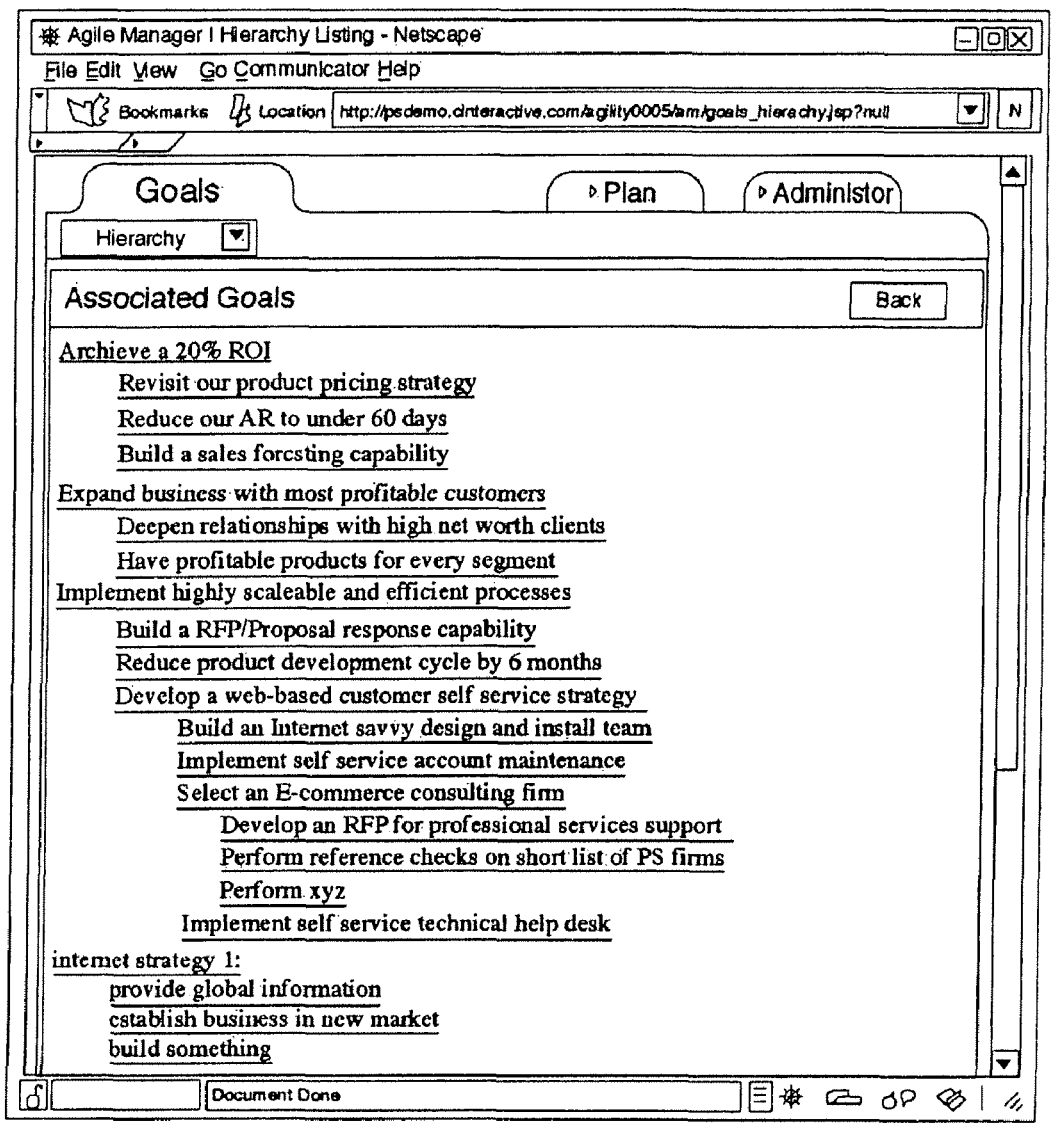

The Agile Manager not only facilitates the planning/execution cycle for any particular goal or initiative, but also allows the user to put all the priority goals and each priority goal's contributing initiatives into a strategic implementation portfolio or hierarchy (FIG. 3.).

The portfolio view relates contributing initiatives or projects to their overarching goals and to each other, and allows the user to sort these initiatives, projects, or goals in a variety of ways. For example, the user can sort the initiatives in terms of their impact on the domain structure of the organization, by strategic factors such as cost, payback, and priority, or according to the status and stage the goals and initiatives are in to allow better management.

Helping Leaders, Managers and Staff Play Their Different Roles

People throughout an organization have distinct roles to play in the formulation and implementation of plans. Traditionally, these roles have been substantially formalized, with senior levels likely to do the planning and lower levels likely to do the implementation. Modern email and voice communication have flattened organizational structures by allowing ordinary employees to get access to information on their own without depending on senior levels as the source of knowledge.

Figure 4:
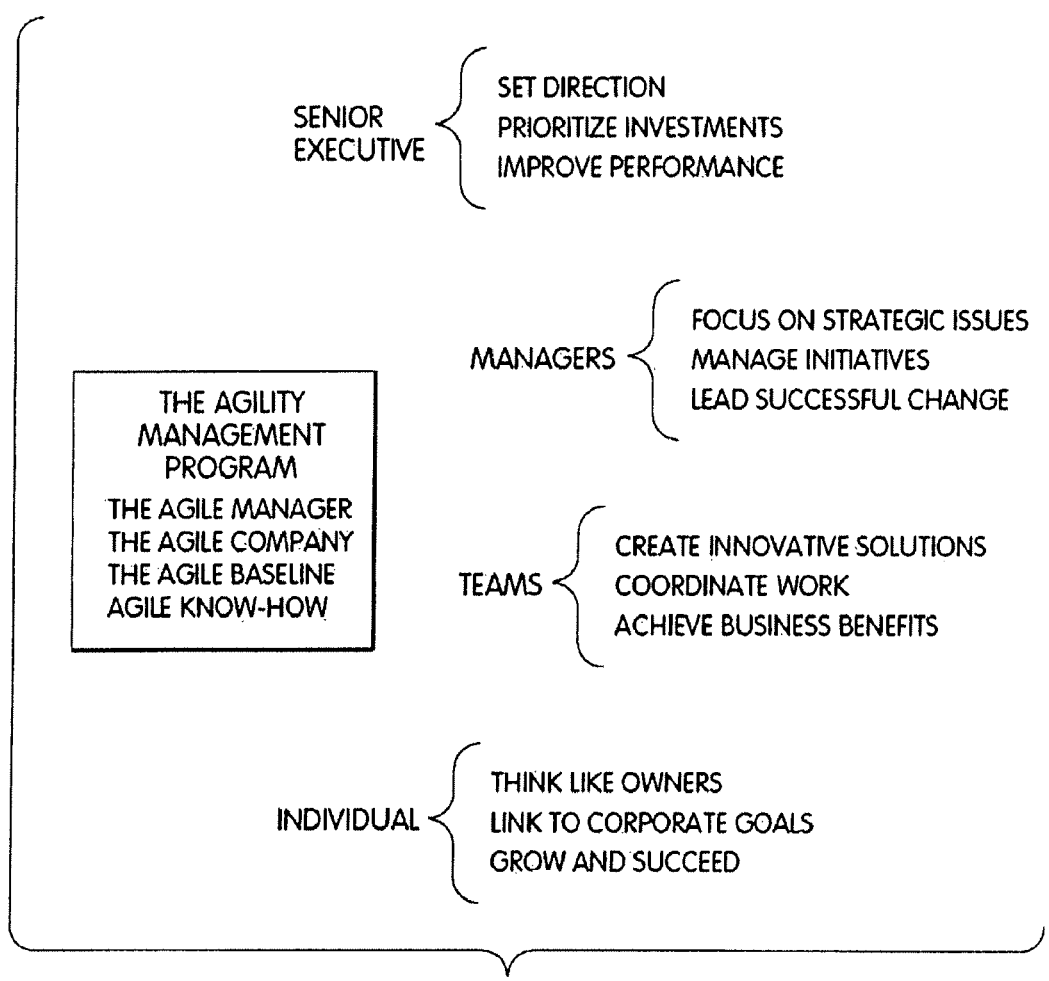

The Agile Manager allows effectively everyone to see the goals and projects important to the company and, as shown on FIG. 4, helps people to play specific roles with a clear picture of the initiatives involved and allows people to contribute ideas.

Figure 5:
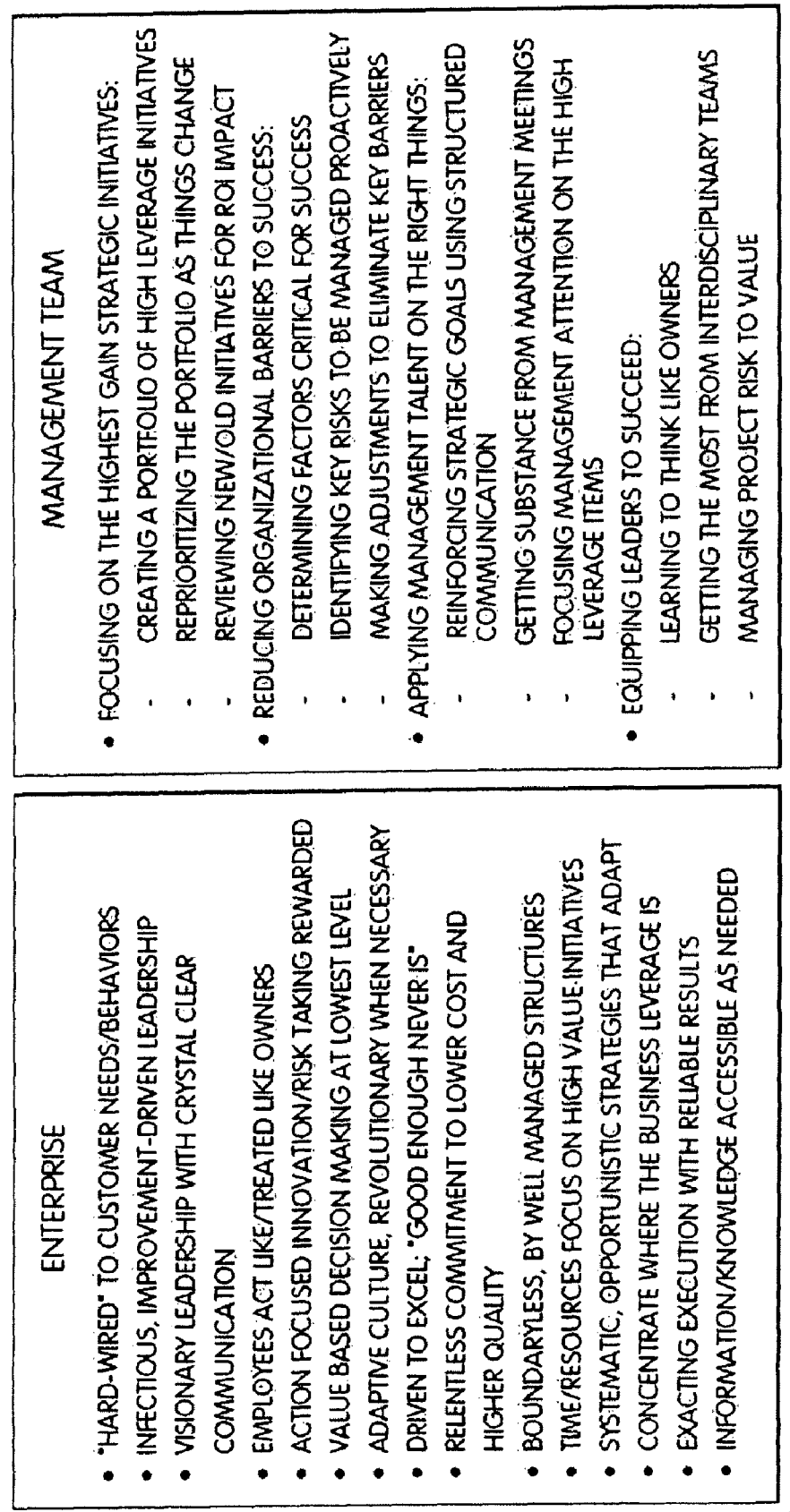
FIG. 5 is an illustration of principles underlying the software systems.

Overview of How the Software Integrates with a Process in the Agility Management Program As shown in FIG. 5, the Agility Management Program reflects principles of effective management of high performing organizations.

The following describes a typical sequence of how a management user/team might use the Agile Manager. The particular example is drawn from an actual implementation of the Agile Manager linking strategic corporate goals and Information Technology initiatives. The Agile Manager structure allows many different business applications, and a key problem it helps solve is bridging a communication gap between business users and their technical counterparts so both sides work off the same page.

Figure 6:
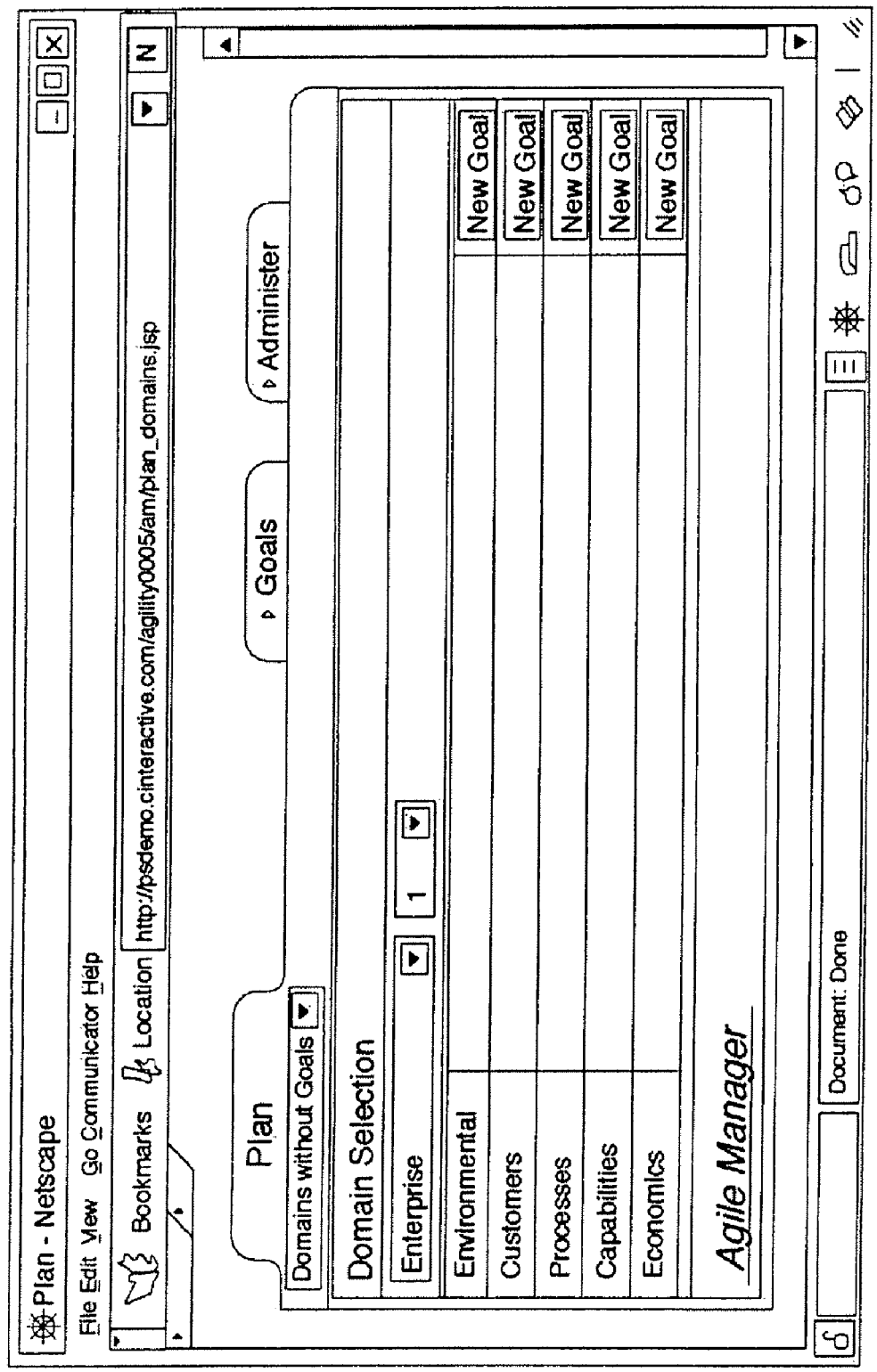
Figure 7:
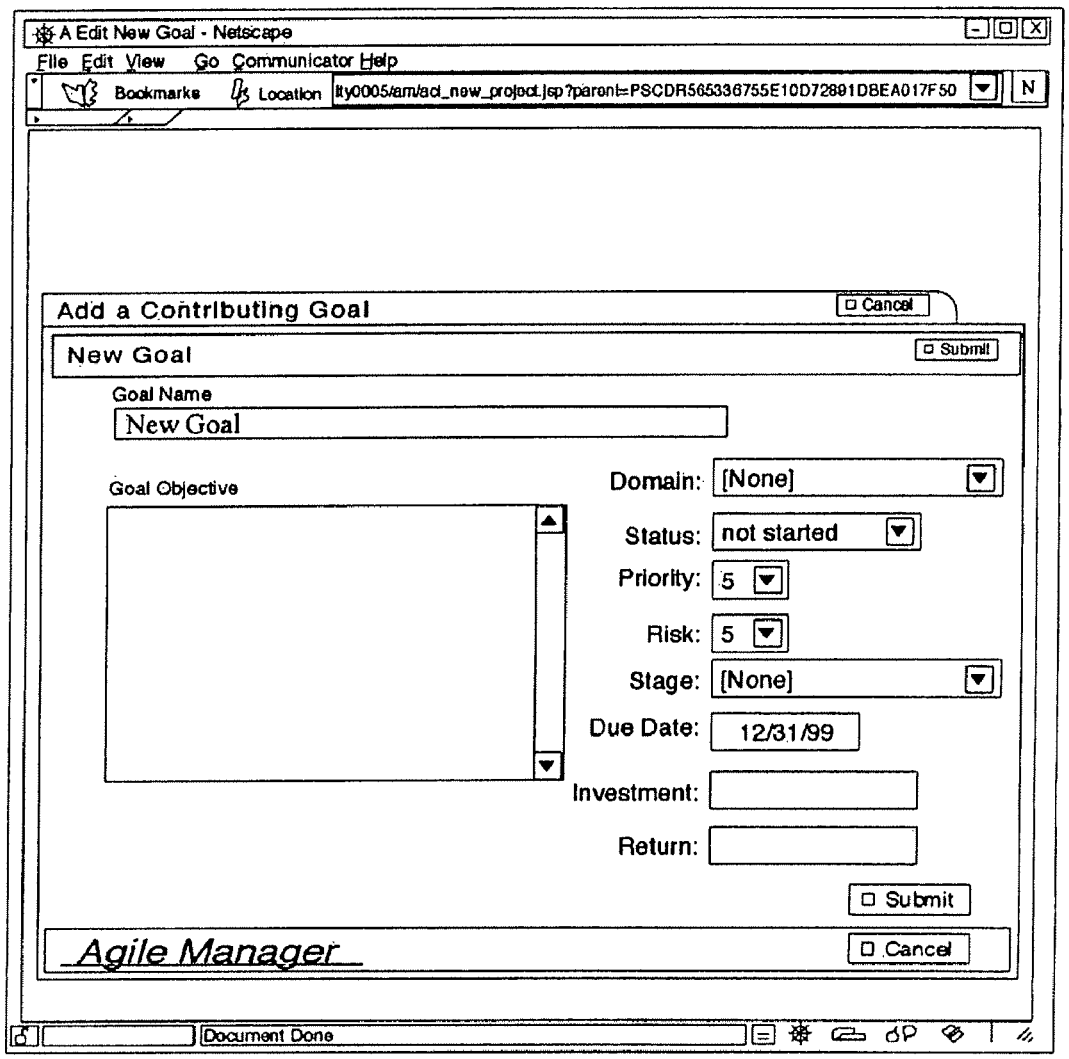
Figure 9:
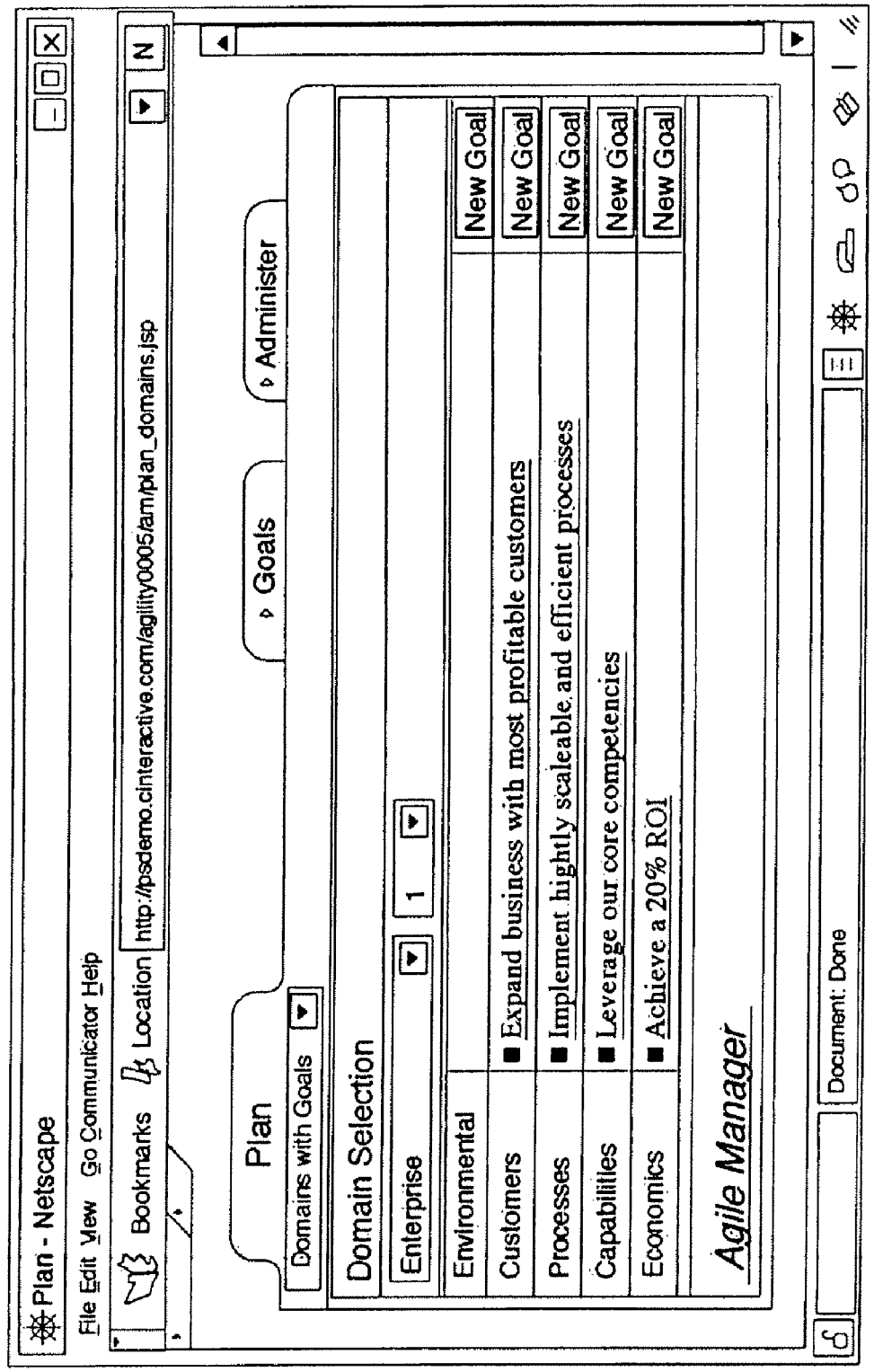

Planning:

The first sequence, for planning, starts with users viewing their domain structure (FIG. 6) and deciding where they want to set a new goal (see FIG. 7). Users can view the domain structure at different levels of depth from the highest level (shown in FIG. 6) to lower levels showing sub-components within each domain (see FIG. 8). If they wish, users can display already existing goals (see FIG. 9), which helps them to understand what's in the current hierarchy, which can help address issues such as whether particular domains are sufficiently active and whether some existing goals may no longer be appropriate.

Figure 11:
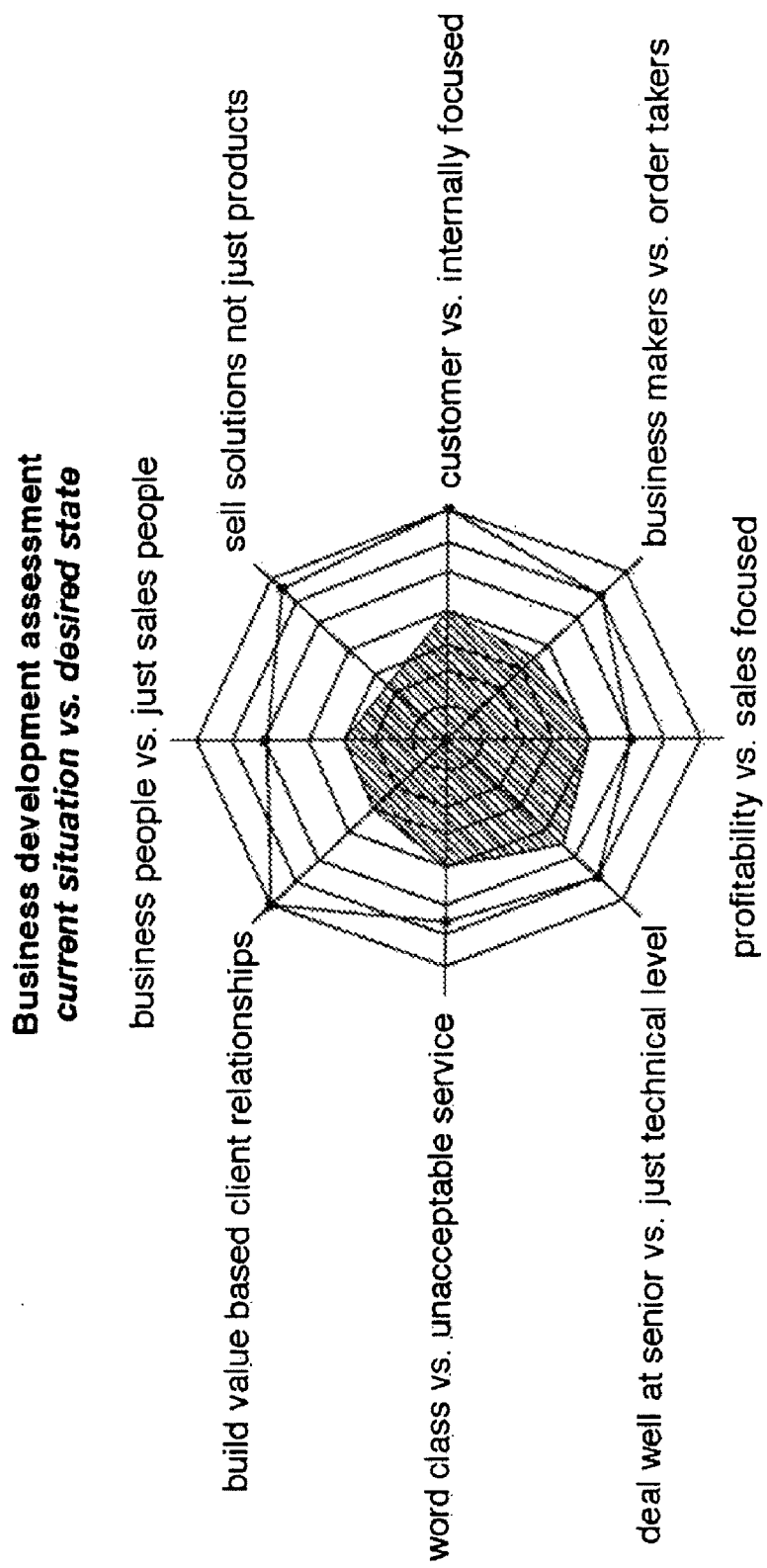
FIG. 11 is a spider diagram produced by the software systems.

Once users have reviewed current activity and debated where the company needs to devote attention to improve future performance, they can select any domain and select an Agile Baseline Mode ("Baseline"). Baseline allows users to critique the selected domain in terms of criteria that The Agile Manager suggests (see FIG. 10), or that they provide or modify themselves. Once the users have agreed on the criteria and reached consensus about both how good the criteria need to be and how good the criteria currently are, the results are displayed in a spider diagram (see FIG. 11). The spider diagram helps to capture the users' assessment of the current situation and to explain why the domain has been selected for developing new goals to be included in the hierarchy. Subsequently, users can return to Baseline to reassess whether improvement goals and projects that have been undertaken have in fact been successful. This reassessment can suggest new gap areas where new initiatives may be appropriate, or indicate that not enough has been accomplished to sufficiently improve the situation.

After exercising Baseline, users may establish a new goal (by a "new goal" button on the domain screens) (see FIG. 7 for the screen that appears when the button is pushed) to improve performance. Once established, the new goal takes its place in the goal hierarchy and management can decide what should happen next.

For example, even if a goal "expand business with the most profitable customers" has been entered, ideas related to the goal have not been entirely fleshed out, resources have not been allocated, plans have not been formulated, and accountability has not been assigned. The goal is without projects necessary to bring about the desired results. To begin to put these projects together, users can use the gap analysis feature to view each domain and sub-domain in terms of how each domain or sub-domain would have to change if the goal is to be achieved. As users identify these changes, they create in effect a vision of a different company that would achieve the goal (see FIG. 12). In this example, two projects or goals to expand business with profitable customers are: to deepen relationships with high net worth clients, and to have profitable products for every segment. Each of these two projects or goals may also in turn be analyzed in the gap analysis process to create other projects or goals that will make them a reality.

Figure 13:
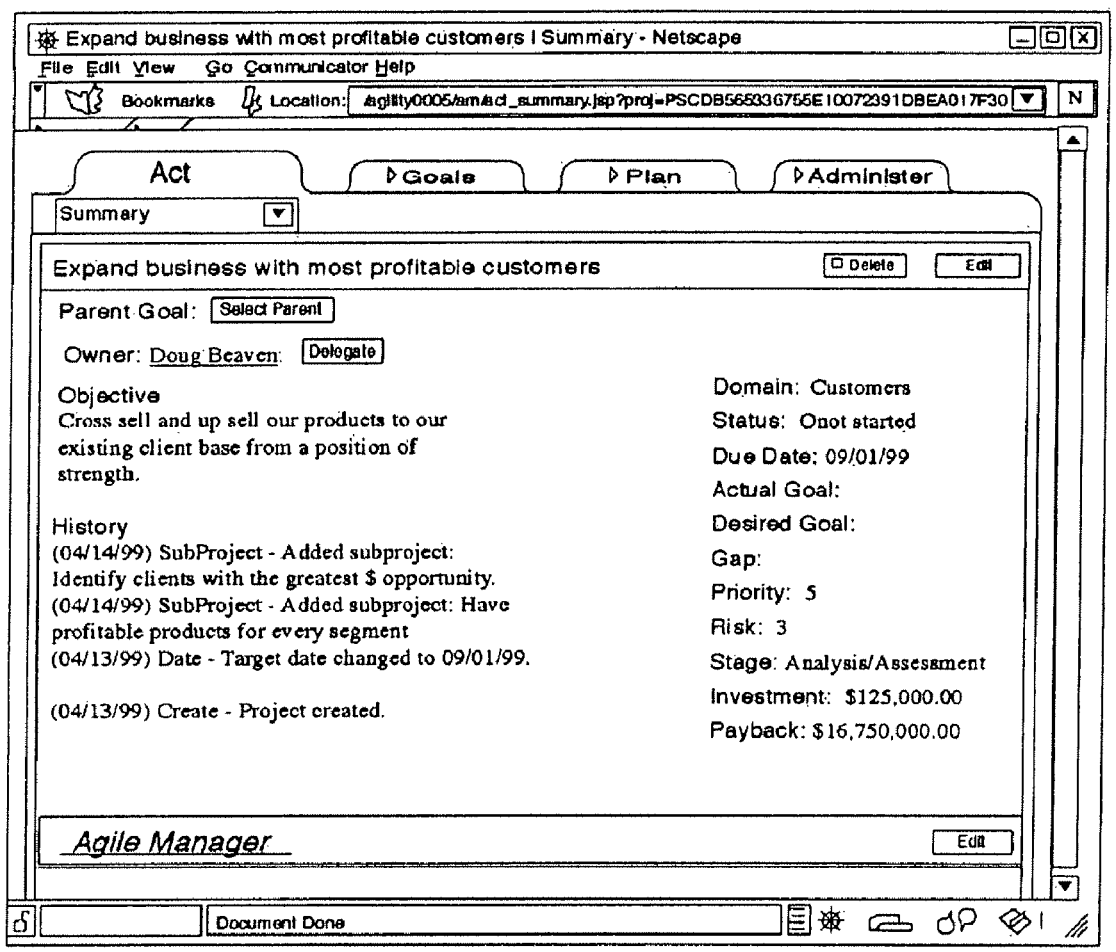

As these projects or goals are defined, they are added to the Goals Hierarchy (see FIG. 3) that provides access to the strategic hierarchy of goals and contributing projects or goals that the company is working on to improve performance. If the user wants to get more information about the new goal or any goal listed in the hierarchy, the user clicks on the goal of interest to get to summary information as shown in FIG. 13 for the goal "expand business with most profitable customers."

In summary, the planning sequence allows the user to update company plans either by starting with a clean sheet of paper and brainstorming a new goal and the projects that would bring it about, or by reviewing the existing hierarchy of goals and projects and deciding whether something is missing; Thus, the hierarchy typically includes a combination of new ideas being considered and maturing goals and projects that are in the process of implementation.

Figure 14:
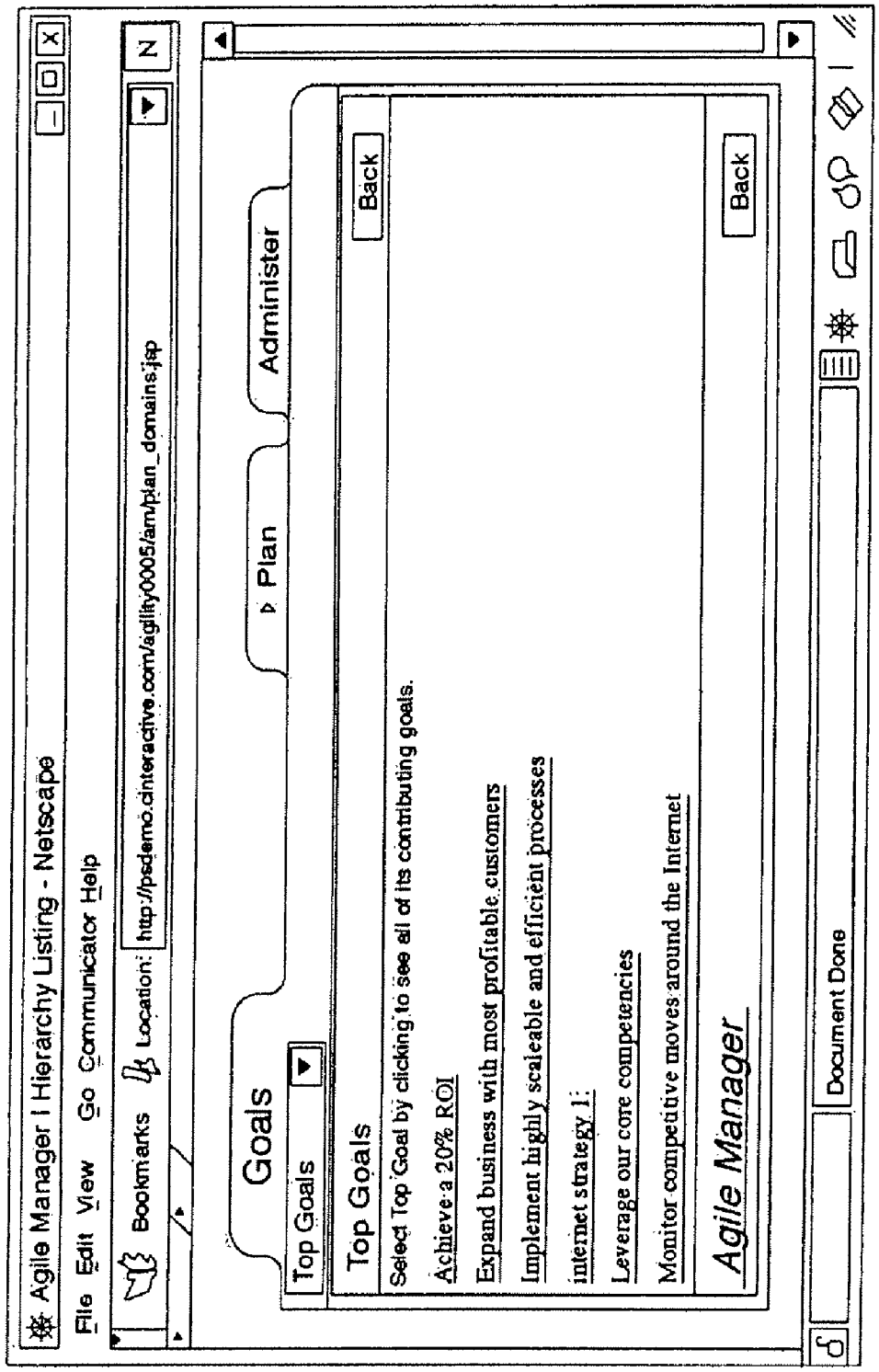

Managing the Hierarchy:

The Agile Manager allows managers to keep the hierarchy of goals and contributing goals in constant view and up-to-date with changing circumstances. The hierarchy can be viewed as a totality of goals and contributing goals affecting the enterprise (see FIG. 3), or can be viewed by top goals (see FIG. 14), depending on the user's interest, or by specific top goal (see FIG. 15).

Figure 18:
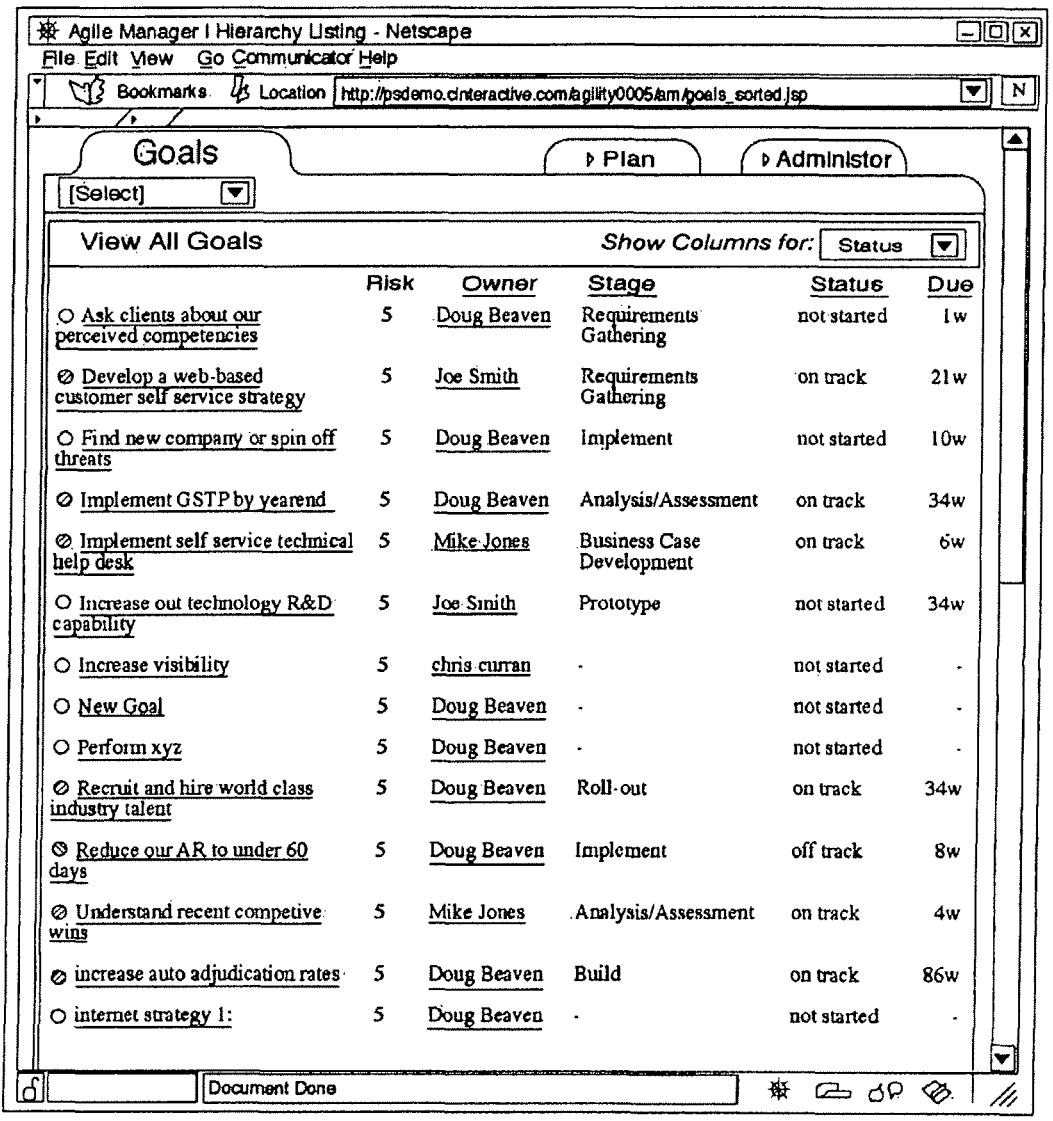

In addition, the user can view the hierarchy against certain types of information that help inform the user about the impact of goals on the business domains (see FIG. 16) or the priority (see FIG. 17) or impact of each of the goals, or about its status, stage of development, or ownership accountability (see FIG. 18). Because these different views are a click away, the Agile Manager supports a dynamic decision making process where discussion can move quickly from strategic to tactical considerations. For example, if the topic is budgets, the user can sort by goal or project cost (see FIG. 17), or by priority or return on investment ("payback") (see FIG. 19) and can be provided with information that can help the user decide where to commit resources based on factors such as benefit and risk. In another example, when managers meet and want to focus on key implementation issues, they can opt to switch to viewing "status" factors and can view goals or projects by status (e.g., on track or in need of attention) (see FIG. 18), which stage each is in (see FIG. 20), risks, or who is responsible. Without the Agile Manager, each view would likely require a special study or report; the Agile Manager makes these different views available at a moment's notice. In addition, managers who want to explore any goal or project in more detail can click on the goal or project of interest and get more information. Similarly, managers who see something missing while reviewing the overall hierarchy can select "new goal" from the menu and enter a new goal or project (see FIG. 21).

Figure 23:
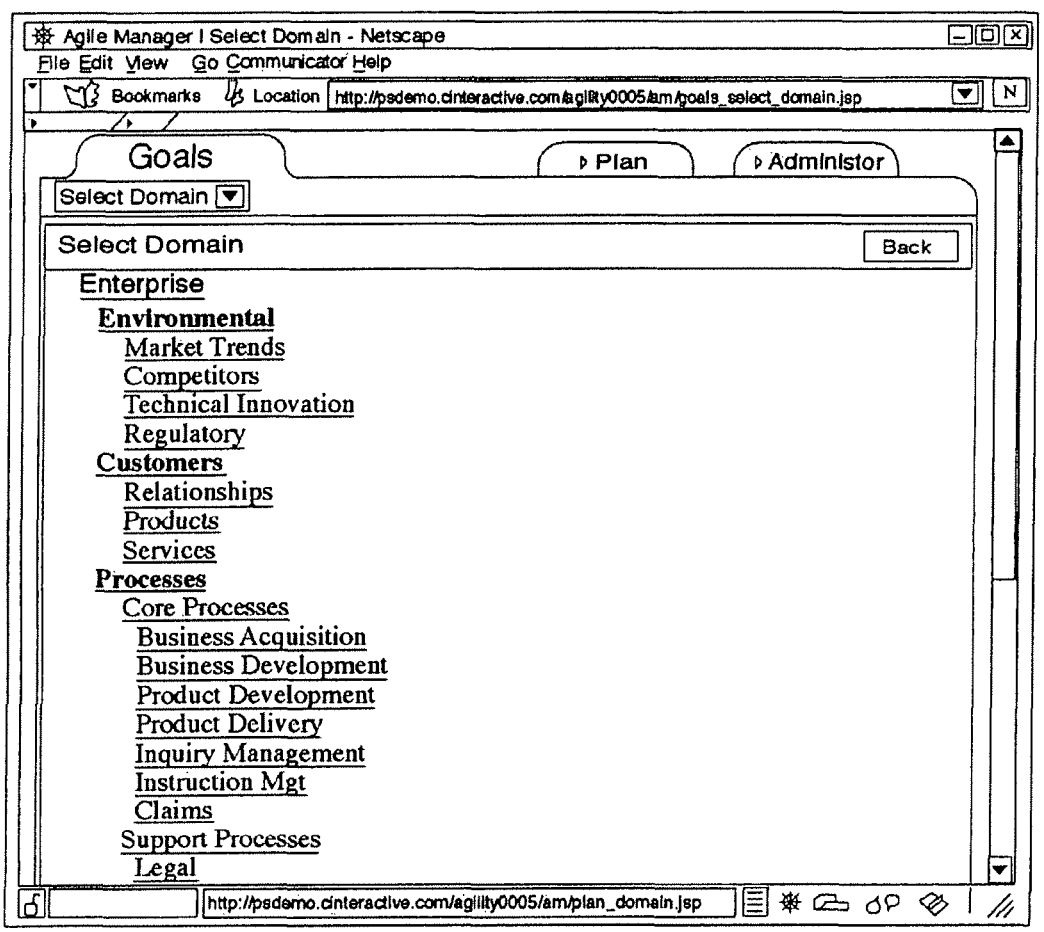
Figure 24:
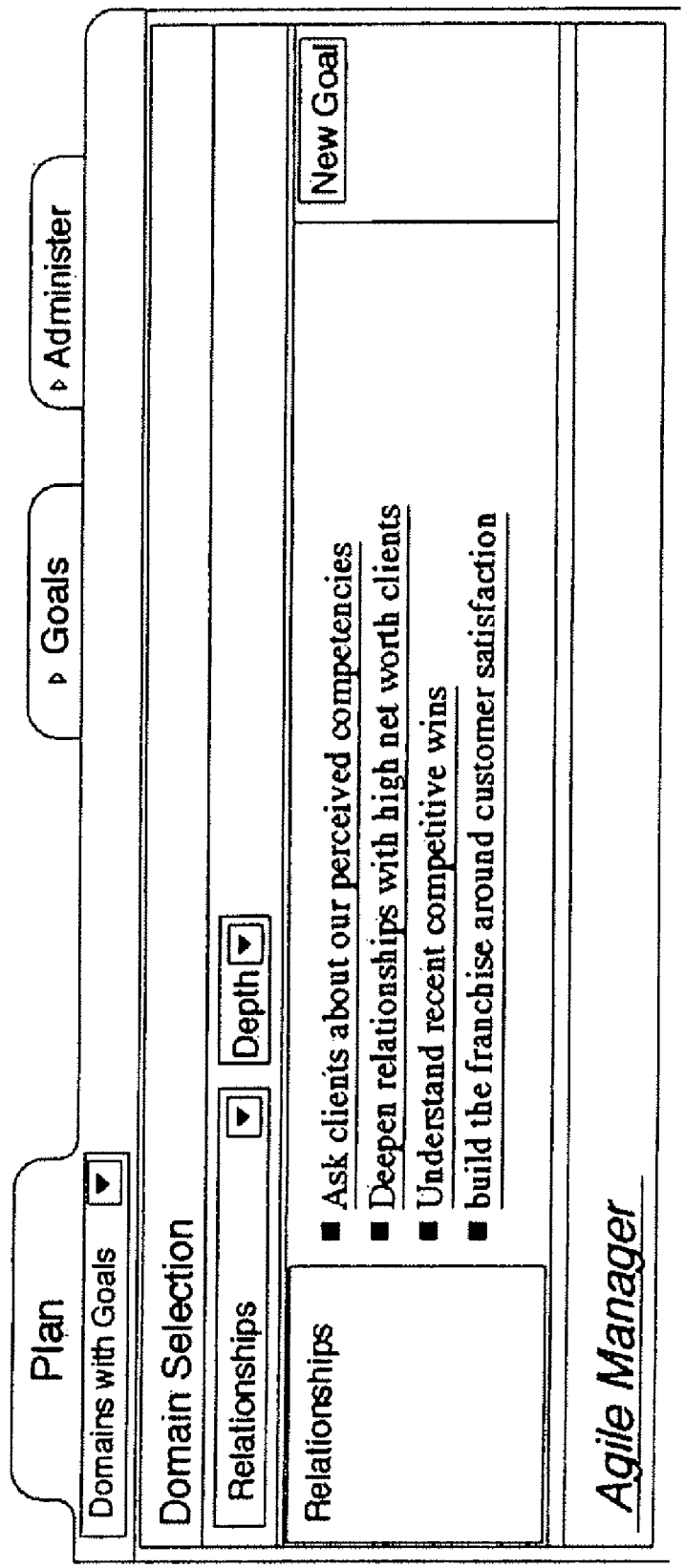
Figure 25:
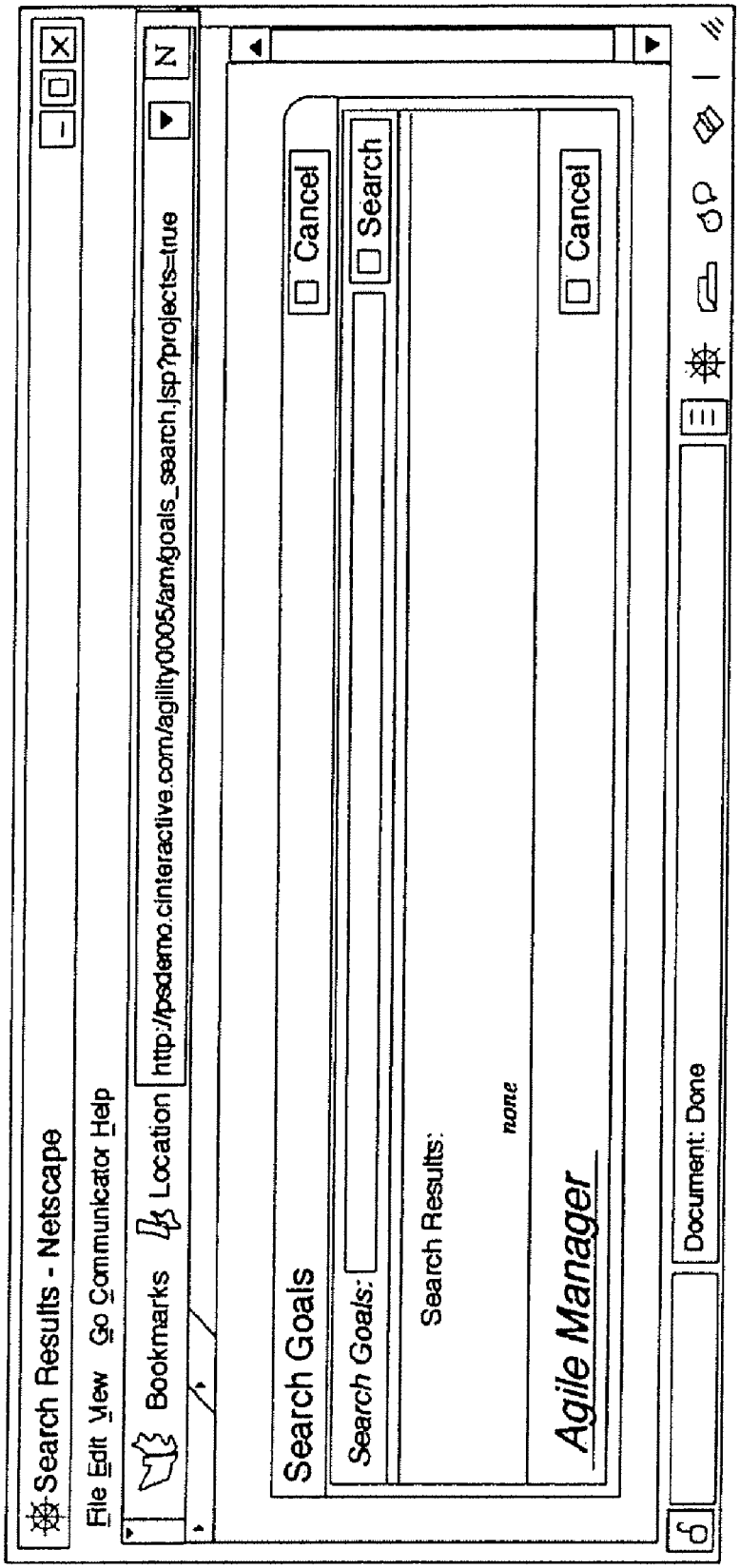

In at least some embodiments, an especially important view managers can use to manage the hierarchy is a view in which the goals and projects are sorted by domain. This view can be produced for any of a number of levels, e.g., for the entire hierarchy (see FIG. 16) or for a selected goal in isolation (see FIG. 24). A purpose of this view is to allow managers to understand quickly what initiatives are underway or will affect an aspect of the business. For instance, if a question arises regarding what is being done about market trends, managers can click on any topic on the domain structure (e.g. customer relationships) (see FIG. 23) and see immediately what initiatives are underway related to this topic (see FIG. 24). Users can also execute searches by name or word in the title of a goal or project (see FIG. 25), and can put Alerts in place (see FIG. 26) that will flag changes that occur in goals or projects previously indicated as being of particular interest (see FIG. 26).

Figure 27:
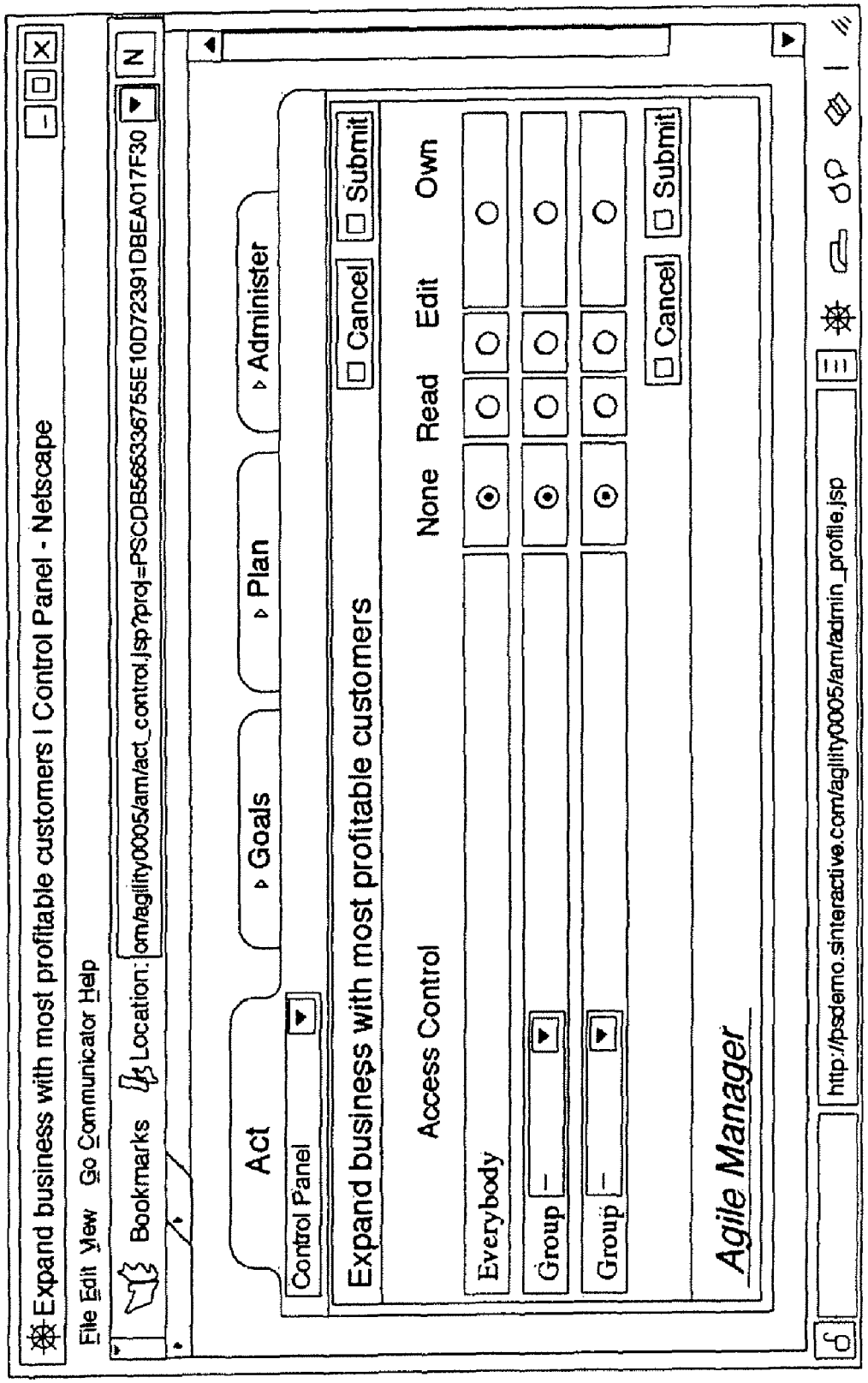

Executing Goals and Projects:

A major purpose of the Agile Manager, in addition to planning and managing the overall portfolio of goals and projects (i.e. the hierarchy), is to help managers accelerate implementation progress related to a goal and its contributing projects. A user has an array of choices to view when reviewing the progress of a selected goal. (The choices available depend on the permission that is granted by the Owner of a Goal to different types of users (see FIG. 27)).

Figure 28:
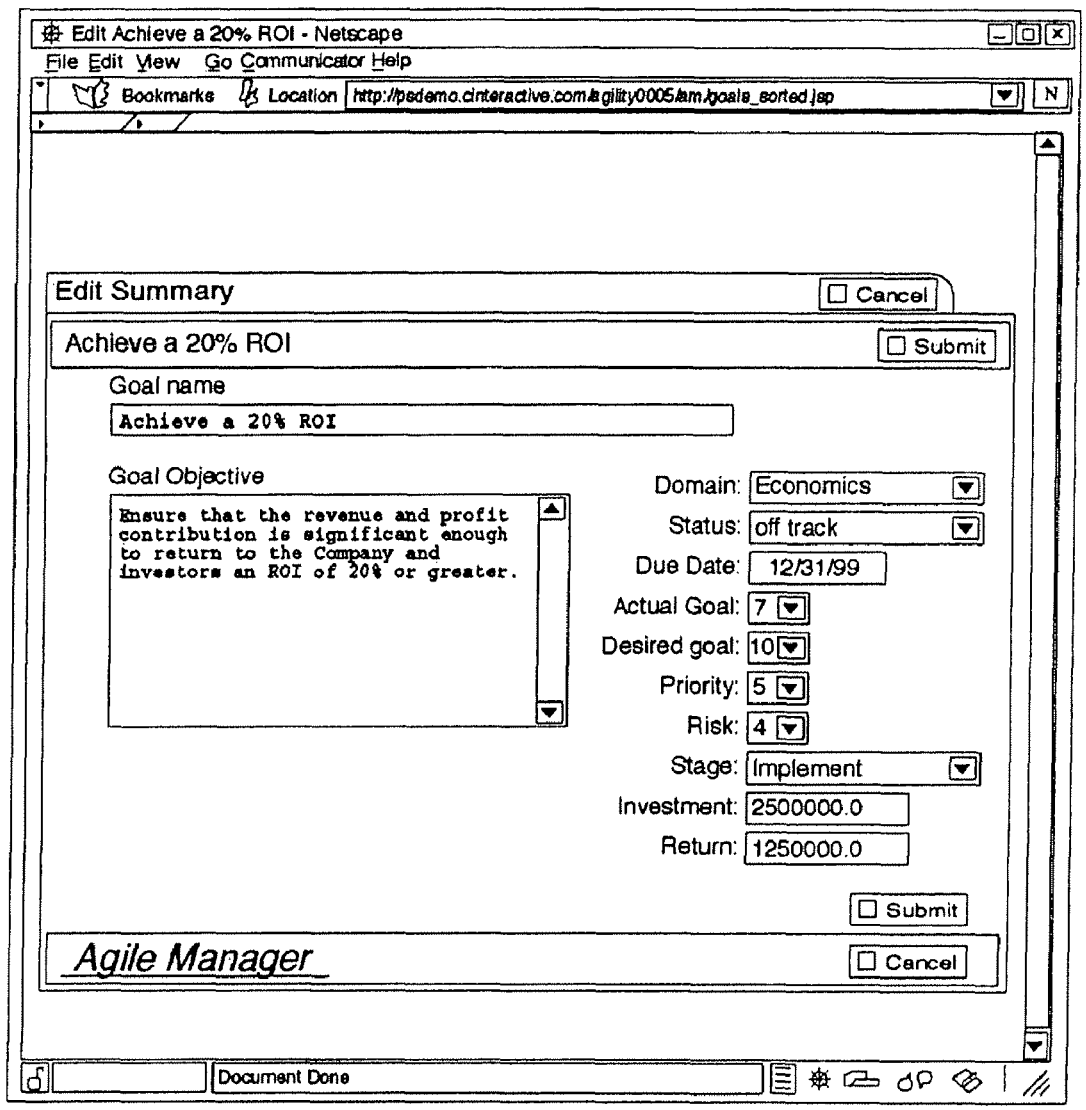
Figure 29:
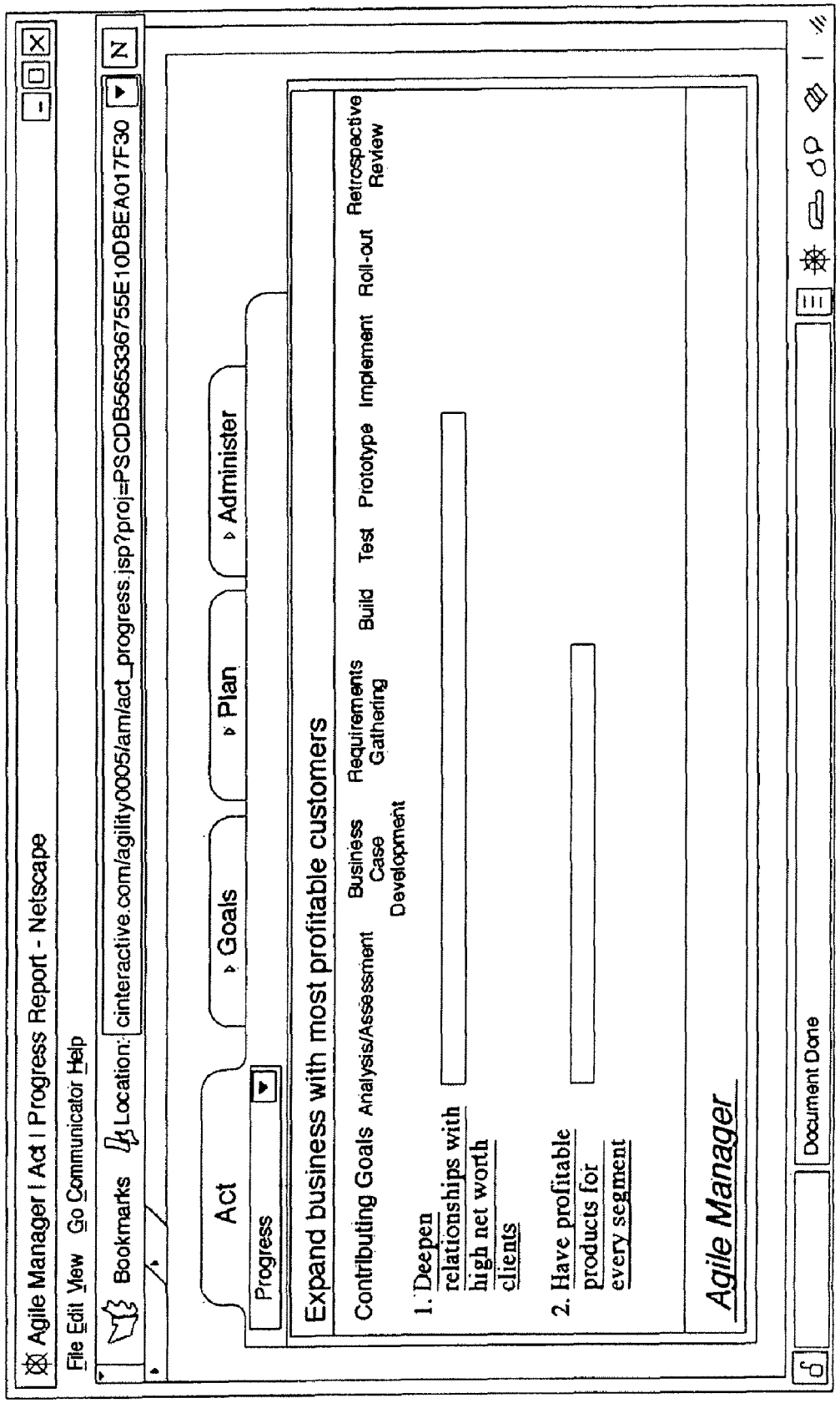

A "summary" page (see FIG. 13) contains information about the goal itself that can be edited (see FIG. 28). Other main views for helping to manage include "progress" (see FIG. 29) that displays the contributing projects or goals that must be finished or achieved before the parent goal can be fully accomplished. The "progress" view allows managers to view progress for the contributing projects side-by-side to determine whether the projects are properly synchronized or are out of phase with each other.

Figure 30:
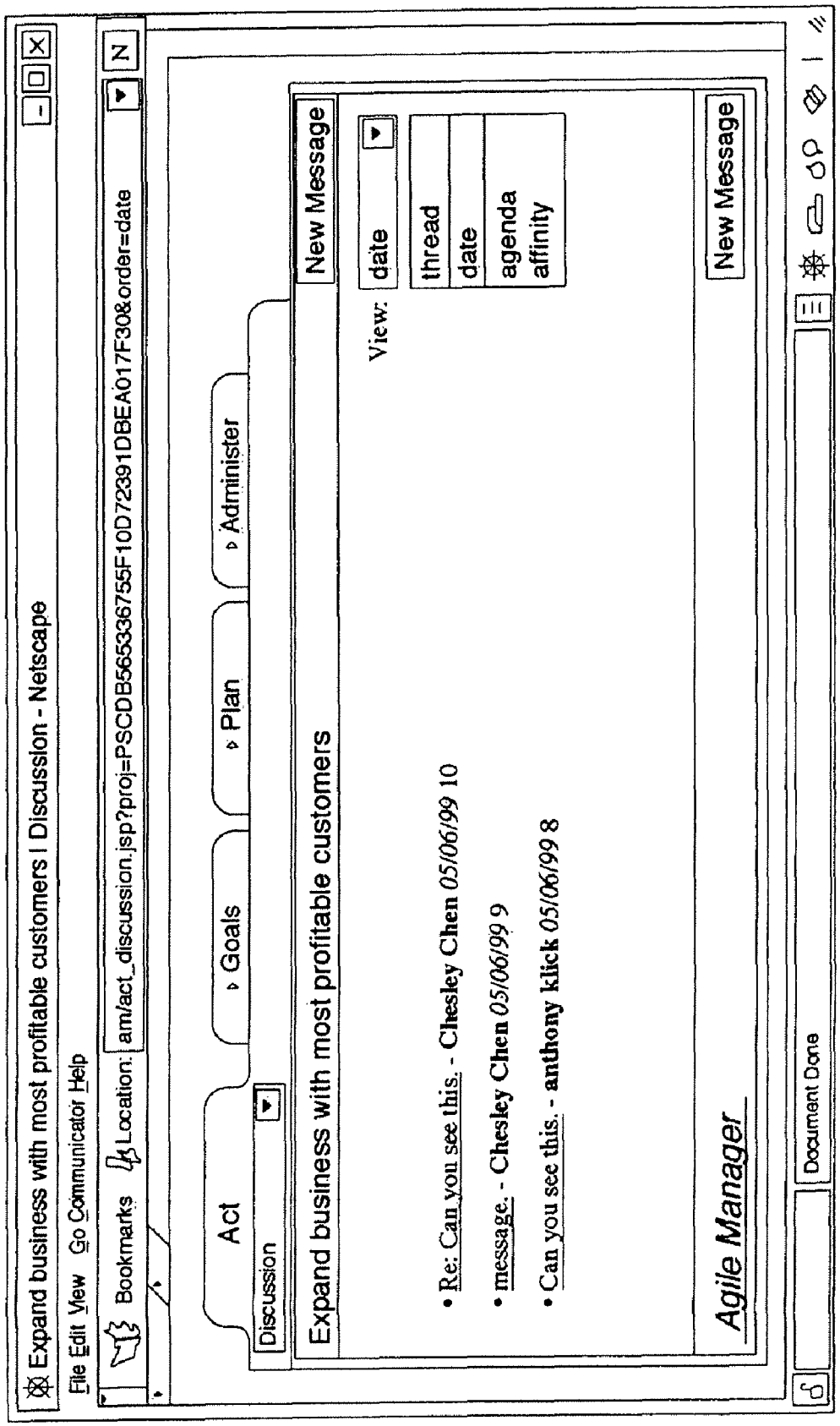
Figure 31:
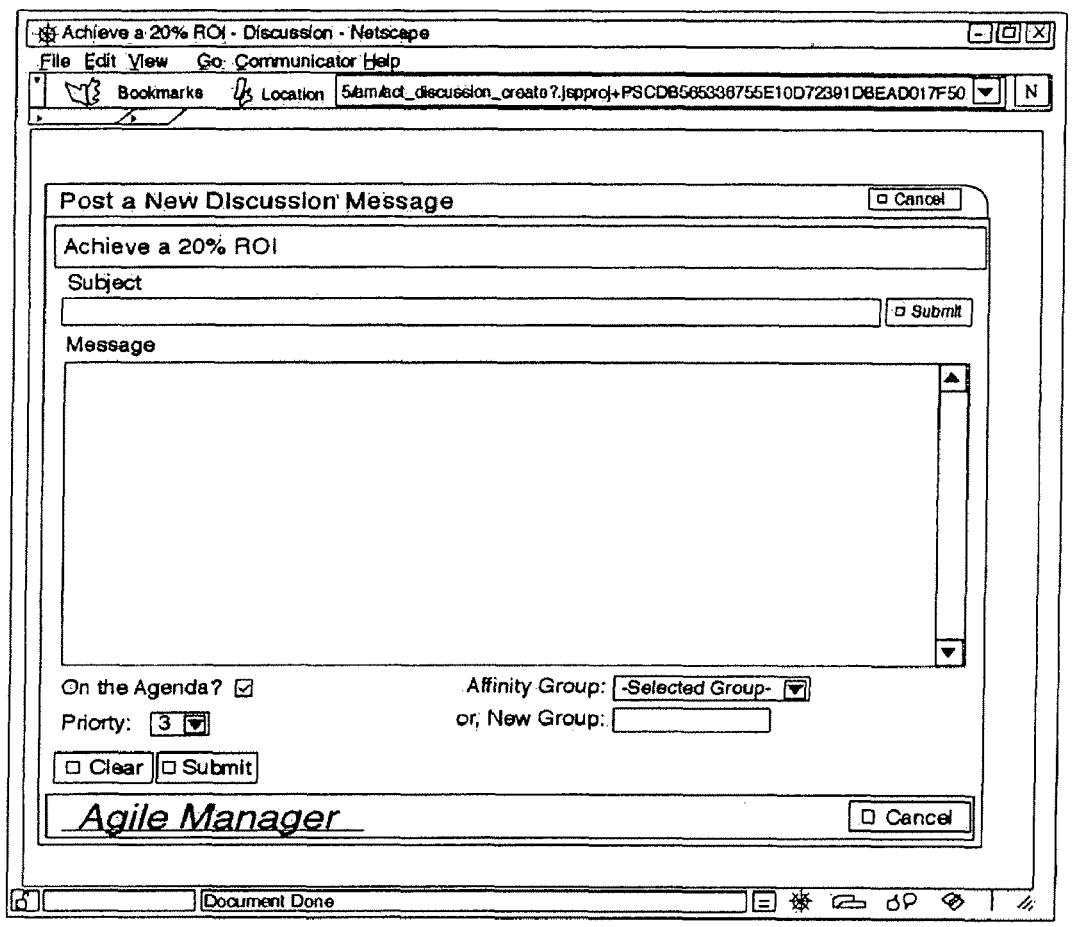
Figure 32:
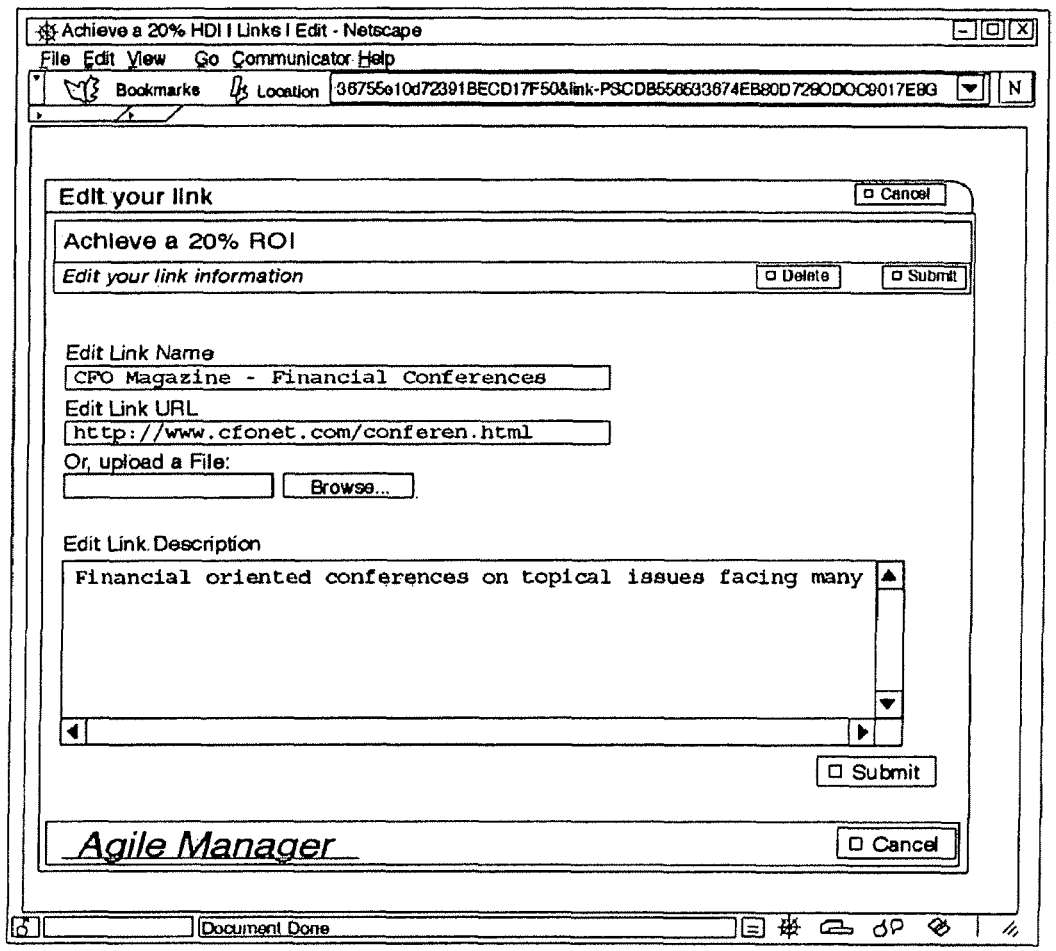
Figure 33:
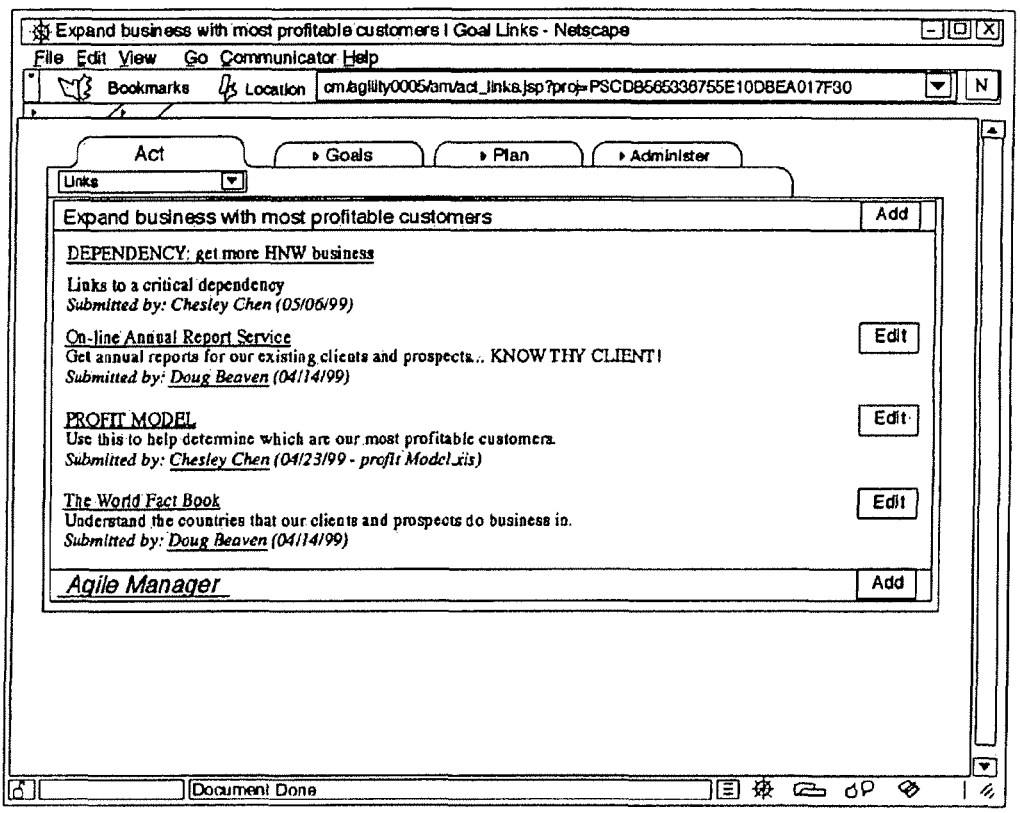

Other features are useful for managers and teams executing goals and contributing projects. A "discussion" feature (see FIG. 30) allows a user on the system to communicate directly about, and in the context of, the goal or project of interest. The owner of a goal can also select a particularly important part of the discussion and put it on an agenda (see FIG. 31). Another useful feature includes an ability to link to internal and external sources of information that goal or project teams believe are important to make accessible to users involved (see FIGS. 32 and 33). The links provide a practical application of knowledge management because the links allow teams to place information effectively or actually one click away so users can get at the information without excessively disturbing the state of the software. For example, users can hot-link to and open a detailed Microsoft Project plan if the plan is useful to the discussions. Users can place Word documents related to the goal where the documents can be found, and open the documents when needed. Similarly, users can link to Web sites of outside consultants or suppliers that may be related to the goal at hand. In this way, users can start using the software through the domain structure, find out the relevant issues, and access relevant knowledge context sensitively along the way.

The above sections have laid out a description of Agile Manager and the Agile Baseline module. In addition, the Agile Manager includes the Agile Company and Agile Know-How modules.

Figure 34:
Figure 34A:
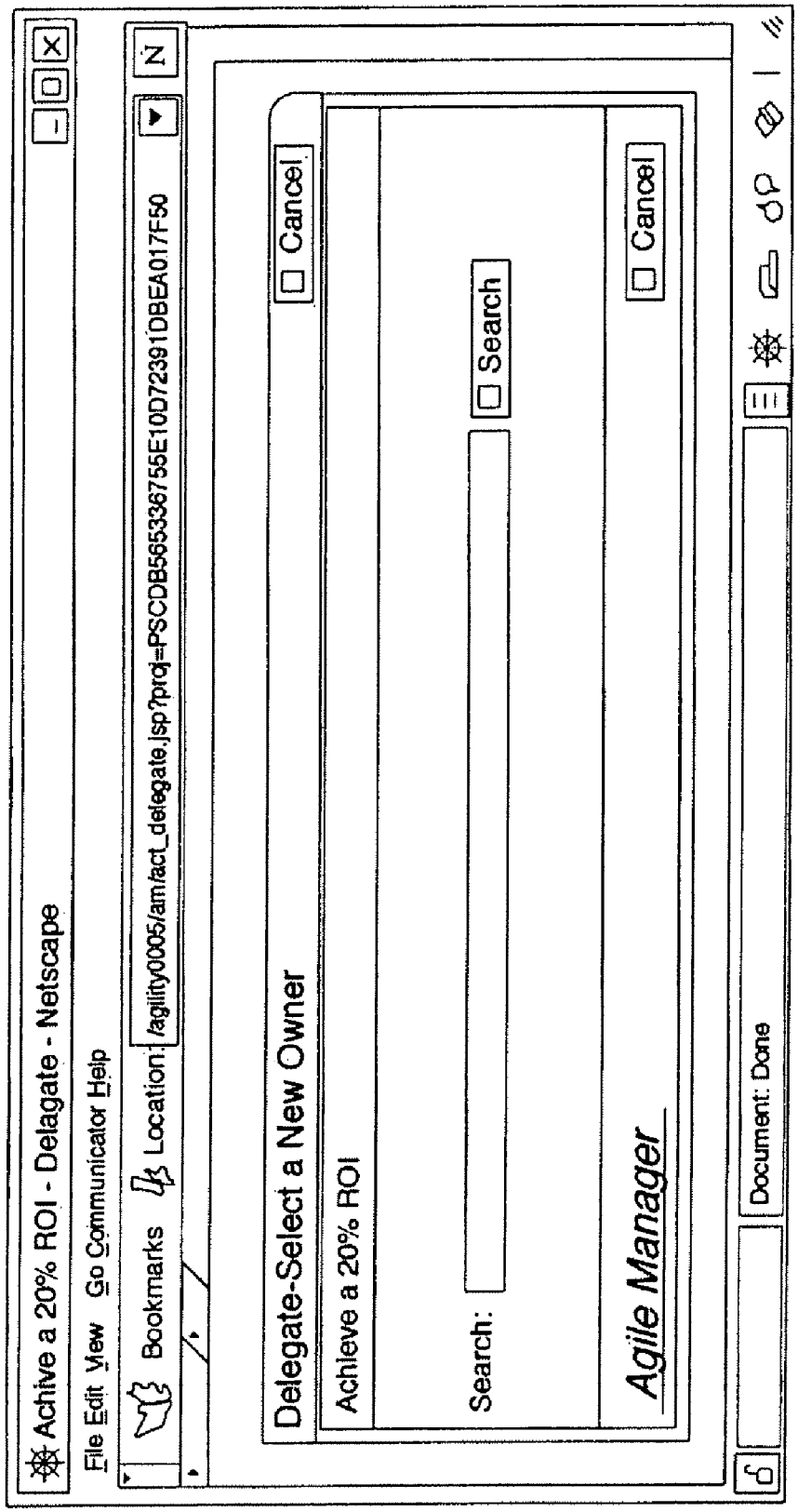
Figure 36:
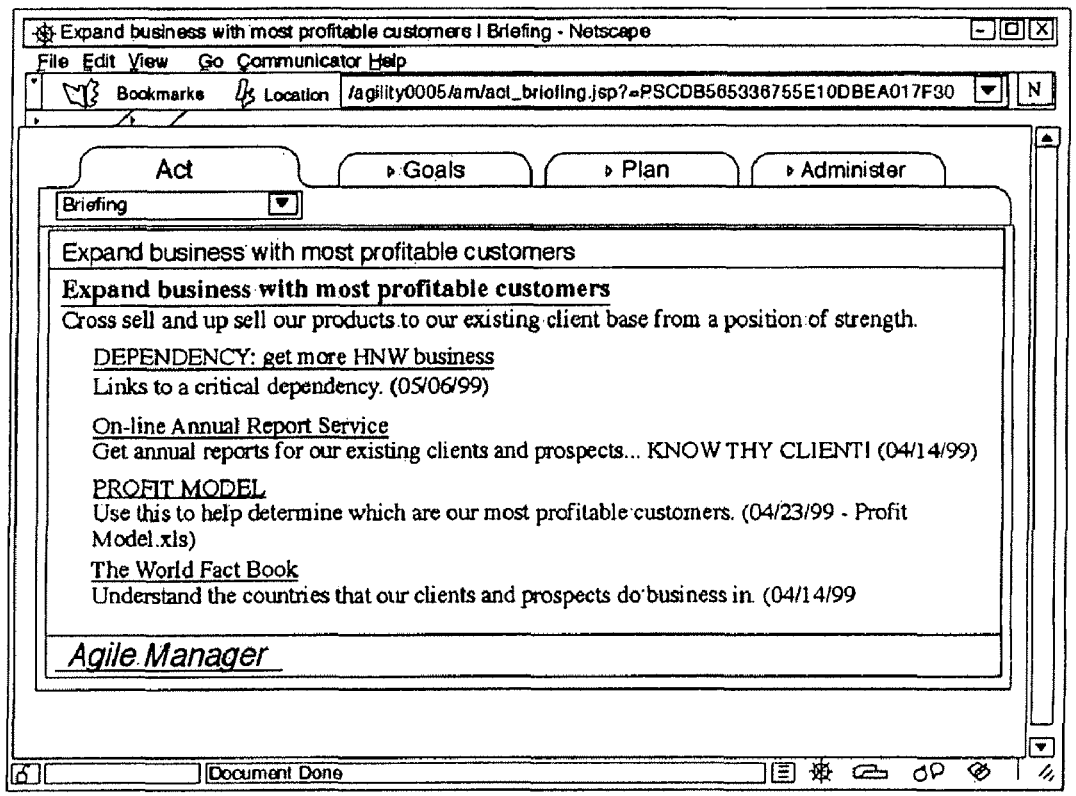

The Agile Company can be added to or made accessible from the Agile Manager and provides a survey that employees can take to assess how well the company or organization is managed in view of high performance criteria. The Agile Company software can be downloaded onto the client's server and a user on the network can complete a questionnaire of multiple pages, such as 20 pages, (exemplified in FIG. 34) and then the software can tabulate results to show strengths and weaknesses for sample analysis. The Agile Company also has templates that can be made available to help clients get started with a change program designed to improve specific high performance traits. The goal "expand business with most profitable customers shown in FIG. 36 is set up with such a template.

Agile Know-How links users to excerpts of publications about topics relevant to the goals and projects in which they're involved. For instance, the user can stipulate concepts, such as leadership, and specific aspects of the concept, such as senior leadership, and the kind of information needed, such as understanding the concepts, or how to be a good leader, and then get excerpts that match the needed information. In this regard, the Agile Manager enables an organization to use the Agile Manager as a single source for not only information about strategic initiatives but also knowledge available inside and outside the organization that can help make the organization more agile.

The Input Screen and Process Flows Include:

The Goal Hierarchy Screen is the default screen (see FIG. 3) and an important navigational screen for accessing details about any single goal or initiative, or accessing various views. Once the goals and contributing projects have been loaded, the default screen presents a goal hierarchy and can be used as follows:

Hierarchy: the left side of the screen presents an outline the top section of which represents the organization's strategic implementation plan, i.e., in which the top level statements represent strategic goals that are the highest level organization goals, and the next indented level statements represent contributing initiatives that are indicated as having to be completed for the strategic goals to be achieved. A user authorized to see the portfolio view can see where the organization wants to go and what it will take to get there, with the goals and projects associated together in one spot.

Unassociated Goals: the goals and initiatives under this heading are indicated as being either no longer relevant strategically or not yet placed in the hierarchy.

Functions from this screen: If a user is unhappy with the placement of a goal or initiative or wants to adjust attributes of the goal or initiative, the user has only to click on a goal or initiative listed to retrieve its related information. For example, a click on the initiative takes the user to a summary screen (see FIG. 13 for example) for this initiative. The following information fields are available for any goal or initiative:

Heading: the entry shows the name of the goal or initiative for which basic information is displayed on this screen.

Owner: this entry lists the name of the person responsible for implementation of the goal or initiative and authorized to edit its related information.

Parent Goal: this entry lists the name of the goal or initiative immediately above or superior to the initiative that is active. An advantage of showing the parent goal is that a user working on the initiative is instructed that the initiative is contributing to the parent goal.

Objective: this entry shows the objective of the initiative so a user is instructed as to what the initiative is specifically to accomplish.

History: the entry maintains a running log of changes made to the initiative, and indicated by whom and when. Here is recorded when the project was created and when delegated to the current owner. The changes are monitored by the computer so that the user can identify which changes the user wants to have flagged automatically when they are made (see View Alerts below).

Status: this entry identifies the category such as "on-time," chosen to summarize the status of the goal or initiative's progress, so that the user can determine at a glance whether the goal or initiative is in need of attention. The categories listed here can be modified to fit each client situation when an edit mode is selected. Due Date: this entry indicates the date by which the initiative is to be achieved.

Priority: the benefit entry presents a numerical score from 1 (lowest) to 5 (highest) based on user judgment about the relative value of the initiative or goal in terms of improving the business results. For example, the goal may be rated 3 of 5, i.e., average. An advantage of a simple rating is that users can quickly understand the rating scale and then discuss specifically the reasons behind the rating.

Risk: this field presents a 1 to 5 numerical score that indicates a risk level for the goal or initiative, such as that the team is new, that the technology is untested, or that the market is new. By keeping track of risk, managers can work proactively to reduce risk and thus increase the probability of a successful implementation. In addition, when there are resource constraints, decisions about which initiatives to continue to pursue may depend on a combination of benefit scores and risk scores to indicate how much managers can count on achieving the initiative and having a positive impact on the business. For example, with a priority score of 3 that is lower than a risk score of 4, a question might be raised about whether to continue to fund the initiative if there are other initiatives that have better benefit/risk characteristics.

Project Code: (not shown) this field allows an alphanumeric identifier to be assigned for administrative purposes.

Stage: the stage field shows where in the project life cycle the goal or initiative is so that a user can keep track of how the goal or initiative is progressing and what remains to be done. For example, the initiative shown is in the "start up" stage. In the edit mode, several stages are displayed from which the owner can pick one that is descriptive of the status of the initiative.

Investment: this field captures the cost of or investment in each particular goal or initiative so the user can readily access financial information related to decision making and priorities.

Payback: the payback field refers to the economic return anticipated for achievement of the particular goal or initiative. In conjunction with the investment field, the payback field can allow a ratio of return on investment to be produced, which ratio may play a key decision making role in an assessment of the relative value of one initiative versus another.

Rank: (not shown) this field is available for formulas developed for each client for calculating the ranking of each goal and initiative, including the combined values of initiatives contributing to a particular strategic goal.

Score: (not shown) the score field relates to a unique calculation of the cumulative value of each goal and initiative based on weighting techniques appropriate to the user (e.g., alignment with corporate values, brand, payback, competitive position, management attitudes). Both the rank and score fields are provided to help users prioritize goals and initiatives in the portfolio.

Edit button: when a user clicks on the edit button, the user is taken immediately to the Basic Goal Edit screen (see FIG. 28) which allows the authorized owner to modify the basic information about the particular goal or initiative that has been selected. The Project Name and Description fields are for text, the Due Date is for calendar completion date information, and the other fields such as domain, status, benefit and risk priority, and stage present pop-up menus. When changes are submitted, the changes are automatically accessible to whoever uses the system and are captured in the history log.

Figure 35:
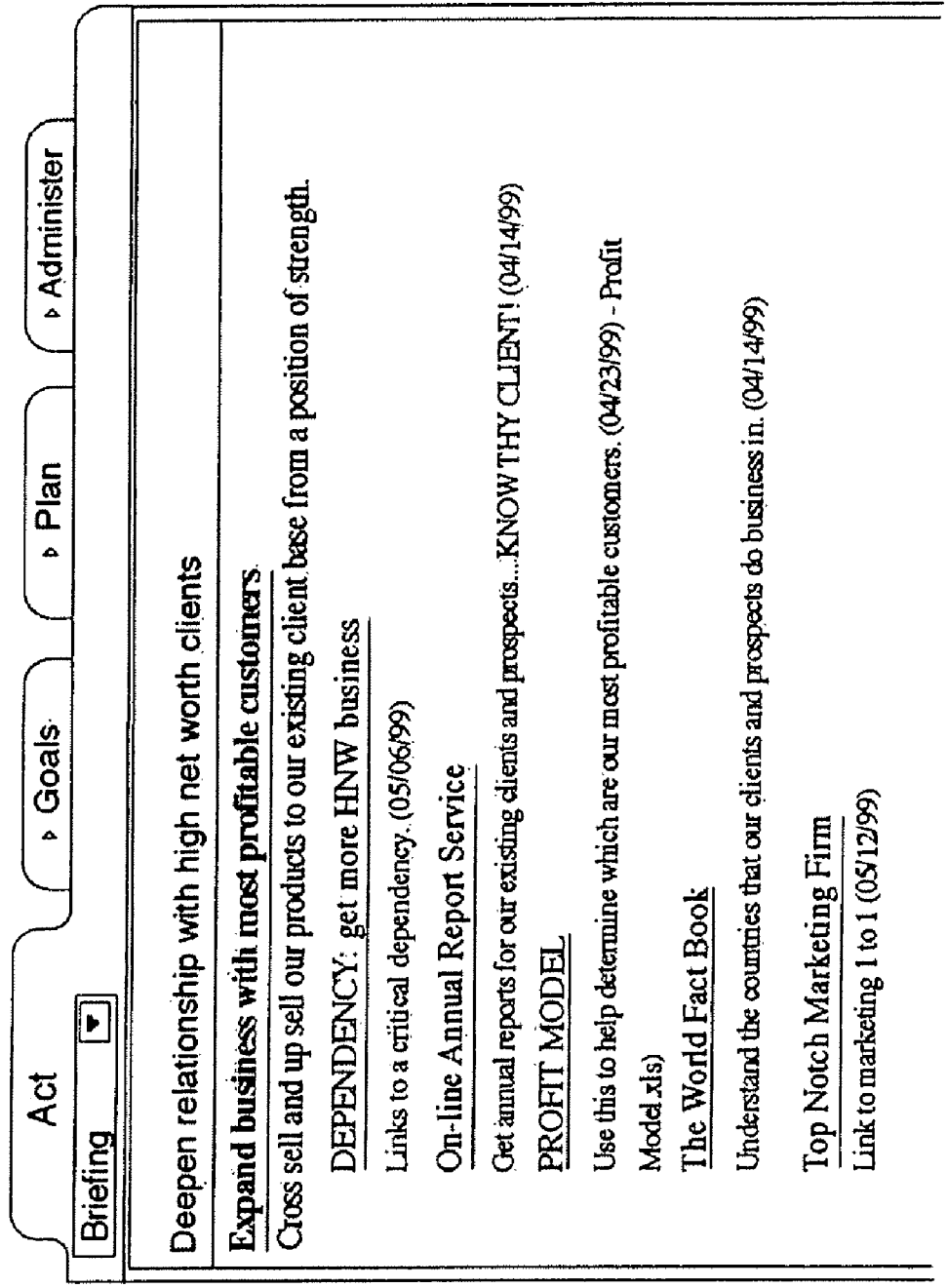

Delegate button: this button allows the user to designate or redesignate the individual who is the owner of the goal or initiative by going to the Delegate Screen (see FIG. 35) and searching through names of candidates to whom responsibility can be delegated.

Delete button: when this button is selected, the user is automatically asked whether the goal or initiative is to be deleted and, if so, the goal or initiative is deleted and archived in case subsequent retrieval becomes necessary.

Project Menu: this pop-up menu lists the choices of views the user can access from the Basic Goal Info Screen as regards the active goal or initiative that has been selected. The view choices include the following:

Control Panel: when this choice is made the user is presented with the Control Panel view (see FIG. 27) and can review the permissioning rules. If the rules are satisfactory, the user can retreat and proceed along another path. If the rules need to be changed, the user clicks the edit button and is presented with another version of the Control Panel that can be edited and submitted. Only the authorized owner is able to make changes.

Figure 37:
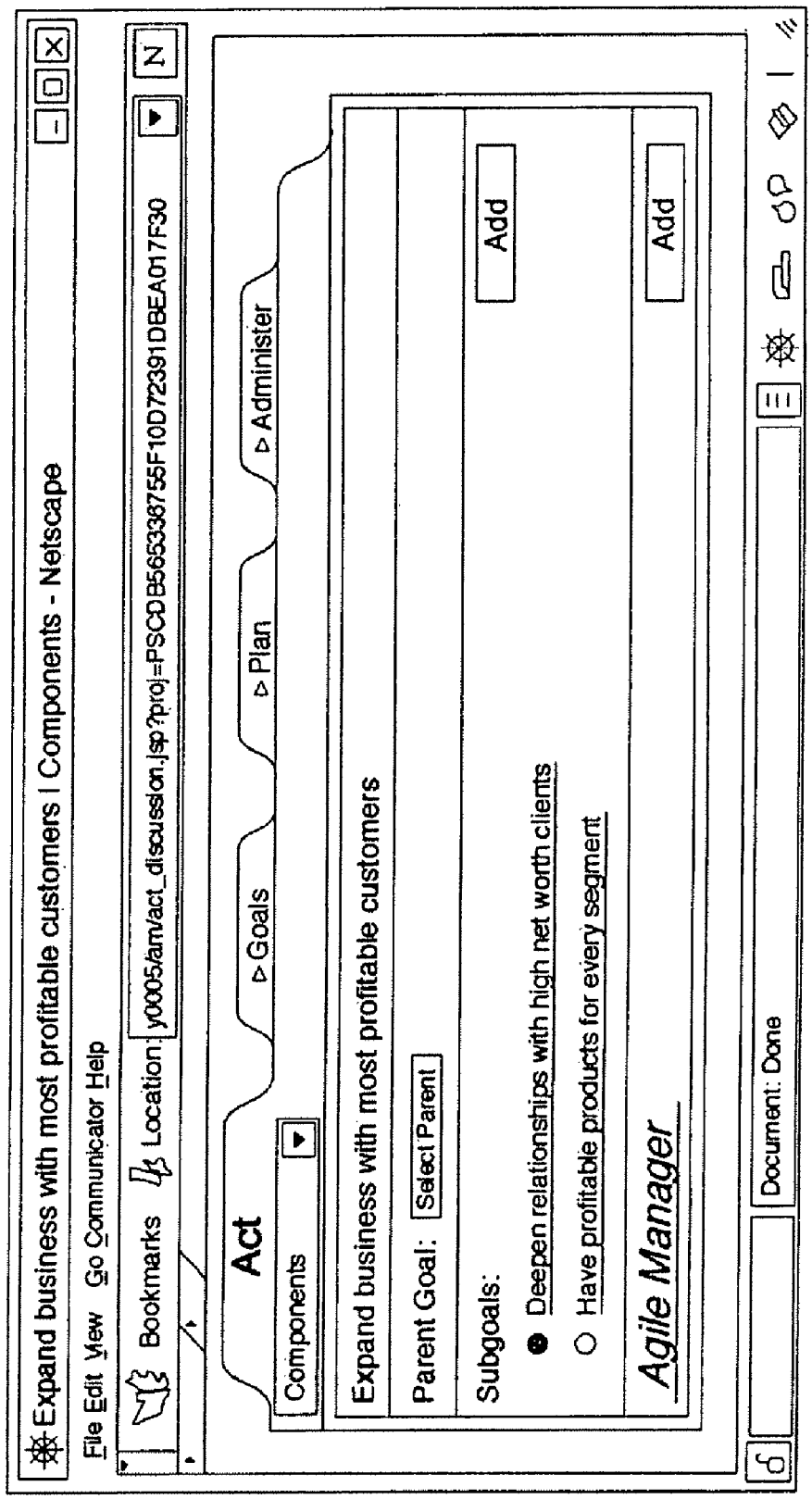

Project Briefing: if the user wants to understand better how the active goal or initiative relates to the parent goal, the user can click on this choice and will be presented with the Project Briefing screen (see FIG. 36). Here salient information is displayed from the Objective field in the basic information related to the selected goal (see FIG. 37). In addition, sources of knowledge that may be helpful to access are listed so that the user can hot-link to them if need be. In a typical embodiment, this screen cannot be edited and is just a view.

Figure 38:
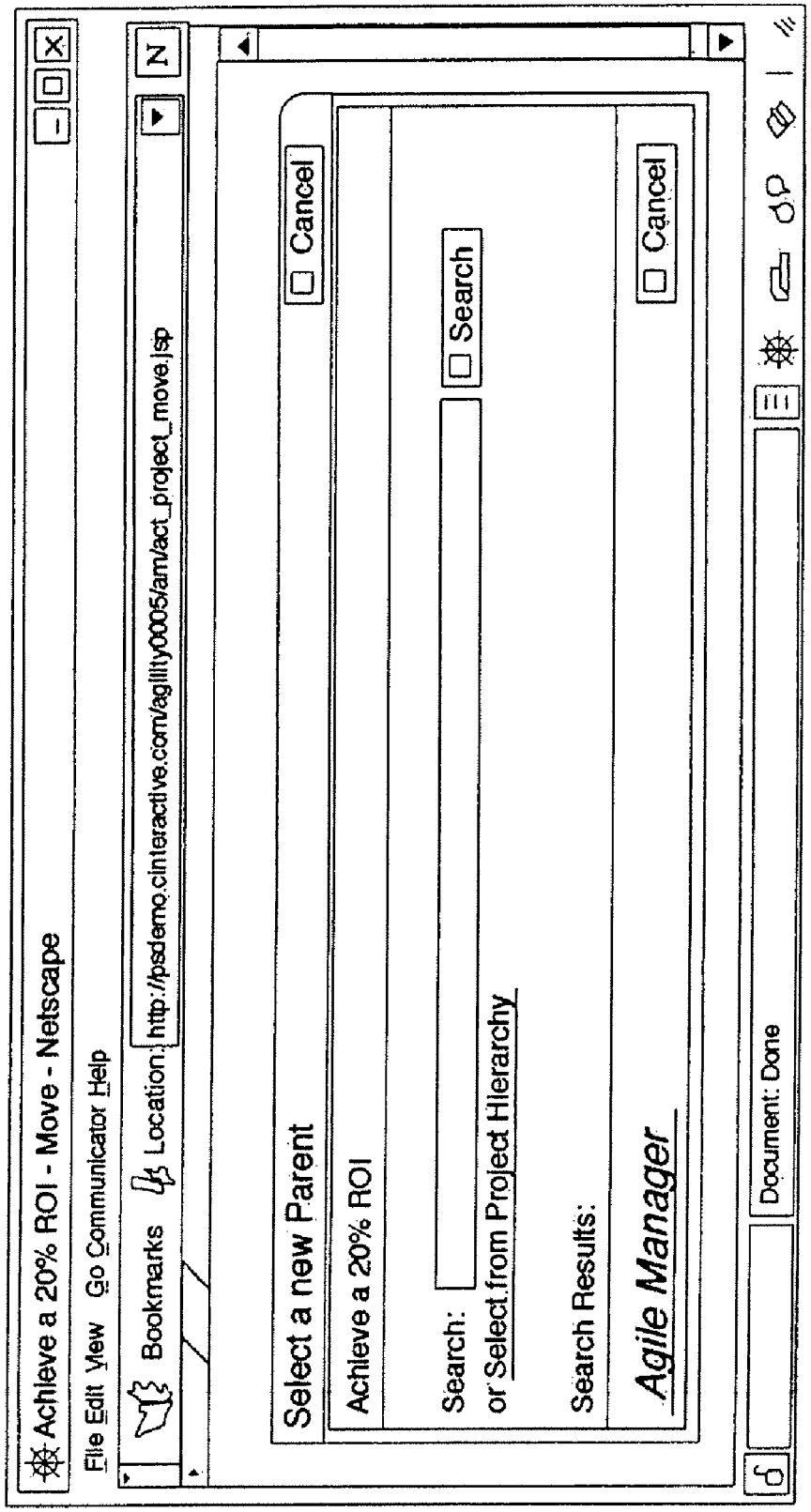
Figure 39:
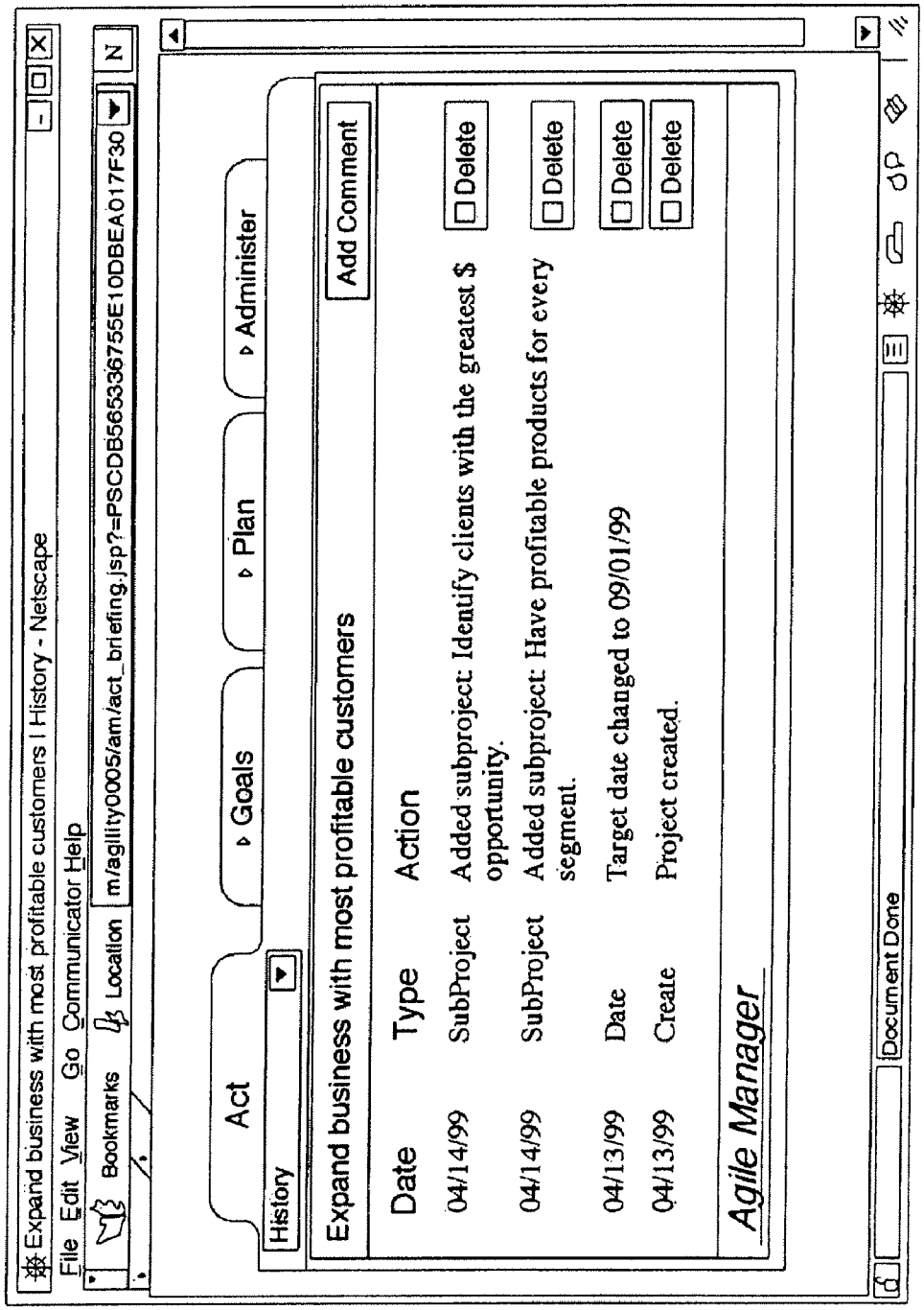

Goal Components: when the user makes this choice, the user is presented with a Goal Components screen (see FIG. 38) and, in a typical embodiment, views only the contributing goals that are related to the parent goal. From this screen the user can access different functions including:

Select Parent: when the user wants to change the position of an initiative in the hierarchy, the user clicks on this button and is taken to the Select New Parent screen (see FIG. 39). On this screen the user can either search for the new parent goal or initiative if the user knows its name, or click on "Select from Project Hierarchy" and be presented with another screen that lists the hierarchy. The user then selects a goal or initiative as the new parent, and when the user clicks on this selection, the original initiative is associated with the new parent and shows up so associated in the hierarchy.

Add SubProject: when the user, wants to add a new subordinate initiative with which the user is working, the user can use the "add" button to view New Goal screen (see FIG. 7) and enter information about the new initiative using the standard template. When the information is entered, the new initiative is placed appropriately in the hierarchy.

Add Milestone: this button allows the user to flag and define major milestones in the initiative, which can be useful for adding more detail if appropriate for monitoring significant targets. The Create Milestone screen allows the user to name and define the milestone and to set a finish date and status.

Project History: this button takes the user to a display of project history (see FIG. 40) that shows when changes were made, from creation of the initiative to modifications to any of its attributes. This history can be very valuable for tracking key events in the life of a goal or initiative for analytic or other reasons. From this screen the user can also add comments to explain particular events, or add new events.

Links: this button takes the user to a view (see FIG. 33) of the links to any knowledge sources that the initiative team has chosen to put here so that the knowledge sources will be accessible to any members when necessary. An advantage of this facility is that with the domain structure linked to goals and initiatives and with knowledge linked to the goals and initiatives, the organization is provided with a clear and natural organization for placing and locating critical information when needed. From this screen the user can add links (see FIG. 32).

Figure 12:
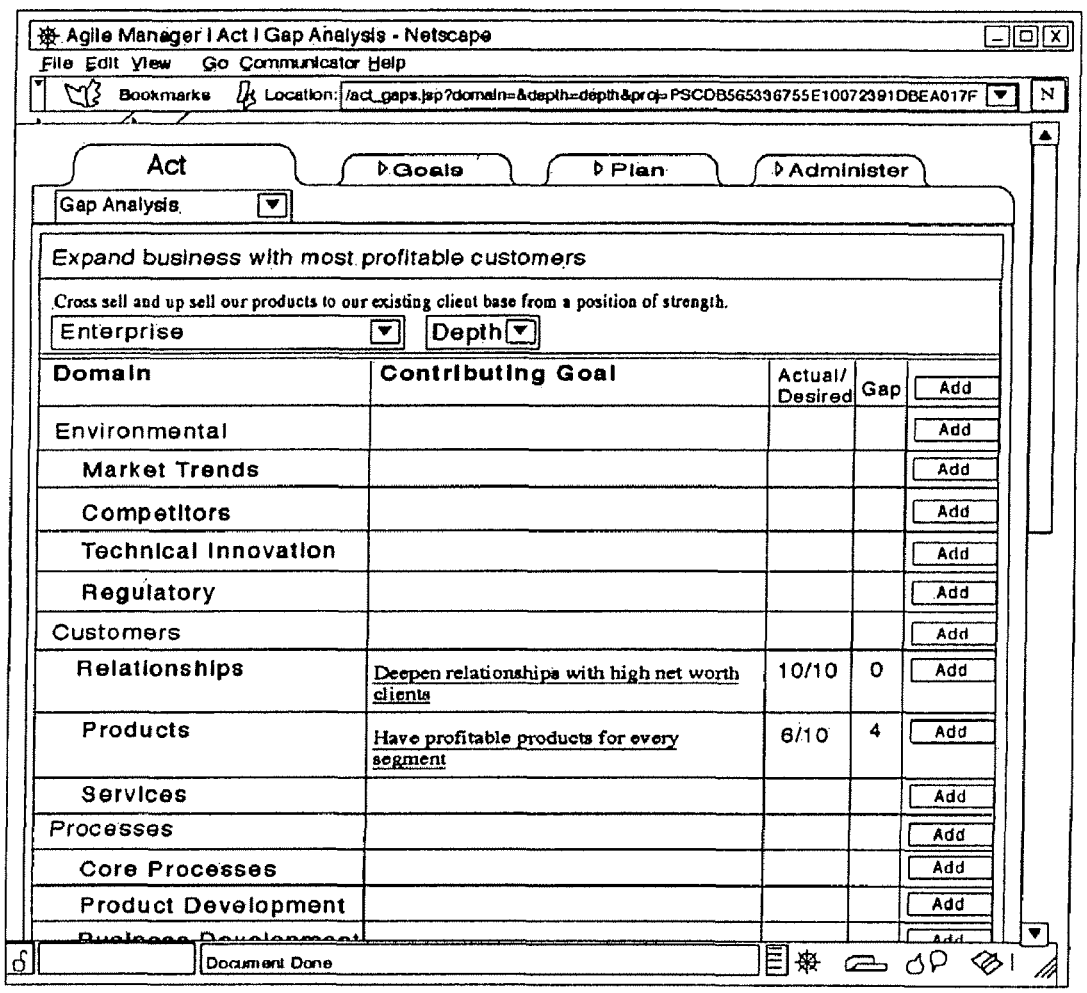

Gaps Analysis: this button takes the user to the list of contributing goals/projects (with actual and desired weightings) by domain—screen (see FIG. 12). From this list the user can determine whether the changes for each key domain have been identified. If the user is dissatisfied, the user can either select the edit button and change specific information about one or more of the existing contributing goals/projects or click on "Add" to get to the Edit Contributing Goal screen (see FIG. 7). In the latter case, the user can select a domain and enter the name of a new initiative, its actual achievement weighting (based on current status) and desired achievement weighting (based on the importance of this initiative to achieving the parent goal). When the new initiative idea is submitted, the software displays the Gap Analysis view with the new initiative added. The user can continue to add new contributing goals/projects by domain. When the user is comfortable that the domains have been covered, the user can click on a listed goal name and proceed directly to its summary screen to begin to flesh out more information about its characteristics such as its owner and objective. In at least some cases, the value of the Gap Analysis is substantial, because it allows users to brainstorm what changes in the domain structure need to be made if a particular goal or initiative is to be implemented successfully. In this regard, the combination of domain structure and gap analysis keeps members of the organization focused on how the organization works and where improvements need to be made for strategic or tactical reasons.

View Menu: the menu at the top of the Goal Hierarchy screen (see FIG. 22) give the user access to hierarchical views that facilitate decision making related to creating the hierarchy itself, reviewing status, or flagging changes particularly interesting to the user. A description of each of the buttons is set forth in the following sections:

Select Domain: When this is selected the domain structure screen is presented (see FIG. 23).

All Goals View: when this button is clicked, the user is presented with screen (see FIG. 16) which repeats the hierarchy on the left and adds relevant information on the right in five categories useful to users when the users want to assess the validity of the current goal hierarchy, including cost, payback priority, domain, and due date (expressed as time remaining before expected completion). From this screen, the user can select other views where the hierarchy is sorted by category represented by the column heading, e.g., is sorted in descending order of costs, screen (see FIG. 17), thereby helping people decide whether the level of investment required can be afforded. Likewise, using column headings as buttons, the user can sort the hierarchy into various views according to payback (see FIG. 19), priority (see FIG. 19), domain (see FIG. 16), or due date. These views facilitate meetings and deliberations where users need to quickly produce a variety of sorted views to achieve the variety of perspectives needed to reach informed decisions. For example, a view sorted by payback, with cost information also visible, helps users decide whether the return on investment will be sufficient to justify financially. Sorting by priority allows users to view the relative weightings that have been given to the goals and initiatives based on factors deemed important from a prioritization perspective. In a typical case, from a strategic perspective, the view sort by domain is highly desirable because this view shows how the goals and initiatives affect different aspects of the organization, e.g., from dealing with customers, to processes, organization, and economics. As a result, users can make common sense decisions about, for example, whether all the needed changes in all the domains have been accounted for.

Status View: this button takes the user to various views of the portfolio sorted by information fields that indicate how well the goal or initiative is progressing. When the button is clicked, the Projects by Status screen (see FIG. 18) is presented, sorted by status categories and showing other column headings that can be clicked on to get Projects by Stage (see FIG. 20) or by Owner, Projects by Risk, and Projects by Due Date. Armed with these views, users can decide where to focus their attention to keep projects on track.

Alerts View: this button takes the user to the Project Alerts View (see FIG. 26) which shows changes a particular user has identified as being of particular interest. From this view, the user can access the Set Alerts and Set AlertsEdit screens and modify the goals and types of changes the computer is to monitor and flag on the user's behalf.

In a typical embodiment, the Agile Manager is accessible from every desktop, with appropriate security clearances, for individual or team use on-line, with print out ability for manual use, and for electronic projection to facilitate team meetings. The software is flexible and is arranged to allow the user to make non-structural changes in, for example, the specifics contained. The user changes the "base case" to reflect the desired language and sub-domain elements. As a result, the more the tool is used, the more the tool comes to reflect the user and the user tends to become proficient with the tool.

The technique (i.e., at least a portion of one or more of the procedures described above) may be implemented in hardware or software, or a combination of both. In some cases, it is advantageous if the method is implemented in computer programs executing on programmable computers that each include a processor, a storage medium readable by the processor (including volatile and non-volatile memory and/or storage elements), at least one input device such as a keyboard, and at least one output device. Program code is applied to data entered using the input device to perform the procedure described above and to generate output information. The output information is applied to one or more output devices.

In some cases, it is advantageous if each program is implemented in a high level procedural or object-oriented programming language such as Microsoft C or C++ to communicate with a computer system. The programs can be implemented in assembly or machine language, if desired. In any case, the language may be a compiled or interpreted language. In some cases, it is advantageous if each such computer program is stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium that has been configured with a computer program, where the storage medium as configured with the program causes a computer to operate in a specific and predefined manner.

Figure 40:
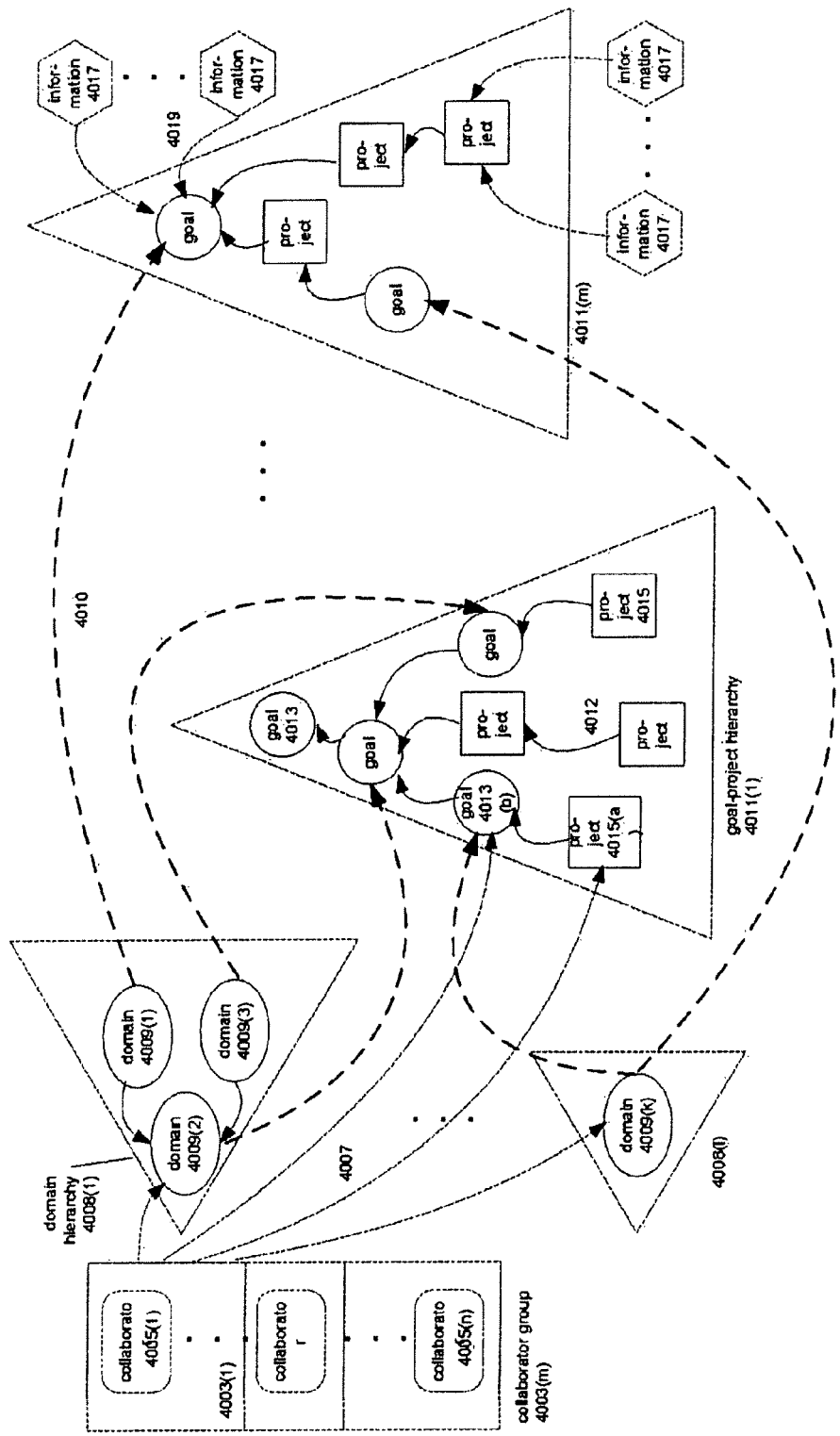
FIG. 40 is a diagram of the structure of a model in the parent.

The Models Used in the Parent of the Present Patent Application: FIG. 40

The Model

FIG. 40 is a diagram of a model 4001 made as described in the system of the parent. A number of collaborators 4005(1 . . . n) are organized into one or more collaborator groups 4003(1 . . . m). A collaborator 4005 may belong to more than one group 4003. The context in which the collaborators 4005 work is represented by a set of domain hierarchies 4008(1 . . . 1) and a set of goal-project hierarchies 4011(1 . . . m). It is this arrangement which permits a collaborator to view goals and projects in the context of domains and vice-versa.

Beginning with the goal-project hierarchies 4011, each such hierarchy has at its head a goal 4013. A goal may have other goals (termed subgoals) and projects 4015 as its children. A project 4015 may have other projects as its children, but may not have a goal as a child. The hierarchical relationships established by these rules are indicated by arrows 4012. Any goal 4013 or project 4015 may have one or more items of information 4017 associated with it, as indicated by arrows 4019. The information may include documents, messages, discussions, reminders, Web links, and alerts.

Continuing with domain hierarchies 4008, domain hierarchies may contain only domains 4009. A single domain 4009 is at the head of each domain hierarchy 4008. A domain may have other domains (termed subdomains) as its children. The structure of the hierarchy is again indicated by arrows 4012. Any goal in a goal-project hierarchy 4011 may belong to a single domain 4009(i), but a goal need not belong to any domain. The top goal in goal-project hierarchy 4011(1) belongs to no domain. The goals that belong to a domain may belong to different goal-project hierarchies 4011. These relationships are shown in FIG. 40 by arrows 4010. Thus, as show there, goals from goal-project hierarchy 4011(1) and 4011(m) may belong to domain 4009(k).

Access to domains, goals, and projects is by collaborator groups 4003. A given collaborator group 4003(i) may have access to any combination of domains, goals, and projects in model 4001, as shown by arrows 4007. The kinds of access which a collaborator belonging to a particular group has to a particular domain, goal, or project depend on the group's group type and on the permissions which the group has for the particular domain, goal, or project. The group's group type determines the maximum access that the collaborators belonging to the group may have to any domain, goal, or project to which group gives access. The permissions for a particular domain, goal, or project determine the actual access that the collaborators belonging to the group may have to the particular domain, goal, or project. The access granted by the permissions can of course be no greater than the access granted by the group type What a collaborator sees of model 4001 depends on the collaborator's group membership and on the permissions the group has for the model components. For example, group 4003(1) has the user type, which gives the collaborators at most read-write access to domain 4009(2), domain 4009(k), goal 4013(b) and project 4015(a). That access is further limited by the permissions for the group; for example, the permissions may give collaborators belonging to the group only read access to domain 4009(2), domain 4009(k), and goal 4013(b), but read-write access to project 4015(a). Consequently, the collaborators can see project 4015(a) and domain 4009(2) by themselves and can see both goal 4013(b) and domain 4009(k), as well as the relationship between them, but can modify only project 4015(a).

Model 4001 provides views of the collaborative activity from the point of view of the domains and also from the point of view of the goals. Thus, FIG. 3 shows goal hierarchies 4011; FIG. 16 shows the goals sorted by the domains 4009 they belong to; FIG. 17 shows the goals sorted by cost. An illustration of how these multiple views may be used is the following: The model 4001 for a law firm may include a goal-project hierarchy 4011 for each of the law firm's clients. All of the goals and projects that are related to a particular client belong to the client's goal-project hierarchy. Among these projects for each client is a "billing" project to which is related billing information 4017 for the client. The "billing" projects for all of the clients belong to a "bookkeeping" domain hierarchy. The collaborator groups 4003 are set up so that the bookkeeping staff has access to all of the "billing" projects in the client goals-project hierarchies and to the billing domain, while those people who work for a particular client (including the clients themselves) are in groups which give them access only to goals and projects belonging to the client's goal-project hierarchy.

An important feature of the models of the system for collaborative work is that collaborators with the proper permissions may modify not only the information 4017 associated with a goal or project but may also modify the form of a goal-project hierarchy 4011 or a domain hierarchy 4008. For example, a collaborator who has edit access to both domain 4009(k) and domain 4009(2) may make domain 4009(k) a child of domain 4009(2). Similarly, a collaborator who has write privileges for goals 4013 and 4013(b) may move the subtree consisting of goal 4013(b) and project 4015(a) so that goal 4013(b) is a child of goal 4013.

Limitations of the Model:

Models of the type of model 4001 were originally intended to model business organizations; when it became apparent that they were usable and useful in many other collaborative work situations, it also became apparent that certain limitations of model 4001 caused problems in some of the other situations. The limitations involved the special nature of domains in the model:

information could be related to entities in goal-project hierarchies, but not directly to domains;

an entity in a goal-project hierarchy could belong to only one goal-project hierarchy and to only one domain.

An example of the problems caused by these limitations is the following: a law firm can be modeled with a goal-project hierarchy for each client that includes a billing project for the client. With this type of model, there may also be a bookkeeping domain to which the billing project in each client goal-project hierarchy belongs. However, a billing project can belong to no other domain. For example, an auditing group may also be concerned with the client billing projects, but this aspect of the organization cannot be expressed by the model, since the client billing projects cannot be a member of an additional domain for the auditors.

Figure 41:
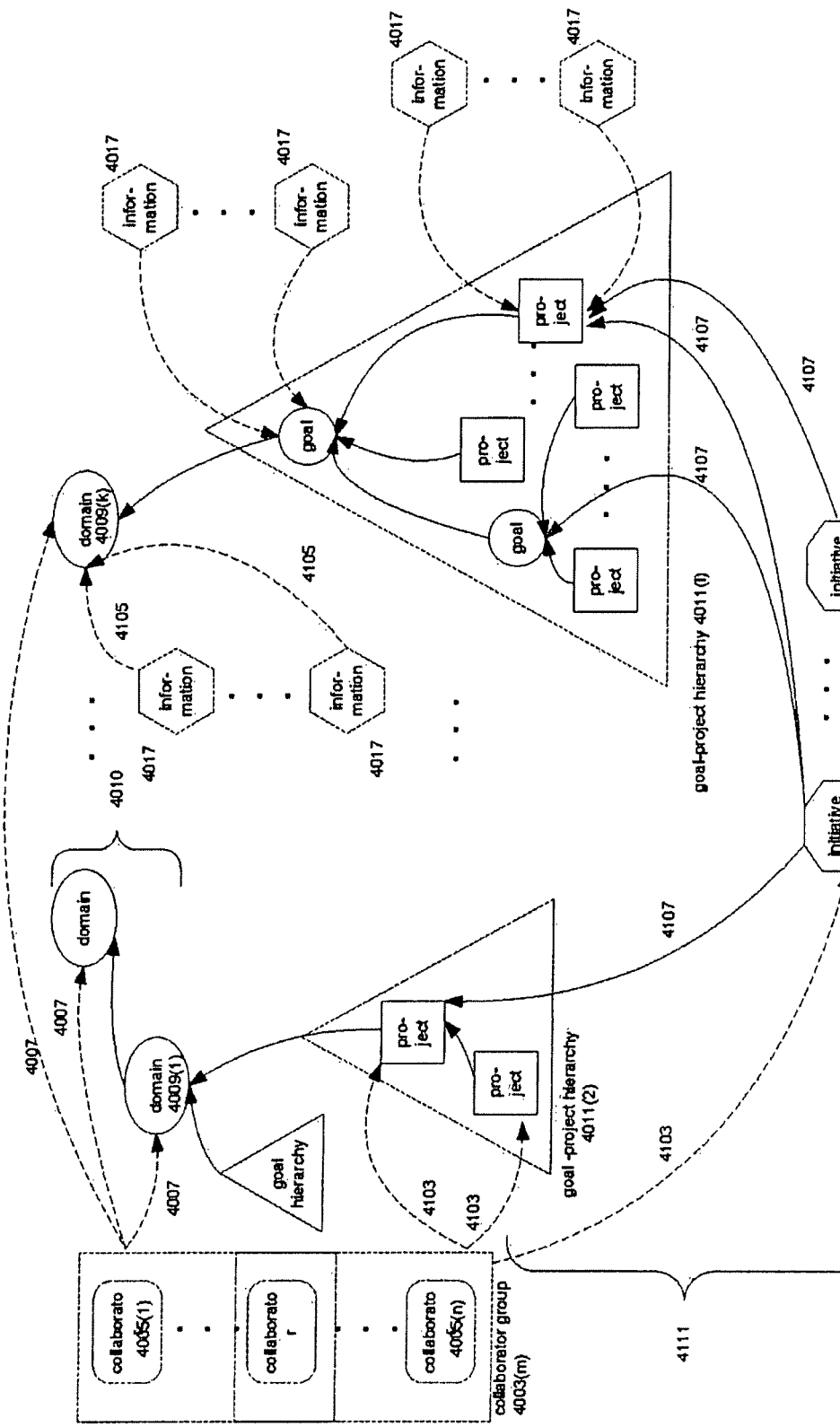
FIG. 41 is a diagram of the improved structure of the model.

The Improved Model: FIG. 41:

FIG. 41 shows improved model 4101. Included in improved model 4101 are changes which overcome the limitations just described. Major differences between improved model 4101 and model 4001 are the following:

goal-project hierarchies 4011 now have domains 4009 as parents;

information 4017 may now be directly related any kind of hierarchy entity, not just goals and projects, as shown by arrows 4105; and a new hierarchy entity termed an initiative 4109 has been added to the model.

As shown in FIG. 41, the only goal or project in a goal-project hierarchy which can be related to a domain in model 4101 is the goal or project at the head of a goal-project hierarchy. Moreover, information 4017 may be related directly to any kind of hierarchy entity. The ability to relate information directly to any kind of hierarchy entity, including domains and initiatives, is particularly useful when the information is global to the entire domain or initiative, rather than to a particular goal or project within a goal-project hierarchy 4011.

An initiative 4109 is not a member of any domain hierarchy 4010 or goal-project hierarchy 4011, but is rather the root of an initiative hierarchy 4111 which may include subinitiatives and a single level of goals and/or projects from any of the goal-project hierarchies. A goal or project may belong to any number of initiatives. Collaborator-groups 4003 are related to initiatives in the same fashion as they are to hierarchies, as shown by arrow 4103. Thus, as shown by arrows 4107, a project in hierarchy 4011(2) and a goal and a project in hierarchy 4011(1) all belong to initiative 4109(1) and the project in hierarchy 4011(1) that belongs to initiative 4109(1) also belongs to initiative 4109(o). Information may be related to an initiative in the same way that it may be related to any hierarchy entity. It should be pointed out here that initiative is used here and in the following in a manner which is different from its use in the parent, where it is employed as a broad term that covers both goals and projects.

An initiative 4109 can be used to solve the problem with the billing information described above. The law firm model could be set up with a domain for each client which included a "billing" project for that client and with a "billing" initiative that had two subinitiatives: a "bookkeepers' initiative" and an "auditors' initiative". The "billing" project for each of the clients could belong to both of these subinitiatives. As can be seen from the foregoing, the initiatives make it possible for the model to properly express the relationships between the billing projects and the clients, the bookkeepers, and the auditors.

Figure 42:
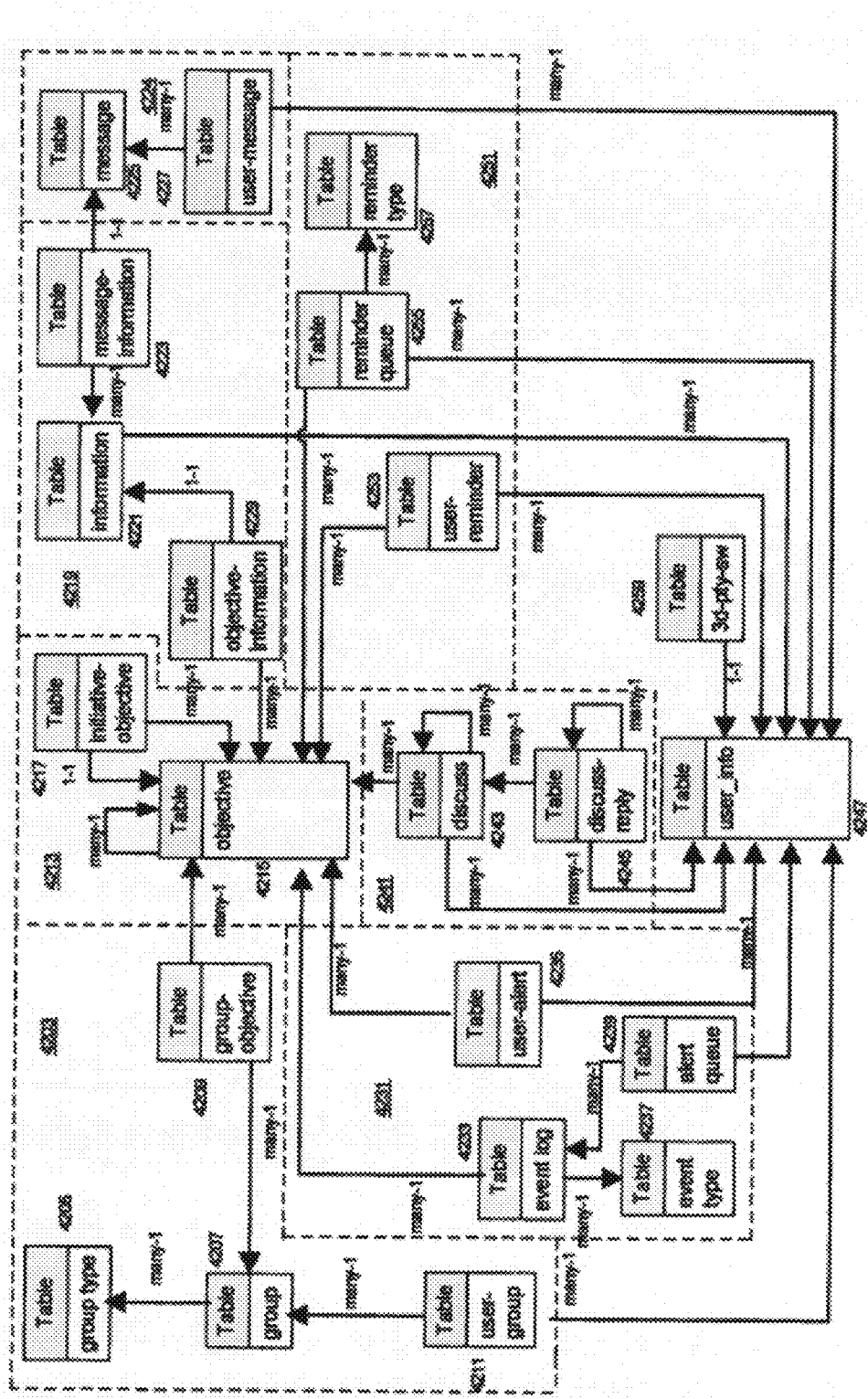
FIG. 42 is an entity-relationship diagram of the database tables used to represent the improved model.

An Embodiment of Model 4101: FIG. 42

In an embodiment of the system for collaborative work, the model which provides a context for the collaborative work is defined by tables in a standard commercial relational database system produced by Oracle Corp., Redwood City, Calif. In relational database systems, the data is stored in tables. A table is made up of rows and columns. Each row has a field for each of the columns. A column specifies a kind of data value and a row represents an entity which has values of the kinds specified by the column. For example, in a table for storing personal information, the columns might be called last_name, first_name, m_i, street_addr, and so forth, with each row representing a person and the fields in the row having the appropriate values for that person. The values of certain of the fields in the row may uniquely identify the row in the table. Such values are termed keys for the rows.

FIG. 42 shows the tables that are relevant to models such as the one shown in FIG. 41. FIG. 42 is an entity-relationship diagram 4201 of the relevant tables. In such diagrams, arrows connecting the tables show relationships between them that are based on the occurrence of keys for rows in one table as values of non-key fields in rows in others of the tables. For example, each row of the table group 4207 contains a field whose value is a key for a record in the table group type 4205. As shown there, the table in which the identifying value is a key is at the head of the arrow and the other table at the tail. In functional terms, what the arrow indicates is that the value of a field in a row of the table at the tail of the arrow can be used to retrieve a row from the table at the head of the arrow. The labels many-1 and 1-1 indicate how the numbers of rows in the two tables relate to each other. With many-1, there may be many rows in the table at the tail of the arrow that contain the key of a given row in the table at the head of the arrow; with 1-1, there will be a single row in the table at the tail of the arrow that has the key of the given record.

The dotted lines in FIG. 42 divide the tables shown in diagram 4201 into functional groups that correspond to the different kinds of entity that appear in the model of FIG. 41. The collaborators 4005(1 . . . n) are identified by user_info table 4247, which contains a row representing each of the collaborators. The collaborators are organized into groups 4003 by the tables in the portion of FIG. 42 with the reference number 4203. The hierarchy entities of FIG. 41 and the hierarchies to which they belong, namely domain hierarchies 4010, initiative hierarchies 4111, and goal-project hierarchies 4011 are defined by the tables in the portion of FIG. 42 with the reference number 4213. The remaining tables in FIG. 42 contain different kinds of information 4017. The tables in the portion labeled 4231 and 4251 contain alert information which is used to alert collaborators to events that occur in the course of the collaborative effort. The tables in the portion labeled 4231 alert collaborators to changes in the model which are of interest to the collaborators, while the tables 4255 and 4257 in portion 4251, finally, permit collaborators to provide time-based reminders to themselves. The tables in the portion labeled 4241 record on-line discussions among the collaborators. The contributions to the discussions are rows in discussion table 4243 and discussion reply table 4245. Each row specifies the row in table 4215 for the hierarchy entity the discussion is about and the collaborator who is the source of the discussion. The rows are further threaded, that is, the rows in the tables contain fields which make it possible to see the manner in which the contributions to the discussion relate to each other both temporally and as contributions and replies. The tables in the portion labeled 4219 record information such as documents which the collaborators make available to each other; those in the portion labeled 4224 record correspondence among the collaborators. As is apparent from the arrows emanating from the tables that contain information, the items of information may be related to collaborators, to hierarchy entities, or to both. For example, a message represented by a row in table 4225 is related via table 4227 to the collaborator to whom it is addressed, while an item of information represented by a row in table 4221 is related via table 4229 to a hierarchy entity and, as indicated by the arrow to table 4247, to a collaborator as well.

Table 4259, finally, relates information needed to launch third-party software such as a user name and password for the software to a row in user_info table 4247 for a user. The arrangement permits a collaborator to launch the third-party software without leaving the system for collaborative work.

As will be explained in more detail later, the third-party software thus launched is displayed in a window which is a permanent part of the GUI for the system for collaborative work. In a preferred embodiment, the third-party software is contact-management software; in other embodiments, it could be other kinds of software, and in still other embodiments, there might be several different kinds of software which could be displayed in the window, with the collaborator being able to select the software to be launched from a menu associated with the window.

Details of Tables: FIGS. 43, 44, and 45

In the following, details will be given for tables that are particularly relevant to the present context. Among these are the tables 4203 used to organize collaborators into groups and the tables 4213 used to define the hierarchies. Additionally, an example of one kind of information 4017 will be given.

The Group, Group Type, and Group-Objective Tables: FIG. 43

FIG. 43 shows a presently-preferred embodiment of group table 4207, group type table 4205, and group-objective table 4209. Beginning with group table 4207, this table has a row for every group defined in the system for performing collaborative tasks. What is shown in FIG. 43 is the definition in the SQL data definition language (DDL) of the table. The definition gives the table name and a description of every column in the table, and thus a description of every field in a row of the table. The fields of interest here are GROUP_ID field 4303, which uniquely identifies the row in the table and the group represented by the row, GROUP_NAME field 4305, which is a name for the group, which must also be unique in the table, and GROUP_TYPE_KEY field 4307, which is an identifier for a row in group type table 4205 which specifies the type of the group represented by the row. The type of a group defines the group's maximum access privileges with regard to hierarchy entities accessible by the group.

Group type table 4205 has a row for every group type. In the preferred embodiment, there are four group types: site administrator, manager, user, and viewer. The group type is identified by GROUP_Key field 4311; the type type's name is contained in GROUP_Type field 4313. SECURITY_LEVEL field 4315 is a numeric value for the type identified by GROUP_Key 4311. In a preferred embodiment, the maximum access given to collaborators by the group types is as follows for the various group types:

Site Administrator: a collaborator belonging to a group that has the Site administrator type may modify the model in any fashion. He or she may create Groups, Users, Domains, Initiatives, Goals, and Projects, assign group types to groups, and assign permission levels for any group and hierarchy entity. Such a collaborator further has access to all information 4017 and may delete Groups, Users, Domains, Initiatives, Goals, Projects, and data.

Manager: A collaborator belonging to a group that has the Manager type may in general modify existing entities in the model to which the group has access. Thus, such a collaborator may add subdomains, subinitiatives, subgoals, and subprojects to the Domains, Initiatives, Goals, and Projects to which the group has access and may assign permissions to the subdomains, subgoals, and subprojects. A collaborator belonging to a group that has the Manager type may add users to the group but may not create new groups or new users.

User: A collaborator belonging to a group that has the User type may read and write Domains, Initiatives, Goals, and Projects to which the group has access and add subdomains, initiatives, subgoals, and subprojects to those Domains, Initiatives, Goals, and Projects.

Viewer: A collaborator belonging to a group that has the Viewer type may read Domains, Initiatives, Goals, and Projects to which the group has access, but may not modify the Domains, Initiatives, Goals, and Projects.

In order to access hierarchy entities, a user must be a member of at least one group. A user may be a member of any number of groups. Users are related to groups by user-group table 4211, which has an entry for each user for each group the user belongs to. An initiative, domain, goal, or project may be accessed by one or more groups.

Hierarchy entities are related to groups by group-objective table 4209, which has a row for each group for each hierarchy entity the group has access to. The row includes three fields of interest in the present context: GROUP_ID 4317, which is the ID of the row in group table 4207 for the group that the row is relating to a hierarchy entity, OBJECTIVE_ID 4319, which is the ID of the row in objective table 4215 for the hierarchy entity that the row is relating the group to, and PERMISSION 4321, which indicates how members of the group specified by GROUP_ID 4317 may access the object. The permission specified in PERMISSION 4321 is a subset of the permissions specified for the group in group type table 4205. Access to hierarchy entities is per-entity, i.e., access to a hierarchy entity does not give access to its descendants. Access to the hierarchy entities also determines what a collaborator sees in the graphical user interface. If a collaborator does not belong to a group that has access to a hierarchy entity, the entity will not appear in collaborator's view of the model. The kind of access a collaborator has also determines the collaborator's view of the model for the purposes of various kinds of actions.

Objective and Initiative-Objective Tables: FIG. 44

Objective table 4215 and initiative-objective table 4217 together define the hierarchy entities and the hierarchies to which they belong. FIG. 44 shows details of objective table 4215. There is a row in objective table 4215 for each hierarchy entity and the SQL DDL of FIG. 44 shows the fields belonging to each row. OBJECTIVE_ID field 4401 contains a unique identifier for the row and therefore for the hierarchy entity represented by the row. OBJECTIVE_NAME field 4403 contains a unique name for the hierarchy entity. A hierarchy entity may be an initiative, domain, goal, or project, and the value of OBJECTIVE_TYPE_CODE field 4405 indicates which of these the hierarchy entity represented by the row is. OBJECTIVE_DESC field 4407 is text that describes the hierarchy entity. OWNER_USER_ID and DELEGATEE_USER_ID fields 4409 identify users associated with the hierarchy entity. The first field identifies the user who controls the entity and the second field identifies a user to whom the first user has delegated control. Both users must belong to groups having access to the hierarchy entity. PARENT_ID field 4411 contains the objective id of the hierarchy entity's parent in the domain hierarchy to which the hierarchy entity belongs. In the cases of top-level domains and initiatives, the value is NULL, since these entities have no parents. The remaining fields 4413 contain information about the hierarchy entity. Which fields are used in a particular hierarchy entity depends on the hierarchy entity's type. As disclosed in the parent of the present application, the graphical user interface will sort the hierarchy entities according to the values of many of these fields. At 4415 is shown an index on table 4215 which permits quick determination of the identifier of the hierarchy entity's parent in its domain hierarchy from the identifier for the hierarchy entity itself. This index makes it easier to move up a hierarchy.

Initiative-objective table 4217 relates entries in objective table 4215 for goals and objectives to entries in table 4215 for any initiatives to which the goals and objectives belong. For each goal or objective that belongs to an initiative, there is an entry for the goal or objective and the initiative in initiative-objective table 4217. A goal or objective may thus belong to many initiatives.

Relating Information 4017 to a Hierarchy Entity: FIG. 45

Information table 4221 and message table 4225 will serve as examples of how information 4017 is related to hierarchy entities. Rows in information table 4221 represent items of information such as documents and links to Web sites. Each row in information table 4221 is related via objective-information table 4229 to one or more hierarchy entities. In FIG. 45, details of information table 4221 are shown at 4221. Each row of the table has an ID field 4501 with a unique value in the table. Then come NAME 4503, whose value is the name of the information item, DESCRIPTION 4505, which is a description of the information item, and OWNER_ID 4507, which is the id in user_info table 4247 of the collaborator who made the row in information table 4221 for the information item. TYPE field 4509 indicates whether the information is in a file stored locally on the system's server or is a link to a Web site. The fields at 4511 describe the information. Included in these fields is a URL field. When the information is in a locally-stored file, this field contains the file's path name; if the information is a link, the field contains the URL (universal resource locator) for the information in the World Wide Web. OBJECTIVE_ID field 4513, finally, is the identifier for the hierarchy entity from which the information item was added to the model.

Messages: FIG. 45

Messages are represented by message table 4225. Each row represents a message sent between collaborators in the system for performing collaborative tasks. The row includes a MESSAGE_ID field 4515 that is a unique identifier for the row and information about the message at 4517. Messages are related to the users they were sent to by user-message table 4227. When a message includes an attachment, the attachment is treated as an item of information and a row for the attachment is made in information table 4221. A row in message-information table 4223 relates the row for the attachment to the row for the message in message table 4225 so that the user interface can display the message along with the attachment.

Alerts and Reminders: FIG. 42

As set forth in the parent of the present patent application, a collaborator may set an alert which automatically informs the collaborator of a change in a hierarchy entity which is of interest to the collaborator when the change occurs. As implemented in the database system of FIG. 42, alerts involve four tables:

Event log table 4233 is a list of events that can result an alerts. There is a row in table 4233 for each occurrence of each event. The row includes fields which specify the hierarchy entity involved in the event, the type of event, and the change that caused the event. It should be also pointed out here that event log table 4233 also provides a complete history of the changes in a model.

Event type table 4237 contains a row for each of the event types. The fields of the row contain information about the type including a description of the type.

User-alert table 4235 specifies for each hierarchy entity for which the collaborator is interested in receiving alerts the kinds of events the collaborator is interested in receiving alerts for. The table includes rows for all of the hierarchy entities that each collaborator is interested in. A given row includes the ID for the collaborator, the ID for the hierarchy entity, an alert mask that specifies the kinds of events the collaborator is interested in for the hierarchy entity, and a flag indicating whether email is to be sent to the collaborator when an event specified in the alert mask occurs.

Alert queue 4239 relates rows in event log table 4233 to collaborators. There is a row in alert queue 4239 for each collaborator for which there is an event of interest to the collaborator in event log 4233.

Figure 26:
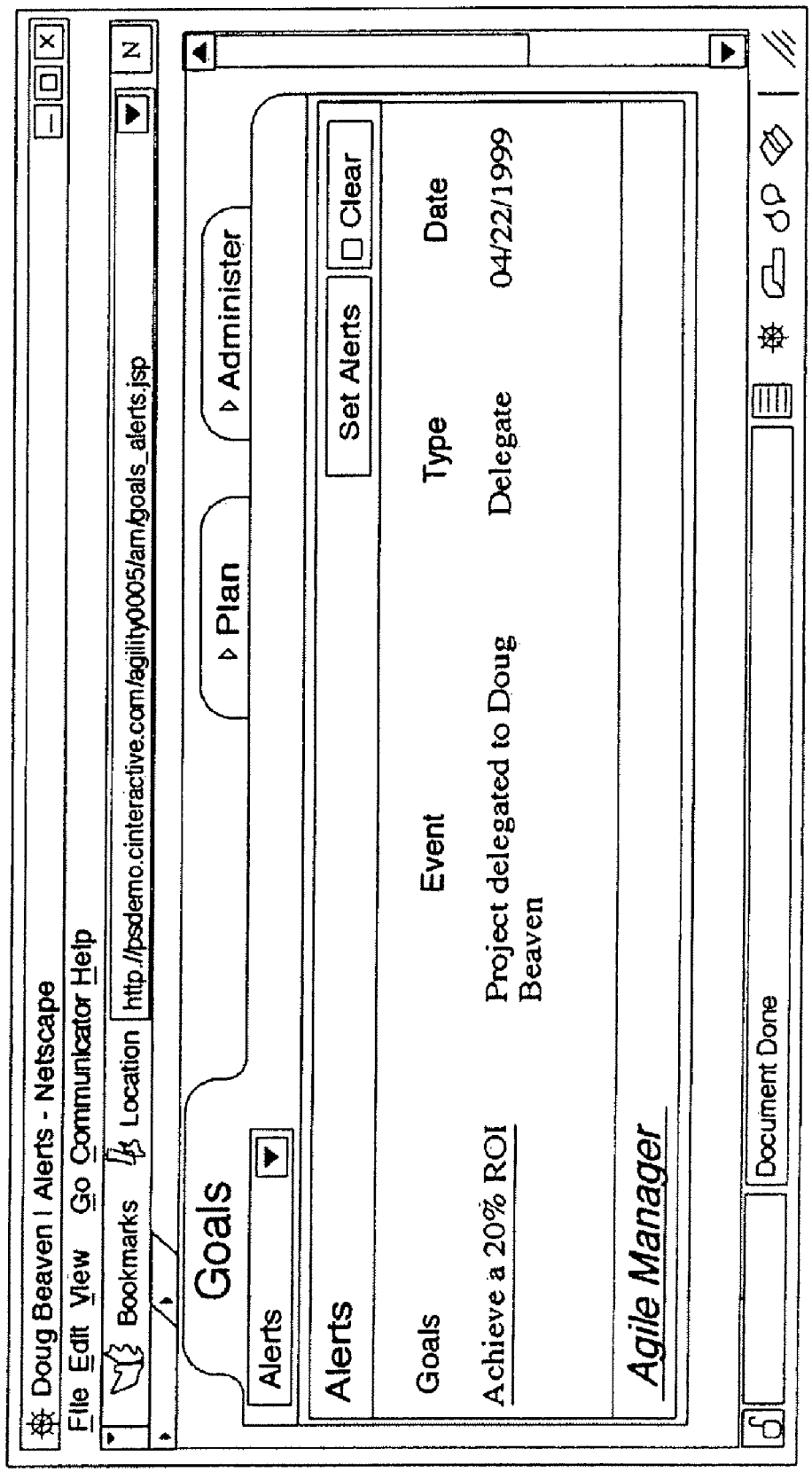

Operation of alerts in a preferred embodiment is as follows: using a window like the one shown at FIG. 26, the collaborator sets an alert for him or herself. The result is a row in user-alert table 4235 for the collaborator and the specified type of event (here, a delegate event). As events that may result in alerts occur, the system creates rows in event log table 4233 for the events. Event log table 4233 is periodically queried using each row in user-alert table 4235 for events that the row indicates are of interest to the collaborator. When one is found, an entry in alert queue 4239 is made for the event and collaborator. The current alerts for a user may be found by querying alert queue 4239 for the collaborator.

Reminders work in much the same way. User-reminder table 4253 contains a row for each reminder that a collaborator wishes to receive with regard to a particular hierarchy entity. The row includes fields which specify when the reminders are to start and the period for which the reminders are to be given. The system periodically queries user-reminder table 4253 to determine which collaborators require reminders. Rows for the reminders are placed in reminder queue 4255, where they are available to the collaborator. Unacknowledged reminders will be continually updated with the number of days remaining until due date. If any unacknowledged reminders are overdue, they will be continually updated with the numbers of days overdue since the due date. Thus a user will have at most one reminder for a specified hierarchy entity.

Figure 46:
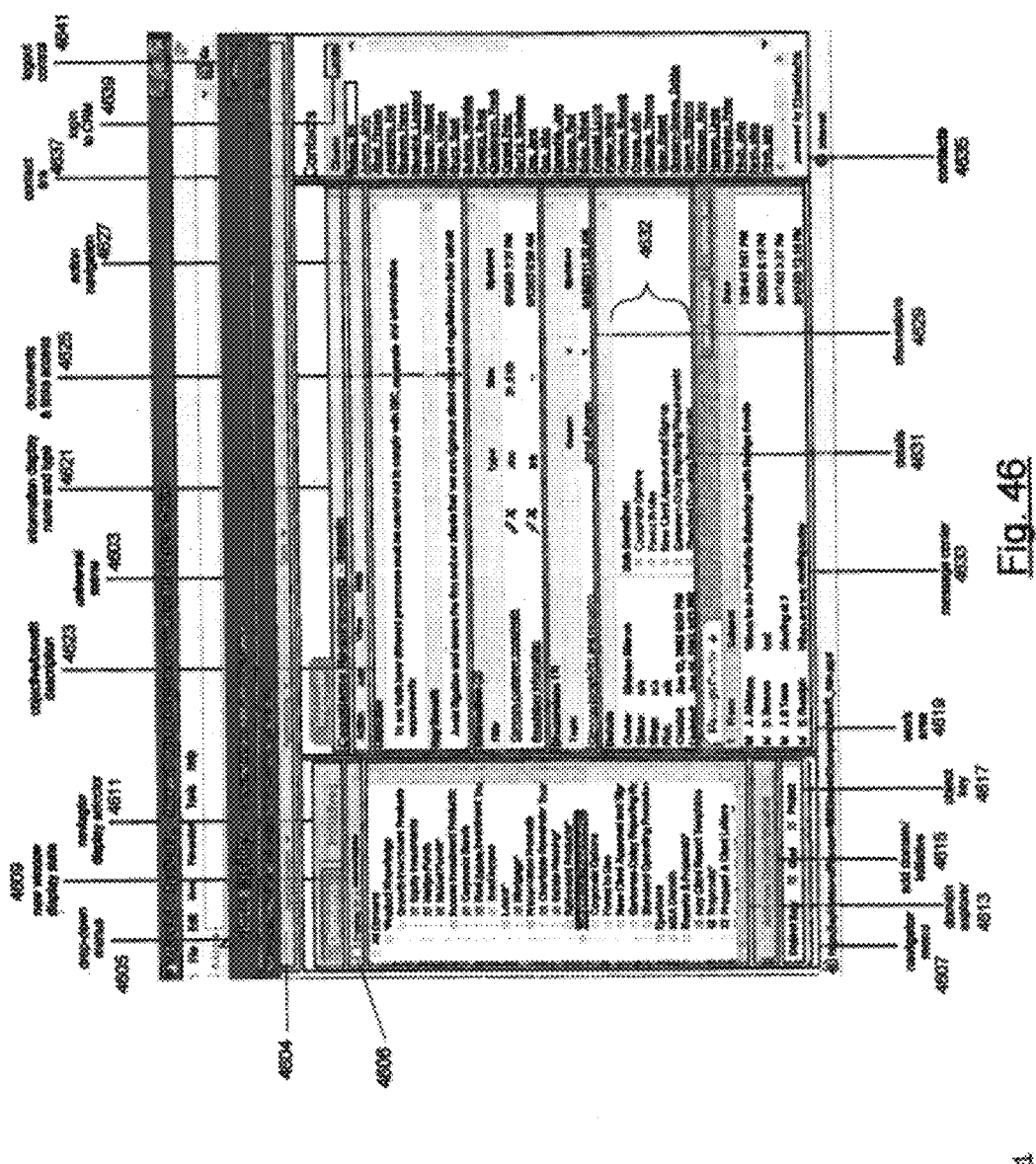
FIG. 46 provides an overview of the improved graphical user interface for the system.

The Graphical User Interface for the System for Performing Collaborative Tasks: FIG. 46

The changes to the system for performing collaborative tasks shown in improved model 4101 were accompanied by an improved graphical user interface. FIG. 46 provides an overview of the improved graphical user interface 4601. The graphical user interface as displayed is produced by the system for a specific collaborator, and what the user sees and may do in the interface is determined in part by the collaborator's group membership. Graphical user interface 4601 has four main components:

universal menu 4603, which includes drop-down menus 4604 that are relevant to all of the other components;

navigator menu 4607, which provides an overview of the current model for the collaborative task and permits a user to select one or more hierarchy entities to work on;

work area 4619, which permits a user who belongs to a group having access to the selected to hierarchy entity to access the selected entity and the information 4017 related to that entity; and contacts area 4635, which gives access to third party contacts management software.

Navigator menu 4607, work area 4619, and contacts area 4635 are always simultaneously visible in graphical user interface 4601. What the collaborator sees of the current model in the graphical user interface depends on the groups the collaborator belongs to and the permissions that the groups have for the various hierarchy entities making up the model. To logoff, the collaborator clicks on logout control 4641.

Continuing in more detail with universal menu 4603, this menu has tabs 4604 for three drop-down menus. The first tab, labeled Administrative, contains drop-down menus for performing administrative activities. Example activities are adding or removing people as collaborators, adding or removing groups, and adding collaborators to or removing them from groups. These activities of course manipulate user_info table 4247 and the tables in the part of FIG. 42 labeled 4203. The second tab, labeled Applications, lists the applications such as word processors or spreadsheets that the user can use while working with interface 4601. The third menu, Tools, lists productivity tools such as to do lists that the user can use while working on the interface. What the user sees of the applications and tools depends of course on the user's privileges.

Navigator menu 4607 displays either the domain hierarchies 4010 or the initiative hierarchies 4111, depending on which of the tabs 4611 at the top of menu 4607 is selected. As shown, menu 4607 displays the domain hierarchies in domain explorer 4613. A component of a hierarchy may be clicked on to see its subcomponents. A button 4615 permits a collaborator with the proper access privileges to add or delete components of the hierarchy. At the bottom of navigator menu 4607 is a key 4617 to the symbols which represent the components of the hierarchy. As is apparent from the foregoing, what is displayed in and manipulated from navigator menu 4607 is the contents of objective table 4215.

Figure 55:
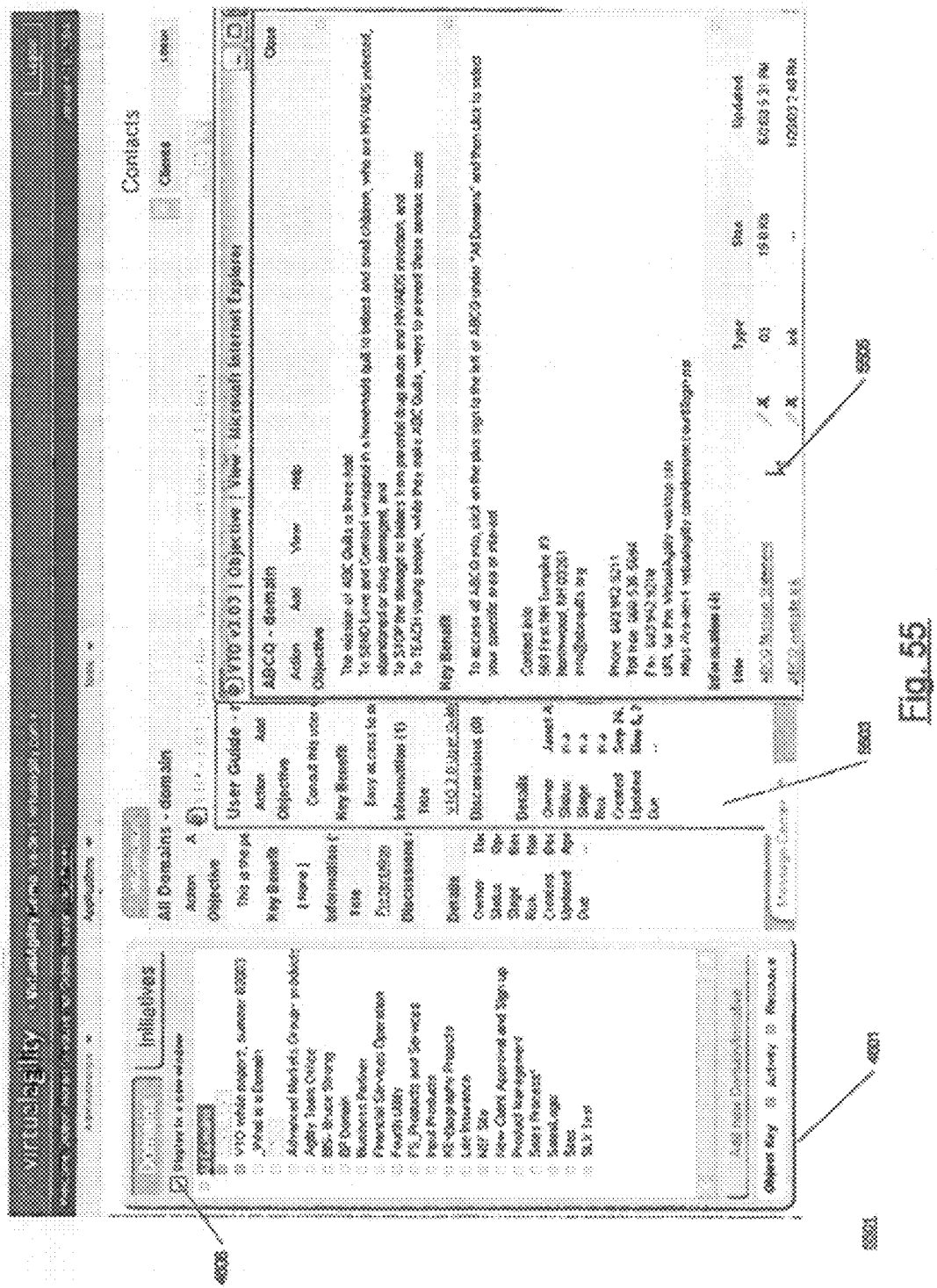
FIG. 55 shows the behavior of the GUI with check box 4606 checked.

When a collaborator has selected a hierarchy entity in navigator menu 4607, detailed information about the entity appears. If the collaborator has checked checkbox 4606, the detailed information is displayed in a new window; otherwise, it is displayed in work area 4619. Checking checkbox 4606 further permits viewing details of several hierarchy entities simultaneously. As shown at 5501 in FIG. 55, three hierarchy entities, All Domains, User Guide, and ABCQ have been selected. Box 4606 was checked after All Domains was selected. When User Guide was selected, window 5503 was added to the display; when ABCQ was selected, window 5505 was added to the display.

Work area 4619 is divided into subareas. An option in view drop down menu in action navigation bar 4627 permits the user to see a closed version of work area 4619 which shows only a list of the subareas. A subarea on the list may be expanded by clicking it. When this option is not selected, the subareas fill work area 4619, as shown in FIG. 46. To further expand a subarea so that it becomes visible in its entirety, the collaborator clicks on it. As with the hierarchy entities, when check box 4606 is checked, a selected component of work area 4619 is displayed in a separate window. When box 4606 is not checked, the selected component expands in work area 4619. Beginning at the top of work area 4619, the first subarea 4623 identifies the selected hierarchy entity and provides a description of it. The description is from the selected hierarchy entity's row in objective table 4215. Subarea 4623 further contains dropdown menus 4621 that indicate actions which the collaborator may perform on the selected entity. Included in the actions are editing or deleting the entity, printing the information displayed the screen, permitting the collaborator to add entities that are subordinate to the selected entity in the hierarchy, permitting the collaborator to relate information to the entity, permitting the collaborator to change the entity's parent, and permitting the collaborator to determine the manner in which the contents of work area 4619 are displayed. Editing the entity edits the information in the entity's row in objective table 4215; deleting it deletes the row from the table. Adding subordinate entities adds rows to table 4215 and adding information relates the information to the entity's row. What the collaborator can do with the selected hierarchy entity is of course dependent on the collaborator's group membership.

The next subarea, 4625, contains the documents and links which are related to the selected hierarchy entity by objective-information table 4229. There is an entry in information table 4221 representing each of the documents and links. Selection of a document or link results in a local copy of the document or link being displayed by the program used to edit or read the link in a separate window. In a presently-preferred embodiment, if the collaborator makes changes in the document, the collaborator must add the version with the changes to documents and links access 4625. In other embodiments, the document may be a shared copy which is accessible to the server in which the system runs, and in that case, the collaborators may jointly edit the document. Discussions subarea 4629 displays any discussions about the selected hierarchy entity by members of the group to which the collaborator belongs. What the collaborator sees and does in this area is determined by the tables in area 4241 of FIG. 42. Details subarea 4631 contains detailed information about the selected hierarchy entity. The information comes from the entity's row in objective table 4215. Also included in this area, as shown at 4632, is the list of the hierarchy entities that are descendants of the selected hierarchy entity; clicking on one of those entities causes the information about the entity to appear, in a separate window if box 4606 has been checked. Message center subarea 4633, finally, is a list of the messages for the collaborator. The messages are of course from message table 4225 and are related to the collaborator by user-message table 4227. In implementations with alerts and reminders, there is another subarea for alerts and reminders relevant to the user.

Contacts area 4635 shows the list of contacts provided by the third-party contact management software. Area 4635 remains blank until the collaborator logs into the contact management software by clicking in login button 4639. Nothing else is required because the system uses the information for the user in third-party software table 4259 to supply the username and password which the third party software requires for the collaborator. Clicking on a contact link 4637 provides detailed information about the client. In other embodiments, contacts area 4635 may display information from other third-party software, and in still others, the area may include a drop-down down menu which permits the user to select from a variety of third-party software. An advantage of including area 4635 in the graphical user interface is that the system for performing collaborative tasks can take advantage of existing third-party software, rather than creating its own versions of such software.

Figure 56:
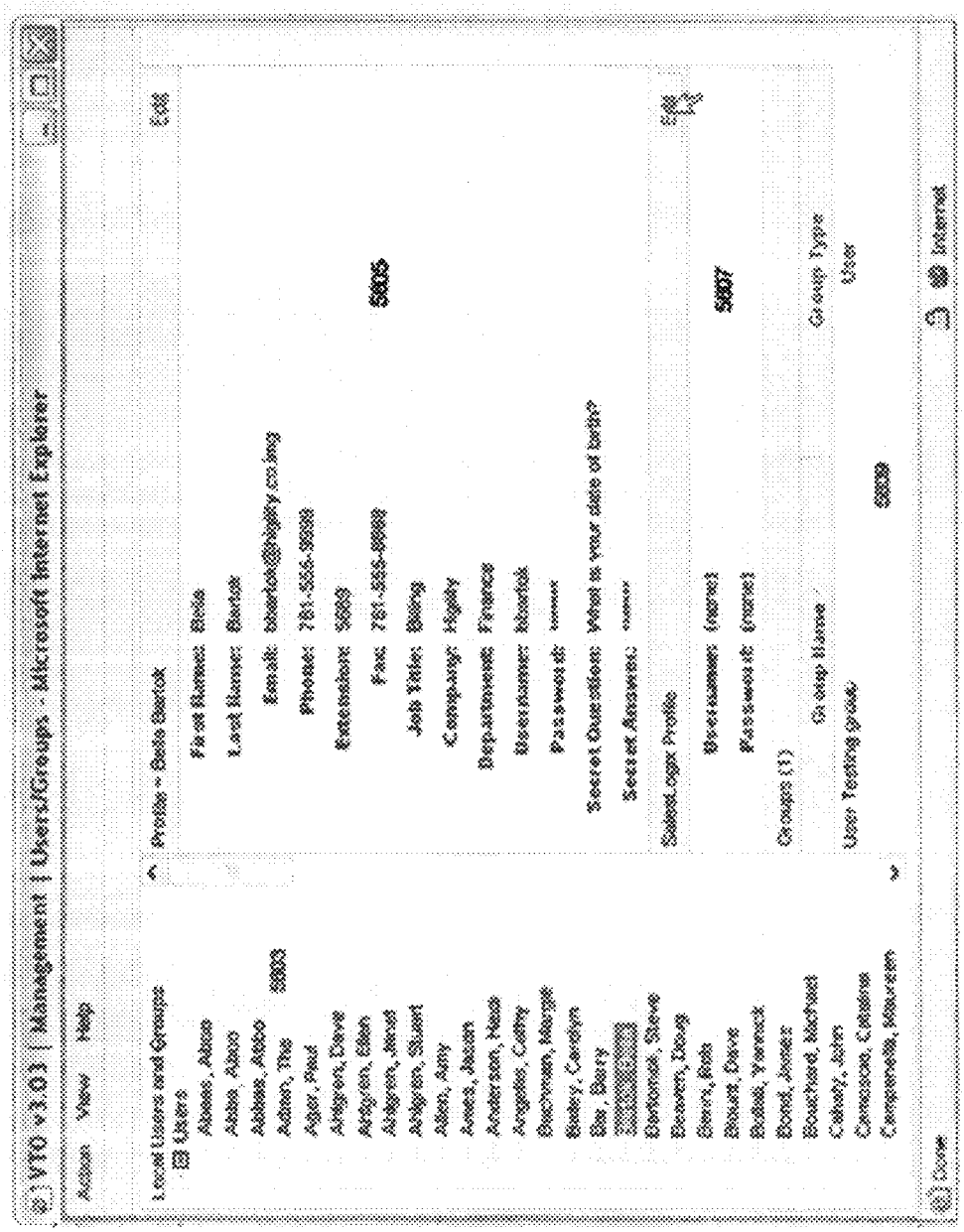
FIG. 56 shows the interface used for associating a collaborator with a username and password for third-party software.

FIG. 56 shows the GUI for setting and changing a user profile. GUI 5601 is reached via the Administration tag in row 4604. At 5603 is seen the list of local collaborators and groups; one of these, Bartok, Bella, has been selected. When this is done, the collaborator's profile for the system for performing collaborative tasks appears at 5605, the collaborator's profile for the third-party software at 5607, and the list of groups the collaborator is a member of at 5609. The information in all of these areas may of course be edited by the system administrator. In area 5607, the administrator fills in the collaborator's username and password for the third-party software. The result of this action is the creation of a row in 3d-pty-sw table 4259 for the collaborator that has fields containing the username and password input at 5607. When the collaborator clicks on login button 4639, the third-party software is launched using the username and password in the user's row of table 4259.

As can be seen from the foregoing, graphical user interface 4601 is particularly well-adapted to the system for performing collaborative tasks. Navigator menu 4607, work area 4619, and contacts area 4635 are always simultaneously visible. Navigator menu 4607 provides a view of the hierarchies in the model, work area 4619 provides easy access to the hierarchy entities and to the information associated with them, and area 4635 provides access to frequently-used third-party software. Thus, graphical user interface 4601 always gives the collaborator an overview of the project as a whole, access to detailed information about a selected hierarchy entity, and easy access to the many ways in which information is transferred in a modern working environment.

Operation of the System for Performing Collaborative Tasks

In the following, a number of examples of the operation of the system for performing collaborative tasks will be given:
 adding an initiative;
 adding an existing goal or a project to an initiative;
 adding a new goal or project to an initiative; and
 relating new information to a hierarchy entity.

These examples specifically illustrate the improvements in the system for performing collaborative tasks that are described herein.

Adding an Initiative: FIGS. 47, 50-52

Figure 47:
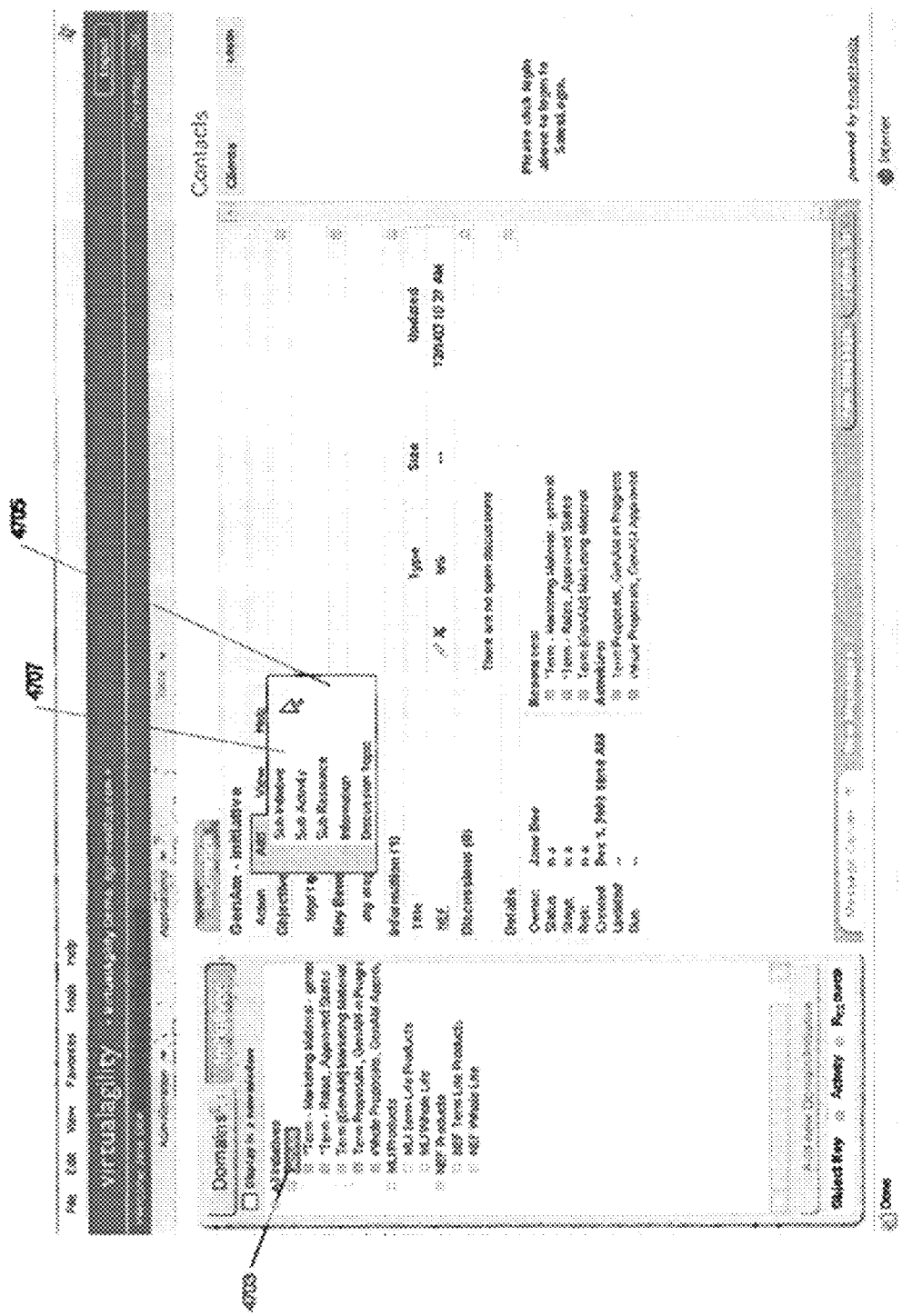
FIG. 47 shows the GUI used to add a goal or objective to an initiative.

FIG. 47 is an example top-level window 4701 for adding an initiative. Navigator menu 4607 shows the current initiative hierarchies 4111. In that window, the collaborator has selected GenAm initiative 4703 and clicked on Action in action navigation menu 4627, and has selected Sub Initiative 4707 in drop-down menu 4705, thereby indicating that the new initiative is to be a subinitiative of the GenAm initiative or one of its subinitiatives. When the collaborator has made the selection, work area 4619 becomes the New Initiative work area shown at 5001 in FIG. 50. At 5002, the collaborator can specify the new initiative's name; at 5003, the collaborator can specify the parent initiative from GenAm and a list 5005 of the initiatives that are subinitiatives of the initiative GenAm selected at 4703. Here, GenAm has been selected. At 5004 the collaborator can input stage, status, and risk information about the activity, and at 5006, the collaborator can input due date information. All of this information goes into fields 4413 in the initiative's row in objective table 4215. At 5007 is the portion of work area 4619 which permits the collaborator to select the permissions which are to be granted with regard to the initiative to the groups the user is a member of and that have access to the initiative.

Figure 52:
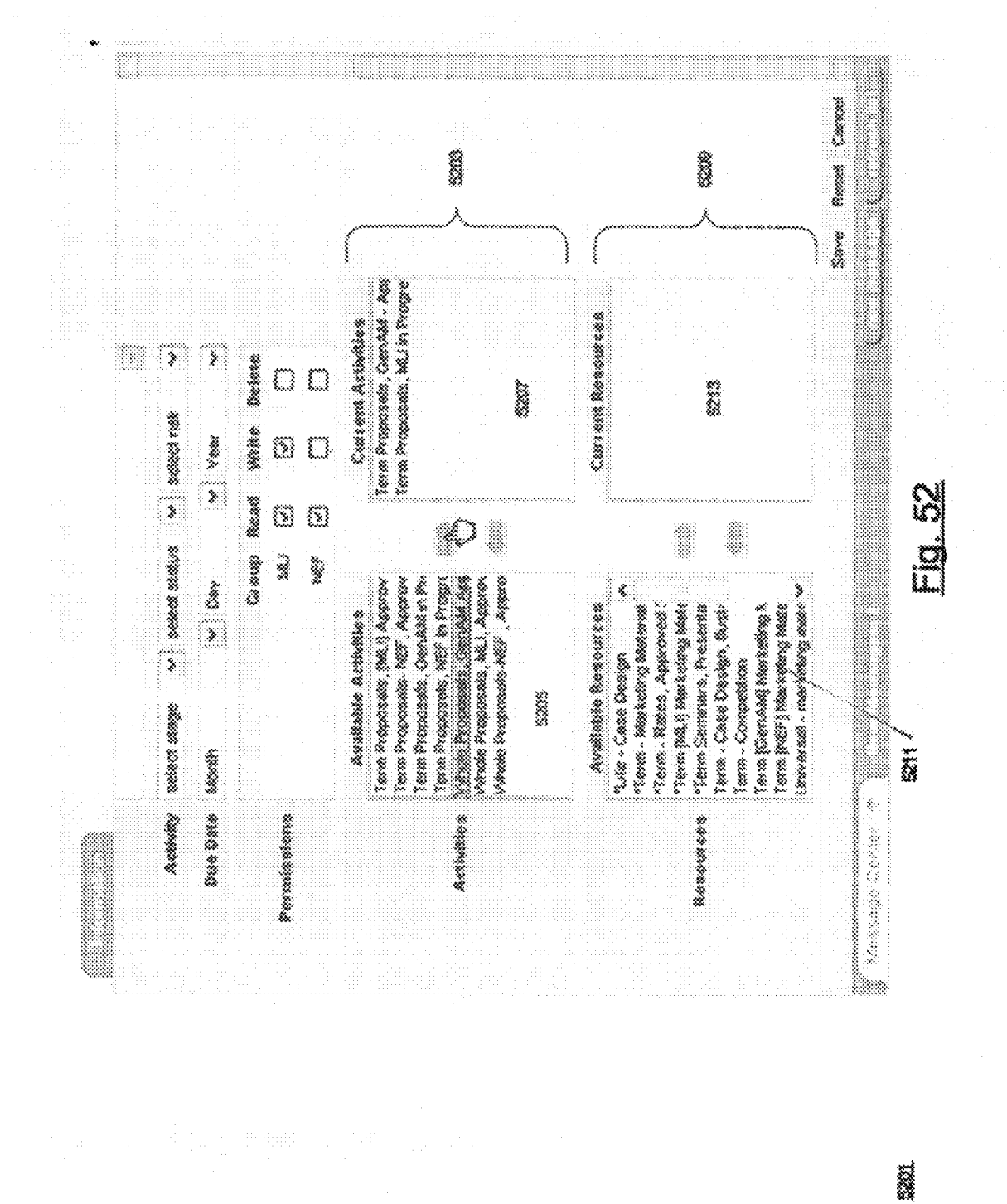
FIG. 52 shows the GUI for assigning goals and projects to the new initiative.

FIG. 51 shows at 5101 how work area 4619 appears after the parent has been selected at 5103 and the access rights to the new subinitiative have been selected at 5105. There are two groups, MLI and NLF; the collaborator who is creating the new subinitiative has given group MLI read and write access and has given group NEF only read access. Of course, these access rights must be among those permitted by the group types of the MLI and NEF groups. Also of interest in window 5101 are Objective field 5107, into which the user can input a description of the new initiative, and Key Benefit field 5109, into which the user can input a description of its key benefit. FIG. 52, finally, shows at 5201 how existing goals and projects (termed activities and resources in this version of the GUI) are assigned to the new subinitiative. Goals are assigned at 5203; the list 5205 on the left shows all of the goals currently available to be assigned to the new subinitiative. To assign a goal to the subinitiative, one selects the activity and then clicks on the arrow that points to list 5207 of the goals that presently belong to the subinitiative. To remove a goal from a subinitiative, one selects the goal to be removed in 5207 and clicks on the arrow that points to list 5205. Projects are assigned in the same fashion at 5209; the list of available projects is at 5211 and the list of currently assigned projects is at 5213.

Figure 53:
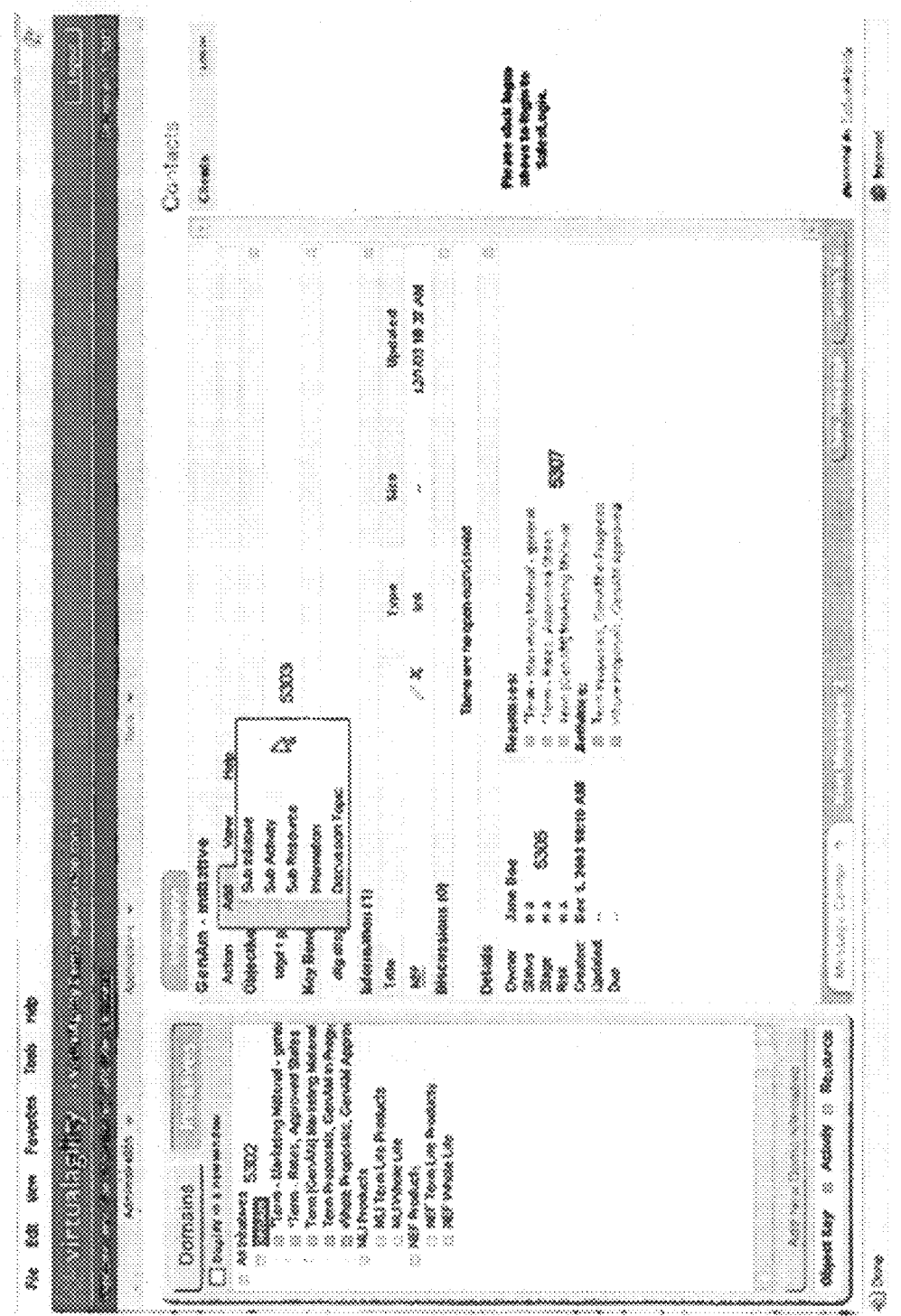
FIG. 53 shows the GUI for creating a new goal.
Figure 54:
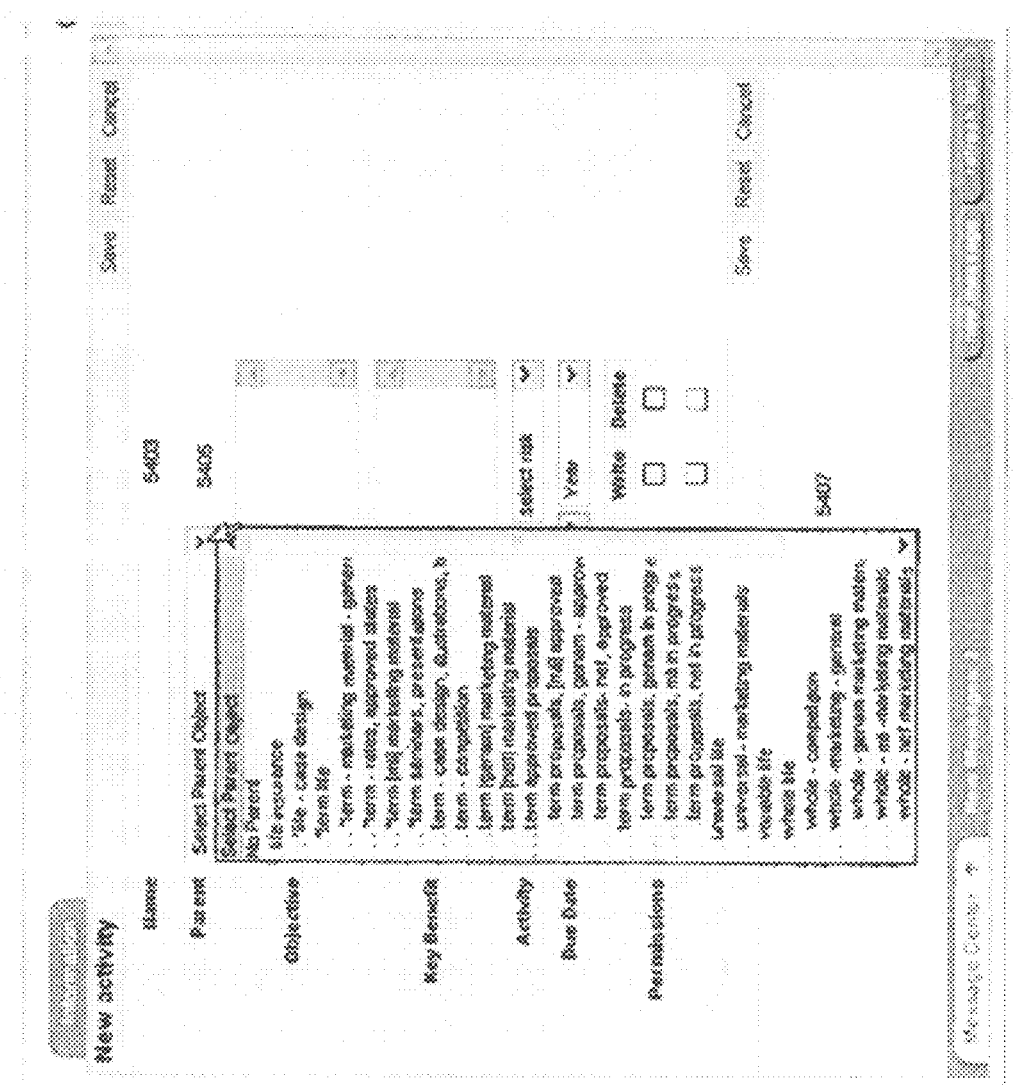
FIG. 54 shows the GUI for selecting the new goal's parent.

Adding a New Goal or Project to an Initiative: FIGS. 53 and 54

If a new goal or project is to be added to an initiative, the goal or project must first be created and given a place in a goal-project hierarchy 4011. The window in which this is done is shown at 5301 in FIG. 53. Here, the GenAm initiative has been selected at 5302 and Sub Activity has been selected in drop-down menu 5303, indicating that the collaborator wishes to add a subactivity to the GenAm initiative. Also visible in window 5301 are the details for the GenAm initiative. At 5305 are specified details from fields 4413 of the initiative's row in objective table 4215. At 5307 are specified the goals and projects that currently belong to the GenAm initiative.

FIG. 54 shows at 5401 the work area 4619 as it appears when a new goal is to be added. The new goal must of course be added not only to the initiative, but must also become part of a goal-project hierarchy 4011 (the hierarchy may of course contain only the new goal). At 5403 is the field into which the name of the new goal may be added; at 5405, the new goal's parent in its goal-project hierarchy may be selected. The resulting identifier goes into field 4411 in the goal's row in objective table 4215. When this is done, the collaborator may provide the objective-benefit description for the goal, may set fields 5004 and 5006 as explained above, and may set permissions in field 5007 as also explained above. Once all this is done, the new goal appears in available activities list 5205 and may be assigned to the new initiative as described above.

The graphical user interfaces for adding domains and projects are similar to those for adding initiatives and goals. A collaborator may reposition a domain in a domain hierarchy 4008, a goal-project hierarchy 4011 relative to a domain 4009, or a goal or project within a goal-project hierarchy by selecting a different parent for the domain, a different parent domain for the goal-project hierarchy, or a different parent for a goal or project. A collaborator may also add descriptions, stage, status, and risk information 5004, scheduling information 5006, and access information 5007 for domains, goals, and projects in the same manner as described above for the initiative.

When the foregoing description of the graphical user interface for adding an initiative and assigning goals or projects to it is read in light of the entity-relationship diagram of FIG. 42 and the detailed description of objective table 4215, it is apparent that the result of adding an initiative and assigning a goal to it is a new row in objective table 4215 for the initiative, new rows in group-objective table 4209 which specify the user groups that have access to the new initiative and the new initiative, and new rows in initiative-objective table 4217 which specify the new initiative and the goals and/or projects that belong to the new initiative. The addition of a new domain, goal, or project has similar effects on objective table 4215 and group-objective table 4209. Within the row, OBJECTIVE_NAME field 4403 is set from field 5002 of the GUI, OBJECTIVE_TYPE_CODE 4405 is set from the selection made from drop-down menu 4705, OBJECTIVE_DESC field 4409 is set from field 5107, and the KEY_BENEFIT field in fields 4413 is set from field 5109. OWNER_USER_ID field 4409 is set to the identifier for the collaborator making the input, PARENT_ID field 4411 is set from the selection made using drop-down menu 5005, and various fields in fields 4413 are set from fields 5004 and 5006.

Figure 48:
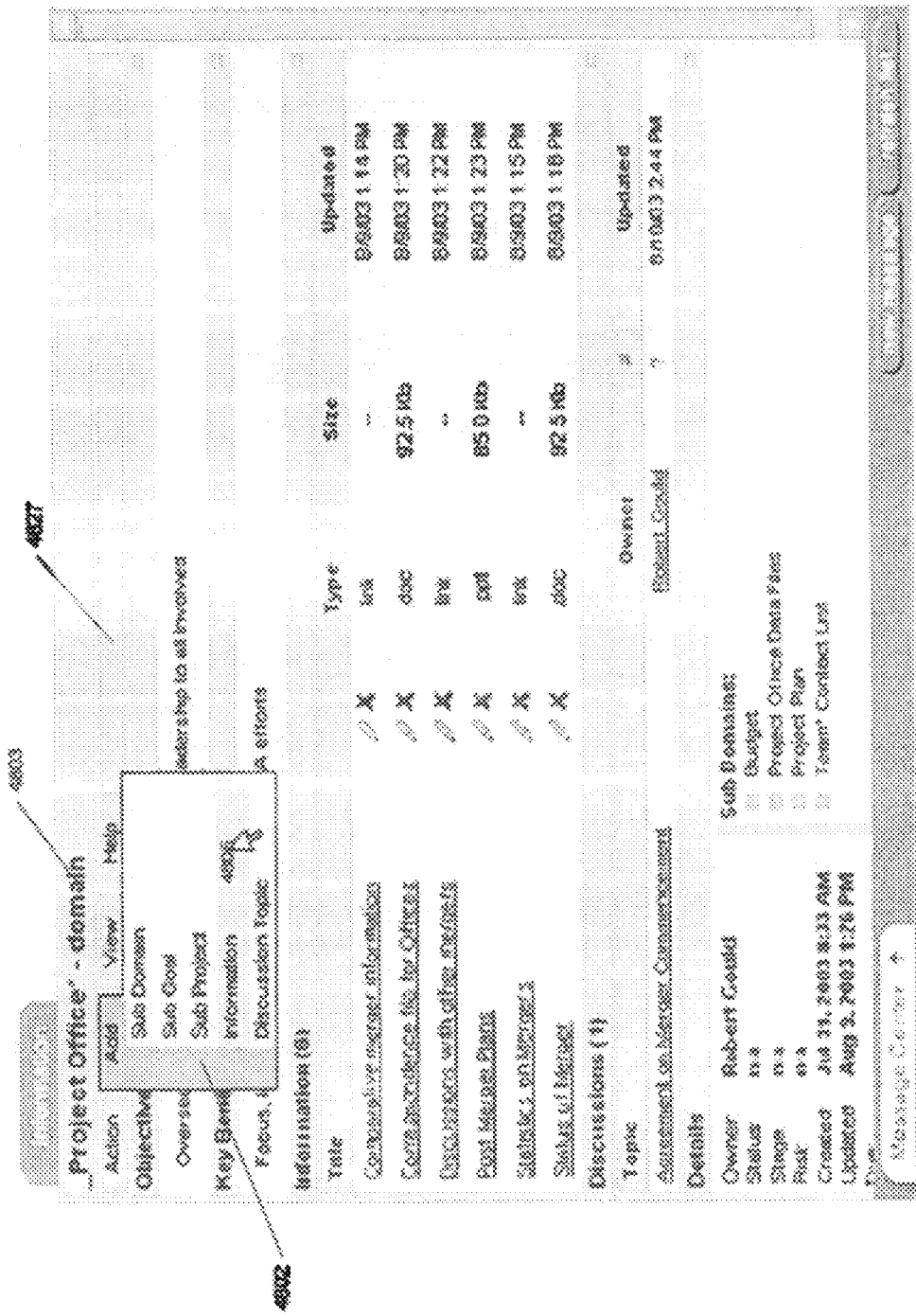
FIG. 48 shows a first part of the GUI used to add information to the model.
Figure 49:
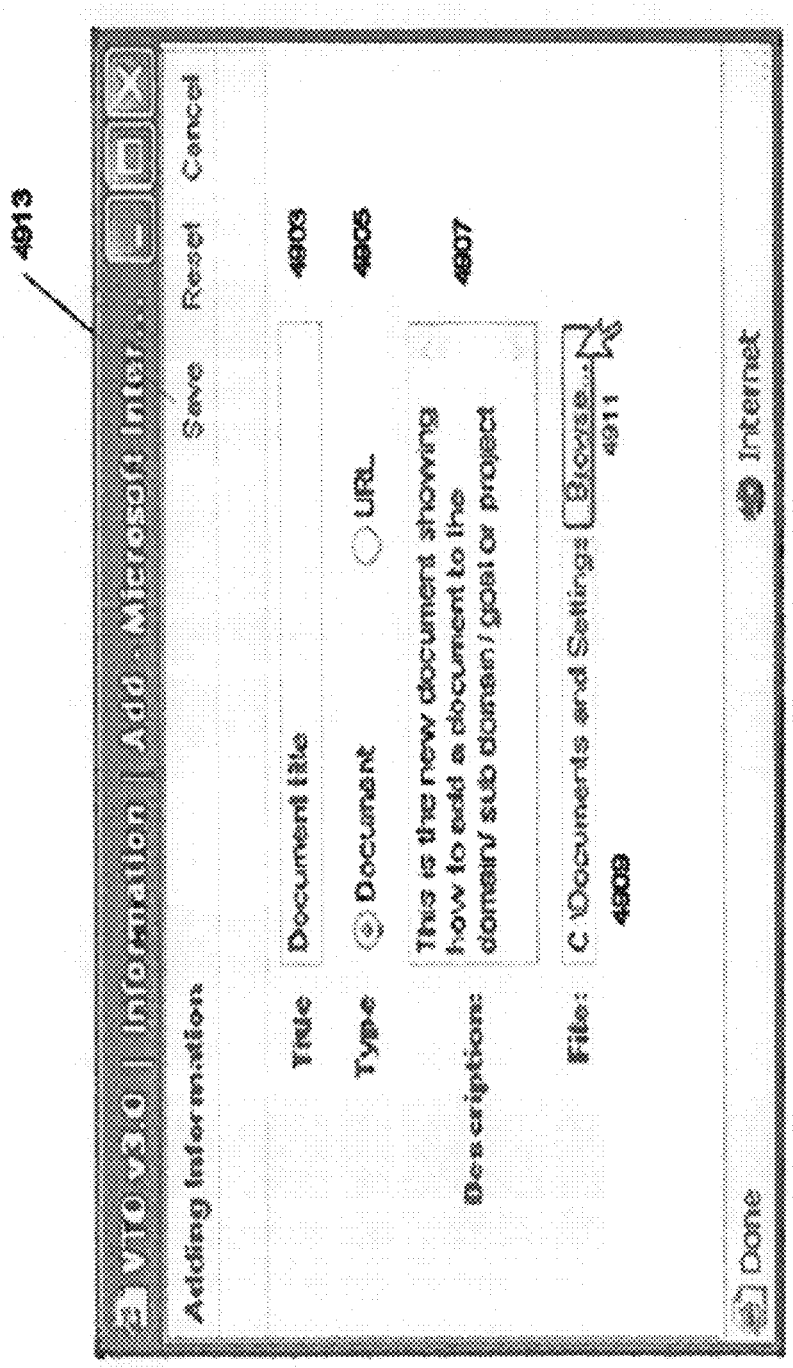
FIG. 49 shows a second part of the GUI used to add information to the model.
Figure 50:
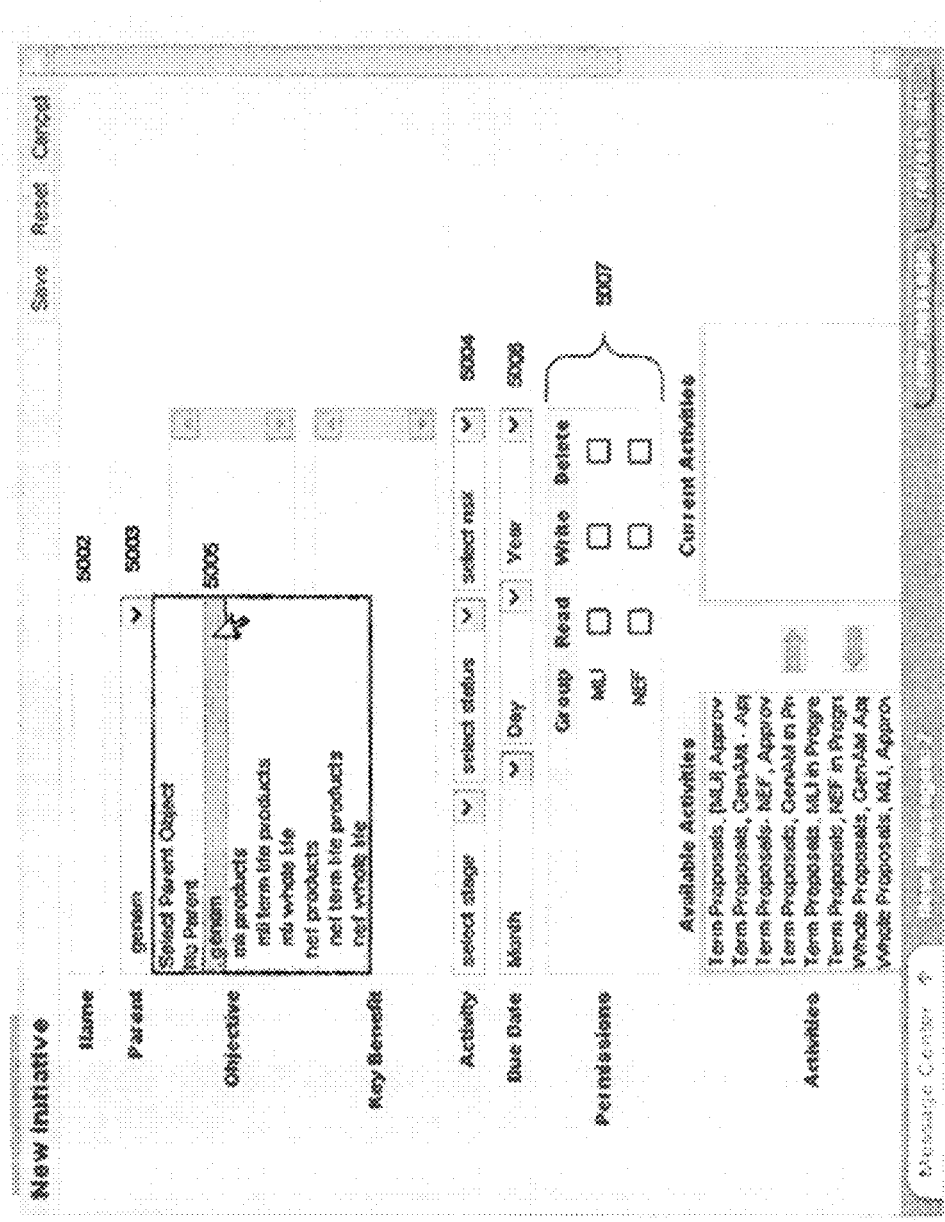
FIG. 50 shows the GUI for making a new initiative.

Relating New Information to a Hierarchy Entity: FIGS. 48 and 49

FIG. 48 shows how information is added to a domain. The domain has been selected in navigator menu 4607 and the work area 4619 that appears for the domain is shown at 4801. The domain is identified at 4803. The collaborator has selected the Add drop-down menu 4802 from action navigation menus 4627, and in that menu, he or she has selected information 4805. As a result of the selection, window 4901 shown in FIG. 49 appears. The window permits the collaborator to describe the document that is being provided as information. At 4903, the collaborator inputs the document's title; at 4905, the document's type, in this case, one that is stored locally to the server upon which the system for performing collaborative work is written. At 4907, the collaborator inputs a description of the document, and at 4909 he or she specifies the file location. Browse button 4911 permits the collaborator to browse for the file's location. When everything is properly entered, the collaborator clicks on save button 4913.

In response to the click on the save button, the system for performing collaborative work makes a new row in information table 4221. The information from window 4901 is written to fields 4503, 4505, and 4509 of the row, and the pathname for the document is written to the URL field in fields 4511. The id of the collaborator's row in user_info table 4247 goes into field 4507 and the identifier in objective table 4215 for the row for the domain to which the information was added goes into field 4513.

CONCLUSION

The foregoing Detailed Description has disclosed to those skilled in the relevant technologies how to make and use the inventors' system for performing collaborative tasks and has further disclosed the best mode presently known to them of making and using the invention. It will be immediately apparent from the nature of the invention that many versions of the invention may be made other than the one disclosed herein. For example, the models disclosed herein are hierarchically organized, but other organizations are possible. Similarly, model entities of kinds other than or in addition to those disclosed herein may be employed in other implementations. The kinds of operations that may be performed on model entities may vary from implementation to implementation, as may the kinds of information associated with them and the operations that can be performed on the information. Further, the kinds of third-party tools associated with the system may vary from implementation to implementation. The graphical user interface of course necessarily reflects the system it belongs to, and can thus vary even more than the other aspects of the system. Finally, the use of database tables to represent the model is particularly convenient, but any kind of representation of the model which suits the particular purposes of the system for which it is made may be used as well.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

We claim:

1. A system for supporting collaborative activity in a network, comprising:
    a storage component storing data related to the network and a model of the network;
    a processor that accesses the stored data and the model to process the data according to the model, wherein the stored data relates to the collaborative activity including user-defined data created by interaction of a user and the model, and context data related to the user and the user-defined data, wherein the user-defined data and the context data, as metadata, are stored in the storage component; and
    a user interface, provided by the processor, that presents the user-defined data, the context data, and the model in a form readable by the user, the interface permitting the user to define a set of arbitrary domains, relate the user-defined data to the domains, and view relationships between the user-defined data and the context data, and the domains.

2. The system of claim 1, wherein the user-defined data include links to entities external to the storage component, and wherein the interface permits the user to associate a link with a domain, to view the link, and to access an entity associated with the link.

3. The system of claim 2, wherein the links include links to Web pages.

4. The system of claim 2, wherein the links include links to applications.

5. The system of claim 4, wherein accessing an application link causes execution of the application.

6. The system of claim 2, wherein the links include links to displays of information.

7. The system of claim 1, wherein the domains include a first domain and a second domain, and wherein the second domain is accessed from the first domain by a link to the second domain.

8. The system of claim 7, wherein traversal of the link from the first domain to the second domain makes data related to the first domain accessible from the second domain.

9. The system of claim 8, wherein when the first and second domains are linked, a change of the data related to the first domain causes a change of data related to the second domain.

10. The system of claim 8, wherein when the first and second domains are linked, a change of the data related to the second domain causes a change of data related to the first domain.

11. The system of claim 1, wherein the user-defined data includes representations of discussions among users of the network, wherein a first user is associated with a first domain and a second user is associated with a second domain, and wherein a representation of a discussion is reflected in both the first and the second domains.

12. The system of claim 11, wherein the representation of the discussion is provided on a first interface viewable by the first user and a second interface viewable by the second user.

13. The system of claim 12, wherein the first and second users access the discussion using the first and second interfaces, respectively.

14. The system of claim 12, wherein the first user accesses the second interface, and accesses the discussion using the second interface.

15. The system of claim 1, wherein the network provides different levels of data access to different users, and wherein a first user can modify user-defined data created by a second user and the second user cannot modify user-defined data created by the first user.

16. The system of claim 15, wherein the processor sends an alert to the second user when the user-defined data created by the second user is modified by the first user.

17. The system of claim 1,
    wherein the network comprises a hierarchy of domains, wherein the model is a hierarchical model of the domains, and wherein the hierarchical model of the domains relates the domains to each other; and
    wherein the interface displays the hierarchical model of the domains and the relationships between the domains.

18. A method for implementing collaboration in a network, comprising:
    providing a model of the network and data related to the network;
    providing each of a plurality of users with access to at least a part of the model and the network using a user interface;

receiving user-defined data and user-specific data;

modifying the data related to the network according to the received user-defined data; and storing the user-defined data and the modified data related to the network, and storing the user-specific data as metadata.

19. The method of claim 18, wherein the user-defined data include links to entities external to the network, and wherein the interface permits the user to associate a link with a domain, to view the link, and to access an entity associated with the link.

20. The method of claim 19, wherein the links include links to Web pages.

21. The method of claim 19, wherein the links include links to applications, and wherein accessing an application link causes execution of the application.

22. The method of claim 18, wherein the domains include a first domain and a second domain, and wherein the second domain is accessed from the first domain by a link to the second domain.

23. The method of claim 22, wherein traversal of the link from the first domain to the second domain makes data related to the first domain accessible from the second domain.

24. The method of claim 23, wherein when the first and second domains are linked, a change of the data related to the first domain causes a change of data related to the second domain.

25. The method of claim 23, wherein when the first and second domains are linked, a change of the data related to the second domain causes a change of data related to the first domain.

26. The method of claim 18, wherein the user-defined data includes representations of discussions among users of the network, the method further comprising:

associating a first user with a first domain and a second user with a second domain; and reflecting a representation of a discussion in both the first and the second domains.

27. The method of claim 26, wherein the representation of the discussion is provided on a first interface viewable by the first user and a second interface viewable by the second user.

28. The method of claim 27, wherein the first and second users access the discussion using the first and second interfaces, respectively.

29. The method of claim 27, wherein the first user accesses the second interface, and accesses the discussion using the second interface.

30. The method of claim 18, further comprising:

providing different levels of data access to different users;

allowing a first user to modify user-defined data created by a second user;

preventing the second user from modifying user-defined data created by the first user.

31. The method of claim 30, further comprising sending an alert to the second user when the user-defined data created by the second user is modified by the first user.

32. The method of claim 18, wherein the network comprises a hierarchy of domains, wherein the model is a hierarchical model of the domains, and wherein the hierarchical model of the domains relates the domains to each other; and wherein the interface displays the hierarchical model of the domains and the relationships between the domains.

33. A non-transitory computer-readable medium containing programming that when executed by a processor, causes performance of the following steps:

providing a model of a network and data related to the network;

providing each of a plurality of users with access to at least a part of the model and the network using a user interface;

receiving user-defined data and user-specific data;

modifying the data related to the network according to the received user-defined data; and storing the user-defined data and the modified data related to the network, and storing the user-specific data as metadata.

* * * * *